US010919523B2

(12) United States Patent
Funk et al.

(10) Patent No.: US 10,919,523 B2
(45) Date of Patent: *Feb. 16, 2021

(54) SMART VEHICLE APPARATUS, SYSTEM, AND METHOD

(71) Applicant: CenturyLink Intellectual Property LLC, Broomfield, CO (US)

(72) Inventors: Tom Funk, Littleton, CO (US); Phil Carpenter, Castle Rock, CO (US); William R. Walker, Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/205,058

(22) Filed: Nov. 29, 2018

(65) Prior Publication Data

US 2019/0106099 A1 Apr. 11, 2019

Related U.S. Application Data

(63) Continuation of application No. 15/389,983, filed on Dec. 23, 2016, now Pat. No. 10,150,471.

(51) Int. Cl.
*B60W 10/30* (2006.01)
*B60W 10/04* (2006.01)
(Continued)

(52) U.S. Cl.
CPC ............ *B60W 30/08* (2013.01); *B60W 10/04* (2013.01); *B60W 10/10* (2013.01); *B60W 10/18* (2013.01);
(Continued)

(58) Field of Classification Search
CPC ...... B60W 10/00; B60W 10/04; B60W 10/10; B60W 10/18; B60W 10/20; B60W 10/30;
(Continued)

(56) References Cited

U.S. PATENT DOCUMENTS 2,754,101 A 7/1956 Haworth et al.
4,034,567 A 7/1977 Roggen
(Continued)

FOREIGN PATENT DOCUMENTS

CA 2337284 8/2002
CN 101799987 11/2011
(Continued)

OTHER PUBLICATIONS

Abram, et al.; Center for Nondestructive Evaluation, Iowa State University, Ames, IA, USA; "Effect of relative humidity on the curing and dielectric properties of polyurethane-based composites"; 2005 Annual Report Conference . . . Phenomena; 4 pages.
(Continued)

*Primary Examiner* — Yonel Beaulieu

(57) ABSTRACT

Novel tools and techniques are provided for implementing Internet of Things ("IoT") functionality. In some embodiments, a computing system or IoT management node might receive sensor data from one or more IoT-capable sensors, analyze the sensor data to determine one or more actions to be taken, and identify one or more devices (e.g., household devices associated with a customer premises; vehicular components associated with a vehicle; devices disposed in, on, or along a roadway; devices disposed throughout a population area; etc.) for performing the determined one or more first actions. The computing system or IoT management node then autonomously controls each of the identified one or more devices to perform tasks based on the determined one or more first actions to be taken, thereby implementing smart environment functionality (e.g., smart home, building, or customer premises functionality, smart vehicle functionality, smart roadway functionality, smart city functionality, and so on).

14 Claims, 29 Drawing Sheets

(51) Int. Cl.
 *B60W 10/18* (2012.01)
 *B60W 10/20* (2006.01)
 *B60W 30/16* (2020.01)
 *B60W 30/08* (2012.01)
 *B60W 10/10* (2012.01)
 *H04W 4/70* (2018.01)
 *H04W 4/46* (2018.01)
 *H04W 4/90* (2018.01)
 *H04L 29/08* (2006.01)
 *H04W 4/02* (2018.01)

(52) U.S. Cl.
 CPC ............ *B60W 10/20* (2013.01); *B60W 10/30* (2013.01); *B60W 30/16* (2013.01); *H04L 67/12* (2013.01); *H04W 4/70* (2018.02); *B60W 2420/42* (2013.01); *B60W 2420/52* (2013.01); *B60W 2420/54* (2013.01); *B60W 2554/801* (2020.02); *B60W 2556/65* (2020.02); *B60W 2754/30* (2020.02); *H04W 4/027* (2013.01); *H04W 4/46* (2018.02); *H04W 4/90* (2018.02)

(58) Field of Classification Search
 CPC .. B60W 30/08; B60W 30/16; B60W 2420/42; B60W 2420/52; B60W 2420/54; B60W 2556/65; B60W 2754/30; B60W 2554/801; H04L 67/00; H04L 67/12; H04W 4/00; H04W 4/46; H04W 4/70; H04W 4/027; H04W 4/90
 See application file for complete search history.

(56) References Cited

U.S. PATENT DOCUMENTS

| | | | |
|---|---|---|---|
| 4,329,083 A | 5/1982 | Parkinson | |
| 4,620,317 A | 10/1986 | Anderson | |
| 4,815,814 A | 3/1989 | Ulijasz | |
| 4,940,359 A | 7/1990 | Van Duyn et al. | |
| 5,239,129 A | 8/1993 | Ehrenfels | |
| 5,313,546 A | 5/1994 | Toffetti | |
| 5,528,684 A | 6/1996 | Schneider et al. | |
| 5,566,622 A | 10/1996 | Ziaylek, Jr. et al. | |
| 5,583,492 A | 12/1996 | Nakanishi | |
| 5,606,606 A | 2/1997 | Schneider et al. | |
| 5,717,955 A | 2/1998 | Swinehart | |
| 5,760,706 A | 6/1998 | Kiss | |
| 5,879,109 A | 3/1999 | Diermeier et al. | |
| 6,099,080 A | 8/2000 | Hirashita et al. | |
| 6,125,291 A | 9/2000 | Miesel | |
| 6,272,346 B1 | 8/2001 | Fujinami | |
| 6,371,691 B1 | 4/2002 | Finzel et al. | |
| 6,388,399 B1 | 5/2002 | Eckel | |
| 6,414,605 B1 | 7/2002 | Walden | |
| 6,499,410 B1 | 12/2002 | Berardi | |
| 6,503,025 B1 | 1/2003 | Miller | |
| 6,792,319 B1 | 9/2004 | Bilger | |
| 6,807,355 B2 | 10/2004 | Dofher | |
| 6,829,424 B1 | 12/2004 | Finzel et al. | |
| 6,866,448 B2 | 3/2005 | Finzel et al. | |
| 6,990,192 B1 | 1/2006 | Denovich et al. | |
| 7,030,781 B2 | 4/2006 | Jones | |
| 7,050,683 B2 | 5/2006 | Dofher | |
| 7,095,930 B2 | 8/2006 | Storaasli et al. | |
| 7,096,003 B2 | 8/2006 | Joao | |
| 7,397,363 B2 | 7/2008 | Joao | |
| 7,514,628 B2 | 4/2009 | Kadrnoska et al. | |
| 7,522,805 B2 | 4/2009 | Smith et al. | |
| 7,674,980 B2 | 3/2010 | Lubanski | |
| 7,739,030 B2 | 6/2010 | Desai | |
| 7,740,417 B2 | 6/2010 | Jang | |
| 7,849,886 B2 | 12/2010 | Carew et al. | |
| D640,290 S | 6/2011 | Stellman et al. | |
| 8,000,314 B2 | 8/2011 | Brownrigg | |
| 8,061,344 B2 | 11/2011 | Dofher | |
| 8,296,383 B2 | 10/2012 | Lindahl | |
| 8,380,652 B1 | 2/2013 | Francis, Jr. | |
| 8,480,332 B2 | 7/2013 | Miller et al. | |
| 8,654,936 B1 | 2/2014 | Eslambolchi et al. | |
| 8,787,246 B2 | 7/2014 | Brownrigg | |
| 8,811,887 B2 | 8/2014 | Dottling et al. | |
| 8,976,704 B2 | 3/2015 | Morper | |
| 9,062,423 B2 | 6/2015 | Allouche et al. | |
| 9,210,583 B2 | 12/2015 | Henderson | |
| 9,226,418 B2 | 12/2015 | Magno et al. | |
| 9,270,098 B2 | 2/2016 | Isaaks et al. | |
| 9,298,410 B2 | 3/2016 | Juchem | |
| 9,326,297 B1 | 4/2016 | Farkas | |
| 9,432,340 B1 | 8/2016 | Tutt et al. | |
| 9,456,276 B1 | 9/2016 | Chhetri | |
| 9,460,618 B1 | 10/2016 | Soltesz | |
| 9,466,966 B2 | 10/2016 | Allouche et al. | |
| 9,531,174 B2 | 12/2016 | Elford et al. | |
| 9,536,425 B1 | 1/2017 | Soltesz | |
| 9,588,315 B1 | 3/2017 | Turner | |
| 9,646,480 B2 | 5/2017 | Fadell | |
| 9,669,872 B2 | 6/2017 | Rebhan | |
| 9,672,734 B1 | 6/2017 | Ratnasingam | |
| 9,742,172 B2 | 8/2017 | Elford et al. | |
| 9,761,136 B2 | 9/2017 | Tonguz | |
| 9,780,433 B2 | 10/2017 | Schwengler et al. | |
| 9,786,997 B2 | 10/2017 | Schwengler et al. | |
| 9,832,655 B2 | 11/2017 | Horneman | |
| 9,860,677 B1 | 1/2018 | Agerstam | |
| 9,867,057 B2 | 1/2018 | Yu | |
| 9,905,122 B2 | 2/2018 | Sloo | |
| 9,917,903 B2 | 3/2018 | Clernon | |
| 10,069,751 B2 | 9/2018 | Amulothu et al. | |
| 10,150,471 B2 * | 12/2018 | Funk | B60W 10/30 |
| 10,222,773 B2 * | 3/2019 | Funk | H04W 4/38 |
| 10,253,468 B1 | 4/2019 | Linville | |
| 10,637,683 B2 * | 4/2020 | Funk | G08G 1/205 |
| 2001/0029311 A1 | 10/2001 | Khare | |
| 2002/0024450 A1 | 2/2002 | Townsend | |
| 2002/0057945 A1 | 5/2002 | Dahowski | |
| 2002/0061231 A1 | 5/2002 | Finzel et al. | |
| 2003/0061029 A1 | 3/2003 | Shaket | |
| 2003/0123935 A1 | 7/2003 | Dofher | |
| 2003/0210958 A1 | 11/2003 | Nothofer | |
| 2004/0083054 A1 | 4/2004 | Jones | |
| 2004/0091313 A1 | 5/2004 | Zhou | |
| 2004/0113773 A1 | 6/2004 | Nieters | |
| 2004/0115004 A1 | 6/2004 | Serrano | |
| 2004/0129445 A1 | 8/2004 | Winkelbach | |
| 2004/0160319 A1 | 8/2004 | Joao | |
| 2004/0221324 A1 | 11/2004 | Ansari et al. | |
| 2004/0234215 A1 | 11/2004 | Serrano et al. | |
| 2005/0013566 A1 | 1/2005 | Storaasli | |
| 2005/0191113 A1 | 9/2005 | Frazier | |
| 2005/0191133 A1 | 9/2005 | Purcell | |
| 2005/0207711 A1 | 9/2005 | Vo | |
| 2005/0248444 A1 | 11/2005 | Joao | |
| 2005/0259930 A1 | 11/2005 | Elkins et al. | |
| 2005/0285807 A1 | 12/2005 | Zehngut | |
| 2006/0008231 A1 | 1/2006 | Reagan | |
| 2006/0093303 A1 | 5/2006 | Reagan et al. | |
| 2006/0118338 A1 | 6/2006 | Maybury, Jr. | |
| 2006/0150644 A1 | 7/2006 | Wruck | |
| 2006/0204187 A1 | 9/2006 | Dofher | |
| 2006/0219382 A1 | 10/2006 | Johnson | |
| 2007/0018849 A1 | 1/2007 | Salser, Jr. | |
| 2007/0048084 A1 | 3/2007 | Jung | |
| 2007/0079113 A1 | 4/2007 | Kulkarni et al. | |
| 2007/0087756 A1 | 4/2007 | Hoffberg | |
| 2007/0154152 A1 | 7/2007 | Morris | |
| 2007/0247794 A1 | 10/2007 | Jaffe | |
| 2008/0197204 A1 | 8/2008 | Whitney | |
| 2008/0216367 A1 | 9/2008 | Van der Poel | |
| 2008/0234878 A1 | 9/2008 | Joao | |
| 2008/0256008 A1 | 10/2008 | Kwok | |
| 2008/0298755 A1 | 12/2008 | Caplan | |
| 2008/0300776 A1 | 12/2008 | Petrisor | |
| 2008/0303654 A1 | 12/2008 | Kates | |
| 2009/0121860 A1 | 5/2009 | Kimmel | |

(56) References Cited

U.S. PATENT DOCUMENTS

| | | |
|---|---|---|
| 2009/0125160 A1 | 5/2009 | Desai |
| 2009/0134993 A1 | 5/2009 | Ashworth |
| 2009/0177172 A1 | 7/2009 | Wilkes |
| 2009/0214163 A1 | 8/2009 | Lu |
| 2009/0317047 A1 | 12/2009 | Smith |
| 2009/0327910 A1 | 12/2009 | Black |
| 2010/0010117 A1 | 1/2010 | Bricout |
| 2010/0045484 A1 | 2/2010 | Brynielsson |
| 2010/0047021 A1 | 2/2010 | Scola |
| 2010/0071596 A1 | 3/2010 | Konczak |
| 2010/0086254 A1 | 4/2010 | Dofher |
| 2010/0124332 A1 | 5/2010 | Arena |
| 2010/0217604 A1 | 8/2010 | Baldwin et al. |
| 2010/0243096 A1 | 9/2010 | Berglund |
| 2010/0325421 A1 | 12/2010 | Park et al. |
| 2011/0016754 A1 | 1/2011 | Ruhl et al. |
| 2011/0052131 A1 | 3/2011 | Park et al. |
| 2011/0106321 A1 | 5/2011 | Cherian |
| 2011/0161076 A1 | 6/2011 | Davis |
| 2011/0288684 A1 | 11/2011 | Farlow |
| 2011/0315259 A1 | 12/2011 | Kelly |
| 2012/0048148 A1 | 3/2012 | Konczak |
| 2012/0086563 A1 | 4/2012 | Arling |
| 2012/0195694 A1 | 8/2012 | Konczak |
| 2012/0249341 A1 | 10/2012 | Brown |
| 2012/0265370 A1 | 10/2012 | Kim |
| 2012/0320766 A1 | 12/2012 | Sridhar |
| 2013/0009569 A1 | 1/2013 | Knibbe |
| 2013/0011198 A1 | 1/2013 | Pichler |
| 2013/0038461 A1 | 2/2013 | Hawkes |
| 2013/0044918 A1 | 2/2013 | Nielsen et al. |
| 2013/0074067 A1 | 3/2013 | Chowdhry |
| 2013/0138424 A1 | 5/2013 | Koenig |
| 2013/0216187 A1 | 8/2013 | Dowling |
| 2013/0216313 A1 | 8/2013 | Gustavsson et al. |
| 2013/0217421 A1 | 8/2013 | Kim |
| 2013/0223807 A1 | 8/2013 | Elford et al. |
| 2013/0238326 A1 | 9/2013 | Kim et al. |
| 2013/0287500 A1 | 10/2013 | Miller |
| 2013/0294839 A1 | 11/2013 | Gustavsson et al. |
| 2013/0297199 A1 | 11/2013 | Kapp |
| 2014/0018969 A1 | 1/2014 | Forbes |
| 2014/0033288 A1 | 1/2014 | Wynn |
| 2014/0146905 A1 | 5/2014 | Zavadsky |
| 2014/0162629 A1 | 6/2014 | Tipton |
| 2014/0167931 A1 | 6/2014 | Lee et al. |
| 2014/0180478 A1 | 6/2014 | Letsky |
| 2014/0188463 A1 | 7/2014 | Noh et al. |
| 2014/0202571 A1 | 7/2014 | Spijker |
| 2014/0233412 A1 | 8/2014 | Mishra |
| 2014/0257693 A1 | 9/2014 | Ehlers |
| 2014/0270971 A1 | 9/2014 | Allouche et al. |
| 2014/0275852 A1 | 9/2014 | Hong |
| 2014/0327583 A1 | 11/2014 | Sparks |
| 2014/0343950 A1 | 11/2014 | Simpson et al. |
| 2014/0369336 A1 | 12/2014 | Prakash |
| 2015/0035704 A1 | 2/2015 | Schwengler et al. |
| 2015/0070221 A1 | 3/2015 | Schwengler et al. |
| 2015/0092744 A1 | 4/2015 | Singh |
| 2015/0097686 A1 | 4/2015 | Fadell |
| 2015/0098385 A1 | 4/2015 | Navalekar |
| 2015/0100167 A1 | 4/2015 | Sloo |
| 2015/0110453 A1 | 4/2015 | Elford et al. |
| 2015/0111589 A1 | 4/2015 | Yavuz |
| 2015/0120502 A1 | 4/2015 | Jung et al. |
| 2015/0124622 A1 | 5/2015 | Kovvali |
| 2015/0139598 A1 | 5/2015 | Barnes et al. |
| 2015/0187200 A1 | 7/2015 | Fadell |
| 2015/0230008 A1 | 8/2015 | Elford et al. |
| 2015/0249672 A1 | 9/2015 | Burns et al. |
| 2015/0262102 A1 | 9/2015 | Tann |
| 2015/0288161 A1 | 10/2015 | Allouche et al. |
| 2015/0298654 A1 | 10/2015 | Joao |
| 2015/0300527 A1 | 10/2015 | Konczak |
| 2015/0350247 A1 | 12/2015 | Adler et al. |
| 2015/0365278 A1 | 12/2015 | Chakrabarti et al. |
| 2016/0006837 A1 | 1/2016 | Reynolds |
| 2016/0021127 A1 | 1/2016 | Yan |
| 2016/0029346 A1 | 1/2016 | Suresh et al. |
| 2016/0063857 A1 | 3/2016 | Fowe |
| 2016/0080322 A1 | 3/2016 | Prisser |
| 2016/0085594 A1 | 3/2016 | Wang |
| 2016/0093213 A1 | 3/2016 | Rider |
| 2016/0109036 A1 | 4/2016 | Elford et al. |
| 2016/0109678 A1 | 4/2016 | Schwengler et al. |
| 2016/0112779 A1 | 4/2016 | Barnett et al. |
| 2016/0187995 A1 | 6/2016 | Rosewall |
| 2016/0195876 A1 | 7/2016 | Mattsson |
| 2016/0212012 A1 | 7/2016 | Young |
| 2016/0212613 A1 | 7/2016 | Huang |
| 2016/0226231 A1 | 8/2016 | Elford et al. |
| 2016/0226674 A1 | 8/2016 | Kangshang et al. |
| 2016/0248746 A1 | 8/2016 | James |
| 2016/0267790 A1 | 9/2016 | Raamot |
| 2016/0277310 A1 | 9/2016 | Challa |
| 2016/0278599 A1 | 9/2016 | Seo |
| 2016/0294828 A1 | 10/2016 | Zakaria |
| 2016/0295364 A1 | 10/2016 | Zakaria |
| 2016/0323271 A1 | 11/2016 | Hinman |
| 2016/0329040 A1 | 11/2016 | Whinnery |
| 2016/0330042 A1 | 11/2016 | Andersen |
| 2016/0352526 A1 | 12/2016 | Adler et al. |
| 2016/0359965 A1 | 12/2016 | Murphy et al. |
| 2017/0006141 A1 | 1/2017 | Bhadra |
| 2017/0006643 A1 | 1/2017 | Zakaria et al. |
| 2017/0026157 A1 | 1/2017 | Bugenhagen et al. |
| 2017/0026472 A1 | 1/2017 | Bugenhagen et al. |
| 2017/0026607 A1 | 1/2017 | Kim |
| 2017/0059802 A1 | 3/2017 | Elford et al. |
| 2017/0060369 A1 | 3/2017 | Goyal |
| 2017/0083005 A1 | 3/2017 | Hickman |
| 2017/0085437 A1 | 3/2017 | Condeixa et al. |
| 2017/0093866 A1 | 3/2017 | Ben-Noon |
| 2017/0110784 A1 | 4/2017 | Vermes et al. |
| 2017/0118687 A1 | 4/2017 | Tipton |
| 2017/0134937 A1 | 5/2017 | Miller |
| 2017/0141575 A1 | 5/2017 | Fulton |
| 2017/0150299 A1 | 5/2017 | Coutinho et al. |
| 2017/0171747 A1 | 6/2017 | Britt et al. |
| 2017/0176034 A1 | 6/2017 | Hussain |
| 2017/0181383 A1 | 6/2017 | Shen |
| 2017/0187807 A1 | 6/2017 | Clernon |
| 2017/0192437 A1 | 7/2017 | Bier |
| 2017/0195318 A1 | 7/2017 | Liu |
| 2017/0195891 A1 | 7/2017 | Smith et al. |
| 2017/0201504 A1 | 7/2017 | Funk |
| 2017/0206900 A1 | 7/2017 | Lee et al. |
| 2017/0229004 A1 | 8/2017 | Shah |
| 2017/0237815 A1 | 8/2017 | Arsenault |
| 2017/0253258 A1 | 9/2017 | Bramucci |
| 2017/0274898 A1 | 9/2017 | Nakamura |
| 2017/0279620 A1 | 9/2017 | Kravitz et al. |
| 2017/0300953 A1 | 10/2017 | Kim |
| 2017/0317482 A1 | 11/2017 | Elford et al. |
| 2017/0345295 A1 | 11/2017 | Mattar |
| 2017/0345420 A1 | 11/2017 | Barnett, Jr. |
| 2017/0358025 A1 | 12/2017 | Varma |
| 2017/0358837 A1 | 12/2017 | Schwengler et al. |
| 2017/0358869 A1 | 12/2017 | Schwengler et al. |
| 2017/0371337 A1 | 12/2017 | Ramasamy |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0113450 A1 | 4/2018 | Sherony |
| 2018/0122506 A1 | 5/2018 | Grantcharov |
| 2018/0132227 A1 | 5/2018 | Ghosh |
| 2018/0136424 A1 | 5/2018 | Elford |
| 2018/0146412 A1 | 5/2018 | Schwengler |
| 2018/0168464 A1 | 6/2018 | Barnett, Jr. et al. |
| 2018/0174449 A1 | 6/2018 | Nguyen |
| 2018/0178781 A1 | 6/2018 | Funk et al. |
| 2018/0181091 A1 | 6/2018 | Funk et al. |
| 2018/0181094 A1 | 6/2018 | Funk et al. |

(56) References Cited

U.S. PATENT DOCUMENTS

| | | | |
|---|---|---|---|
| 2018/0181095 A1 | 6/2018 | Funk et al. |
| 2018/0183685 A1 | 6/2018 | Cook |
| 2018/0183874 A1 | 6/2018 | Cook |
| 2018/0188704 A1 | 7/2018 | Cella |
| 2018/0196216 A1 | 7/2018 | Elford et al. |
| 2018/0295405 A1 | 10/2018 | Barnett, Jr. et al. |
| 2018/0299290 A1 | 10/2018 | Slavin |
| 2018/0370567 A1 | 12/2018 | Rowell |
| 2018/0374347 A1 | 12/2018 | Silver |
| 2019/0028134 A1 | 1/2019 | Barnett, Jr. |
| 2019/0035269 A1 | 1/2019 | Donovan |
| 2019/0049994 A1 | 2/2019 | Pohl |
| 2019/0073899 A1 | 3/2019 | Radomy |

FOREIGN PATENT DOCUMENTS

| | | |
|---|---|---|
| FR | 2750717 | 1/1998 |
| GB | 2327680 | 2/1999 |
| JP | H03139705 | 6/1991 |
| KR | 10-2015-0128346 | 11/2015 |
| WO | WO-2010-140507 | 5/1998 |
| WO | WO-1999-61710 | 12/1999 |
| WO | WO-2002-29947 | 4/2002 |
| WO | WO-2009-098676 | 8/2009 |
| WO | WO-2013-058648 | 4/2013 |
| WO | WO-2013-130644 | 9/2013 |
| WO | WO-2014-151726 | 9/2014 |
| WO | WO-2017-123392 | 7/2017 |

OTHER PUBLICATIONS

European Patent Application No. 14768062.3; Extended European Search Report dated Oct. 18, 2016; 5 pages.

International Preliminary Report on Patentability, PCT International Application No. PCT/US2016-067938, dated Jul. 26, 2018, 8 pages.

International Preliminary Report on Patentability, PCT International Application No. PCTUS17034531, dated Nov. 27, 2018, 15 pages.

International Search Report and Written Opinion prepared by the Korean Intellectual Property Office as International Searching Authority for PCT Intl Patent App. No. PCT/US2016/067938 dated Mar. 31, 2017; 11 pages.

International Search Report and Written Opinion prepared by the Korean Intellectual Property Office as International Searching Authority for PCT International Patent Application No. PCT/US2017/034531 dated Aug. 29, 2017; 18 pages.

International Search Report and Written Opinion prepared by the U.S. Patent and Trademark Office as International Search Authority in PCT International Patent Application No. PCT/US2014/026325, dated Aug. 8, 2014; 12 pages.

International Search Report and Written Opinion prepared by the U.S. Patent and Trademark Office as International Searching Authority for PCT International Patent Application No. PCT/US2013/0280 dated May 3, 2013; 20 pages.

Lejun Qi, Linnea Petersson & Tieliang Liu (2014) Review of Recent Activities on Dielectric Films for Capacitor Applications, Journal of International Council on Electrical Engineering, 4:1, 1-6, DOI: 10.5370/JICEE.2014.4.1.001.

International Preliminary Report on Patentability, PCT International Application No. PCT/US2014/026325, dated Sep. 15, 2015; 8 pages.

Preliminary Report on Patentability for PCT International Patent Application No. PCT/US2013/0280 dated Sep. 12, 2014; 13 pages.

Alexander, Chris, et al., "Improved User Authentication in Off-The-Record Messaging", 2009, 7 pgs.

Bersch, Christian, et al., "Bimanual Robotic Cloth Manipulation for Laundry Folding", 2011, 7 pgs.

Borisov, Nikita, et al., "Off-the-Record Communication, or, Why Not to Use PGP", 2004, 9 pgs.

De Raimondo, Mario, et al., "Secure Off-the-Record Messaging", 2005, 9 pgs.

Goldberg, Ian, et al., "Multi-party Off-the-Record Messaging", 2007, 11 pgs.

Stedman, Ryan, et al., A User Study of Off-the-Record Messaging, 2008, 9 pages.

\* cited by examiner

400

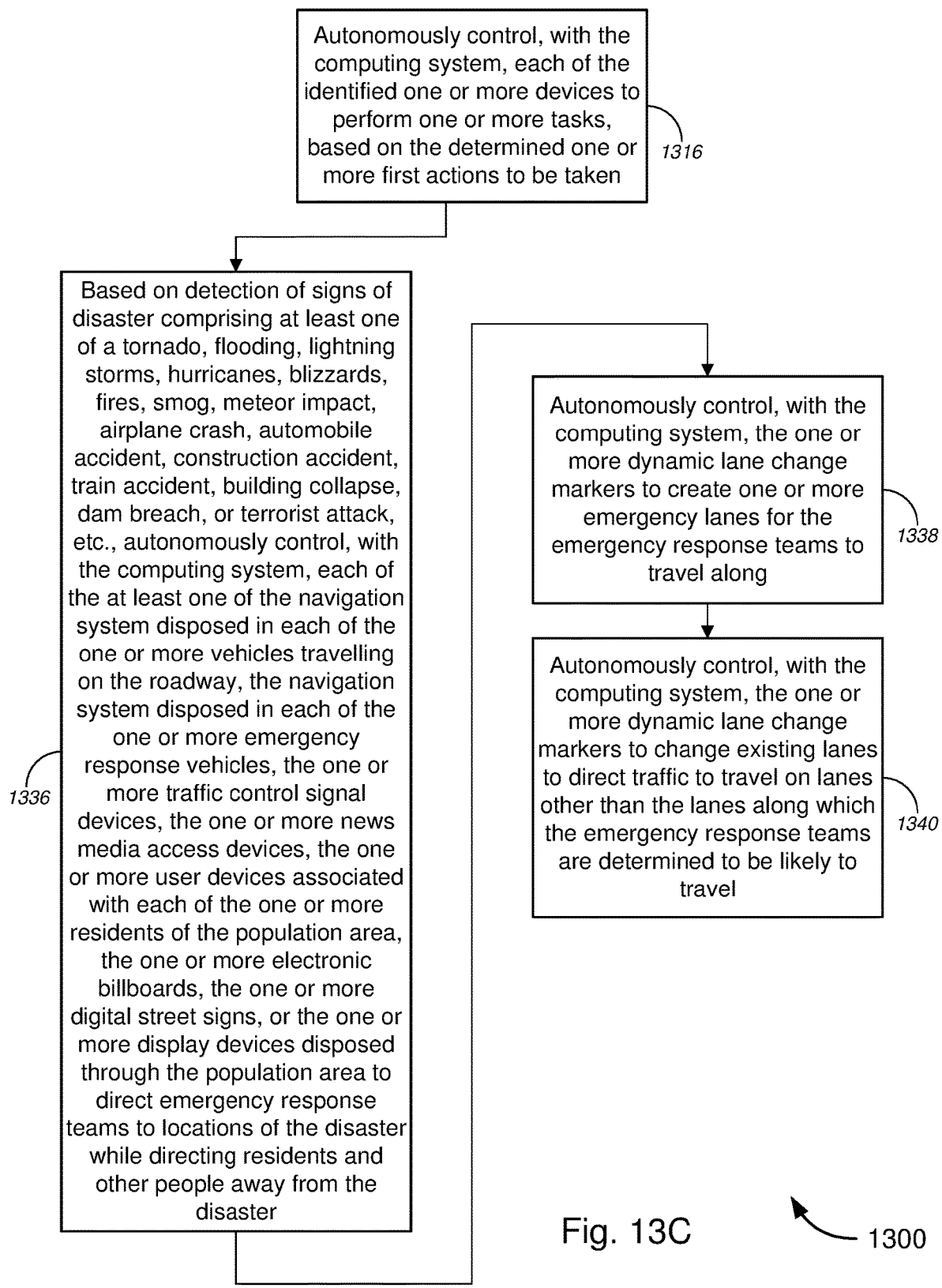

SMART VEHICLE APPARATUS, SYSTEM, AND METHOD

CROSS-REFERENCES TO RELATED APPLICATIONS

This application is a continuation application of U.S. patent application Ser. No. 15/389,983 (the "'983 Application"), filed Dec. 23, 2016 by Tom Funk et al. and titled, "Smart Vehicle Apparatus, System, and Method," the entire teachings of which are incorporated herein by reference in their entirety for all purposes.

This application may be related to U.S. patent application Ser. No. 15/370,764 (the "'764 application"), filed Dec. 6, 2016 by Thomas C. Barnett, Jr., et al. and titled, "Internet of Things (IoT) Human Interface Apparatus, System, and Method", which claims priority to U.S. Patent Application Ser. No. 62/342,710 (the "'710 application"), filed May 27, 2016 by Thomas C. Barnett, Jr., et al. and titled, "Internet of Things (IoT) Human Interface Apparatus, System, and Method".

This application may also be related to each of U.S. patent application Ser. No. 15/389,962 (the "'962 Application"), filed on Dec. 23, 2016 by Tom Funk et al. and titled, "Smart Home, Building, or Customer Premises Apparatus, System, and Method", U.S. patent application Ser. No. 15/390,023 (the "'023 Application"), filed on Dec. 23, 2016 by Tom Funk et al. and titled, "Smart Roadway Apparatus, System, and Method", and U.S. patent application Ser. No. 15/390,061 (the "'061 Application"), filed on a Dec. 23, 2016 by Tom Funk et al. and titled, "Smart City Apparatus, System, and Method".

This application may also be related to each of U.S. patent application Ser. No. 14/946,540 (the "'540 Application"), filed on Nov. 19, 2015 by Michael K. Bugenhagen et al. and titled, "Customer Based Internet of Things (IOT)", which claims priority to U.S. Patent Application Ser. No. 62/196,086 (the "'086 Application"), filed Jul. 23, 2015 by Michael K. Bugenhagen et al. and titled, "Customer Based Internet of Things (IOT)"; U.S. patent application Ser. No. 14/946,548 (the "'548 Application"), filed on Nov. 19, 2015 by Michael K. Bugenhagen et al. and titled, "Customer Based Internet of Things (IOT)—Transparent Privacy Functionality", which claims priority to U.S. Patent Application Ser. No. 62/196,090 (the "'090 Application"), filed Jul. 23, 2015 by Michael K. Bugenhagen and titled, "Customer Based Internet of Things (IOT)—Transparent Privacy Functionality"; and U.S. patent application Ser. No. 15/084,805 (the "'805 Application"), filed on Mar. 30, 2016 by Tom Funk and titled, "System and Method for Implementing Secure Communications for Internet of Things (IOT) Devices", which claims priority to U.S. Patent Application Ser. No. 62/277,245 (the "'245 Application"), filed Jan. 11, 2016 by Tom Funk and titled, "IoT Security through Combining TOR Messenger with MQTT or Additional Protocols".

This application may also be related to each of U.S. patent application Ser. No. 14/678,208 (the "'208 Application"), filed Apr. 3, 2015 by Michael J. Fargano et al. and titled, "Network Functions Virtualization Interconnection Gateway", which claims priority to U.S. Patent Application Ser. No. 61/974,927, filed Apr. 3, 2014 by Michael J. Fargano and titled, "Network Functions Virtualization Interconnection Gateway"; U.S. patent application Ser. No. 14/678,280 (the "'280 application"), filed on Apr. 3, 2015 by Michael J. Fargano et al. and titled, "Network Functions Virtualization Interconnection Hub", which claims priority to U.S. Patent Application Ser. No. 61/974,930, filed Apr. 3, 2014 by Michael J. Fargano and titled, "Network Functions Virtualization Interconnection Hub"; and U.S. patent application Ser. No. 14/678,309 (the "'309 application"), filed Apr. 3, 2015 by Michael J. Fargano et. al and titled, "Customer Environment Network Functions Virtualization (NFV)", which claims priority to U.S. Patent Application Ser. No. 61/976,896, filed Apr. 8, 2014 by Michael J. Fargano and titled, "Customer Environment Network Functions Virtualization (NFV)" and U.S. Patent Application Ser. No. 61/977,820, filed Apr. 10, 2014 by Michael J. Fargano and titled, "Customer Environment Network Functions Virtualization (NFV)".

This application may be related to each of U.S. patent application Ser. No. 14/730,695 (the "'695 application"), filed Jun. 4, 2015 by Charles I. Cook et al. and titled, "Remoting Application Servers", which claims priority to U.S. Patent Application Ser. No. 62/037,096, filed Aug. 13, 2014 by Charles I. Cook et al. and titled, "Remoting Application Servers"; U.S. patent application Ser. No. 14/983,884 (the "'884 application"), filed Dec. 30, 2015 by Kevin M. McBride et al. and titled, "Intent-Based Services Orchestration", which claims priority to U.S. Patent Application Ser. No. 62/233,911, filed Sep. 28, 2015 by Kevin M. McBride et al. and titled, "Intent-Based Services Orchestration" and U.S. patent application Ser. No. 62/247,294, filed Oct. 28, 2015 by Kevin M. McBride et al. and titled, "Intent-Based Services Orchestration"; and U.S. patent application Ser. No. 14/983,758 (the "'758 application"), filed Dec. 30, 2015 by Michael K. Bugenhagen and titled, "Virtual Machine-To-Port Peripheral Device Driver", which claims priority to U.S. Patent Application Ser. No. 62/237,981, filed Oct. 6, 2015 by Michael K. Bugenhagen and titled, "NFV Peripheral Network Driver for VNF's".

This application may also be related to each of U.S. patent Application Ser. No. 15/148,688 (the "'688 application"), filed on May 6, 2016 by Charles I. Cook et al. and titled, "System and Method for Implementing Network Enhanced Gateway Functionality"; U.S. patent application Ser. No. 15/148,705 (the "'705 application"), filed on May 6, 2016 by Charles I. Cook et al. and titled, "System and Method for Implementing Extension of Customer LAN at Provider Network Service Point"; U.S. patent application Ser. No. 15/148,711 (the "'711 application"), filed May 6, 2016 by Charles I. Cook et al. and titled, "System and Method for Implementing Isolated Service Overlays between Provider Network Service Point and Customer Premises"; U.S. patent application Ser. No. 15/148,721 (the "'721 application"), filed on May 6, 2016 by Charles I. Cook et al. and titled, "System and Method for Implementing Network Experience Shifting"; and U.S. patent application Ser. No. 15/222,623 (the "'623 application"), filed Jul. 28, 2016 by Michael K. Bugenhagen et al. and titled, "System and Method for Implementing Customer Control Point or Customer Portal". Each of the '688, '705, '711, and '721 applications claim priority to each of U.S. Patent Application Ser. No. 62/157,795 (the "'795 application"), filed May 6, 2015 by Charles I. Cook et al. and titled, "NFVI Enhanced Open Business/Residential Gateways and Customer Portal", U.S. Patent Application Ser. No. 62/159,788 (the "'788 application"), filed May 11, 2015 by Charles I. Cook et al. and titled, "NFVI Enhanced Open Business/Residential Gateways and Customer Portal", U.S. Patent Application Ser. No. 62/172,359 (the "'359 application"), filed Jun. 8, 2015 by Charles I. Cook et al. and titled, "Enhanced LAN With Customer Portal Control". The '721 application further claims priority to U.S. Patent Application Ser. No. 62/299,346 (the "'346 application"), filed Feb. 24, 2016 by Charles I. Cook et al.

and titled, "Experience Shifting". The '623 application claims priority to the '346 application and to U.S. Patent Application Ser. No. 62/299,357 (the "'357 application"), filed Feb. 24, 2016 by Michael K. Bugenhagen et al. and titled, "Control Point or Customer Portal".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, and so on.

BACKGROUND

Although Internet of Things ("IoT") is currently being implemented in some commercial settings, such conventional IoT deployments do not appear to fully utilize the full interconnectedness with IoT-capable sensors, and, based on analysis of sensor data from these IoT-capable sensors, determine one or more actions to be taken and identify one or more devices (be they household devices, vehicular components, devices disposed in, on, or along a roadway, and/or devices disposed throughout a population area, etc.) for performing the determined one or more actions. Such conventional IoT deployments also do not appear to autonomously control each of the identified one or more devices to perform tasks based on the determined actions to be taken.

Hence, there is a need for more robust and scalable solutions for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, etc.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 13A-13G are flow diagrams illustrating a method for implementing IoT-based smart city functionality, in accordance with various embodiments.

DETAILED DESCRIPTION OF CERTAIN EMBODIMENTS

Overview

Figure 1:
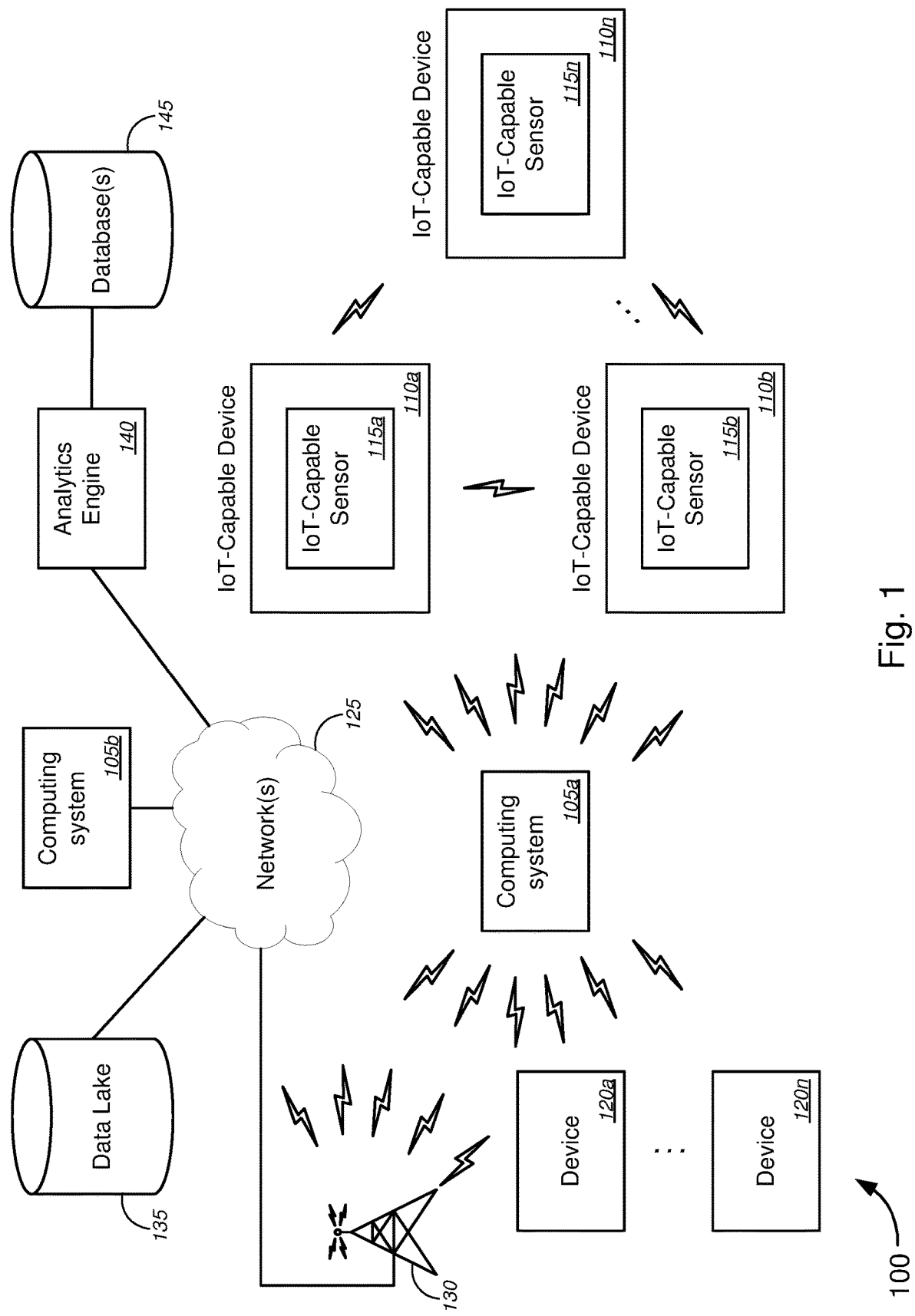
FIG. 1 is a schematic diagram illustrating a system for implementing Internet of Things ("IoT")—based smart environment functionality, in accordance with various embodiments.

Various embodiments provide tools and techniques for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, and/or the like.

In various embodiments, a computing system or IoT management node might receive sensor data from one or more IoT-capable sensors, analyze the sensor data to determine one or more actions to be taken, and identify one or more devices (e.g., household devices associated with a customer premises; vehicular components associated with a vehicle; devices disposed in, on, or along a roadway; devices disposed throughout a population area; etc.) for performing the determined one or more first actions. The computing system or IoT management node then autonomously controls each of the identified one or more devices to perform tasks based on the determined one or more first actions to be taken, thereby implementing smart environment functionality (e.g., smart home, building, or customer premises functionality, smart vehicle functionality, smart roadway functionality, smart city functionality, and so on).

In some embodiments, the customer premises might comprise a home, building, or other customer premises structure (e.g., business premises, commercial office, school, industrial building, etc.), and/or the like. The computing system associated with implementing smart home, building, or customer premises functionality, in some cases, might include, without limitation, at least one of an IoT human interface device (or a single processor or a plurality of processors disposed therein, whereas, such processor or processors may be physical or virtual in nature), a computing node that is located within the customer premises, or other computing systems, which might include, but are not limited to, an IoT management node (that is either located within the customer premises or at a remote facility associated with a service provider), a server computer that is remote the customer premises, a cloud computing system, a distributed computing system that integrates computing resources from two or more IoT-capable devices, or a combination of two or more of these computing systems, and/or the like.

The IoT-capable sensors for implementing smart home, building, or customer premises functionality might include, but are not limited to, one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more cameras, one or more biometric sensors (e.g., fingerprint sensors, palm print sensors, footprint sensors, handprint sensors, voice identification sensors, iris scanners, retina scanners, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more water leak detectors, one or more contact sensors, one or more audio sensors, one or more accelerometers, one or more proximity sensors, one or more radiation sensors, one or more telecommunications signal sensors, and/or the like. In some embodiments, the IoT-capable sensors 310 might further include, without limitation, one or more conventional thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more humidity sensors in at least one of the one or more rooms, one or more outdoor humidity sensors, one or more moisture sensors, one or more lawn height detectors, one or more nitrogen level sensors, one or more phosphate level sensors, one or more potassium level sensors, one or more leaf color detectors, one or more wind sensors, one or more snow accumulation sensors, one or more indoor solar light sensors, one or more outdoor solar light sensors, one or more neighborhood weather station sensors, one or more regional weather station sensors, one or more motion detectors detecting proximity of people or animals, one or more particulate sensors, one or more optical particulate sensors, one or more electrostatic particulate sensors, one or more object position sensors, one or more flame detectors, one or more sound amplitude sensors, one or more sound propagation detectors, one or more frequency sensors, and/or the like.

According to some embodiments, the IoT-capable devices or household devices might comprise one or more of the aforementioned IoT-capable sensors, and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, and/or other IoT-capable devices. In some cases, the other IoT-capable devices might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like. The IoT-capable devices or household devices might further include, but are not limited to one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, one or more drones with clothes hanging tool, a fire suppression system, one or more emergency exit markers, one or more exit route markers, one or more lights (e.g., LEDs, indicator lights, warning lights, etc.), one or more fire suppression drones, one or more white noise generators, and/or the like.

Merely by way of example, in some instances, the vehicle might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. The computing system for implementing smart vehicle functionality might include, but is not limited to, a vehicle node (or a single processor or a plurality of processors disposed therein, whereas, such processor or processors may be physical or virtual in nature), a computing node that is located within the vehicle, or other computing systems, which might include, but are not limited to, an IoT management node (that is either located within the vehicle, located at a customer premises associated with an owner of the vehicle, located at a business premises associated with a company that owns or operates the vehicle, or located at a service provider facility associated with a service provider that provides services to the owner of the vehicle), a server computer that is remote from the vehicle, a cloud computing system, a distributed computing system that integrates computing resources from two or more IoT-capable devices, or a combination of two or more of these computing systems, and/or the like.

In some instances, the IoT-capable sensors for implementing smart vehicle functionality might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more other sensors, and/or the like. In some cases, the one or more other sensors might include, but are not limited to, one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, or one or more suspension system diagnostic sensors, and/or the like.

In some embodiments, the IoT-capable devices or vehicular components might comprise one or more of the aforementioned IoT-capable sensors, and/or might further include, without limitation, a vehicle computer, a vehicle engine, an electronic throttle control ("ETC") system, a vehicle brake system, a vehicle gear system, a vehicle steering system, a vehicle head light system, a vehicle turn signal light system, a vehicle brake light system, a vehicle (analog or digital) instrument gauge cluster, a vehicle heads-up-display ("HUD") system, a vehicle-based transceiver or communications system, a navigation system, a vehicle display device, a vehicle speaker system, a vehicle (self-) diagnostic system, a vehicle hazard light system, a vehicle-based wireless access point ("WAP"), and/or other IoT-capable devices. In some cases, the other IoT-capable devices might include, without limitation, a door unlocking/locking system, an automated door opening/closing system, an automated window opening or closing system, an automated vehicle window covering control system, a data port, one or more vehicle climate control systems, one or more air purifiers, one or more air filters, or one or more electrostatic particulate collecting tools, a fire suppression system, one or more lights (e.g., reading lights, LEDs, indicator lights, warning lights, etc.), and/or the like.

According to some embodiments, the roadway might include, without limitation, at least one of a local road, a main road, a highway, an airport apron, an airport ramp, an airport runway, a canal, a lock, or a waterway, and/or the like. The computing system for implementing smart roadway functionality might include, but is not limited to, a vehicle node (or a single processor or a plurality of processors disposed therein, whereas, such processor or processors may be physical or virtual in nature), a management node that is located either in, on, or along the roadway or at a central location, or other computing systems, which might include, but are not limited to, an IoT management node (that is either located within the vehicle, located at a customer premises associated with an owner of the vehicle, located at a business premises associated with a company that owns or operates the vehicle, or located at a service provider facility associated with a service provider that provides services to the owner of the vehicle), one or more roadway-embedded IoT management nodes, one or more municipal, state, federal, or private entity IoT management nodes, a computing system disposed at a vehicle traffic control center, a server computer that is remote from the vehicle, a cloud computing system, a distributed computing system that integrates computing resources from two or more IoT-capable devices, or a combination of two or more of these computing systems, and/or the like.

Merely by way of example, in some cases, the IoT-capable sensors for implementing smart roadway functionality might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more other sensors, and/or the like. In some cases, the one or more other sensors might include, but are not limited to, one or more communications signal detectors, one or more seismic sensors, one or more weather station sensors, one or more moisture sensors, one or more wind sensors, or one or more particulate sensors, one or more impact sensors, one or more stress sensors, one or more location sensors, and/or the like. In some instances, the one or more IoT-capable sensors might further comprise IoT-capable sensors (which are described in detail above, for example) in each of one or more vehicles travelling on the roadway. In some cases, the one or more structural integrity sensors might include, without limitation, at least one of two or more global positioning system sensors or two or more relative position sensors, where the sensor data from these sensors might comprise data indicating a change in position of one structural integrity sensor relative to another structural integrity sensor beyond a predetermined threshold amount, thereby indicating that there might be damage to the roadway.

In some embodiments, the IoT-capable devices for implementing smart roadway functionality might include one or more of the aforementioned IoT-capable sensors and/or might further include, without limitation, one or more power generation nodes, one or more battery charging nodes, one or more communications systems, one or more traffic control signal devices, one or more street lamps, one or more dynamic lane change markers, one or more vehicular components in each of one or more vehicles travelling on the roadway (including, but not limited to, a vehicle computer, a vehicle engine, an ETC system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), a WAP, and/or other IoT-capable devices. In some cases, the other IoT-capable devices might include, without limitation, one or more air purifiers, one or more air filters, or one or more electrostatic particulate collecting tools, a fire suppression system, one or more lights (e.g., LEDs, indicator lights, warning lights, etc.), and/or the like.

According to some embodiments, the population area might comprise a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, or the like (collectively referred to herein as "a population area," "a smart city," or the like). In some embodiments, the computing system for implementing smart city functionality might include, without limitation, at least one of a central node (or a single processor or a plurality of processors disposed therein, whereas, such processor or processors may be physical or virtual in nature), a management node that is located within at least a portion of the population area, or other computing systems, which might include, but are not limited to, an IoT management node (that is located at a service provider facility associated with a service provider that provides services to at least portions of the population area), one or more roadway-embedded IoT management nodes, one or more municipal, state, federal, or private entity IoT management nodes, a computing system disposed at a vehicle traffic control center, a server computer that serves the population area, a server computer that is remote from the population area, a cloud computing system, a distributed computing system that integrates computing resources from two or more IoT-capable devices, or a combination of two or more of these computing systems, and/or the like.

Merely by way of example, in some aspects, the IoT-capable sensors for implementing smart city functionality might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more weather sensors, one or more motion sensors, one or more structural integrity sensors, one or more pressure sensors, one or more air quality sensors, one or more other sensors, and/or the like. In some cases, the one or more other sensors might include, but are not limited to, one or more communications signal detectors, one or more seismic sensors, one or more weather station sensors, one or more moisture sensors, one or more humidity sensors, one or more wind sensors, or one or more particulate sensors, one or more impact sensors, one or more stress sensors, one or more location sensors, and/or the like. In some instances, the one or more IoT-capable sensors might further comprise IoT-capable sensors (which are described in detail above, for example) in each of one or more vehicles travelling on the roadway. In some cases, the one or more structural integrity sensors might include, without limitation, at least one of two or more global positioning system sensors or two or more relative position sensors that are embedded in or disposed on one or more exterior surfaces of at least one of portions of one or more roadways (including, but not limited to, at least one of a local road, a main road, a highway, an airport apron, an airport ramp, an airport runway, a canal, a lock, or a waterway, and/or the like), portions of one or more public pathways (e.g., sidewalks, trails, public moving pathways, public escalators, public elevators, etc.), portions of one or more buildings (e.g., government buildings, other public buildings, etc.), portions of one or more public centers, portions of one or more airport terminal buildings, portions of one or more airport hangars and service buildings, portions of one or more railway facilities, portions of one or more railway tracks, portions of one or more marine ports, portions of one or more public transit structures, portions of one or more utility structures, portions of one or more public monuments or public art pieces, bridges, tunnels, and/or the like, where the sensor data from these sensors 1210e might comprise data indicating a change in position of one structural integrity sensor relative to another structural integrity sensor beyond a predetermined threshold amount, thereby indicating that there might be damage to corresponding at least one of one or more roadways, one or more public pathways, one or more buildings, one or more public centers, one or more airport terminal buildings, one or more airport hangars and service buildings, one or more railway facilities, one or more railway tracks, one or more marine ports, one or more public transit structures, one or more utility structures, one or more public monuments or public art pieces, bridges, tunnels, and/or the like. According to some embodiments, the type of travel path may vary along the traveled path, which might be at least one of asphalt path, concrete path, crushed rock path, bridge, railway crossing, runway, and/or the like, each with specific sensors to accommodate the differences in each type of travel path and/or to accommodate a change or transition in physical traveled path characteristics when two or more types of travel path abut each other (which might require one or more changes in communication technologies due to the characteristics of the changing physical travel path).

In some embodiments, the IoT-capable devices for implementing smart city functionality might include one or more of the aforementioned IoT-capable sensors and/or might further include, without limitation, one or more power generation nodes, one or more battery charging nodes, one or more communications systems, one or more traffic control signal devices, one or more street lamps, one or more dynamic lane change markers, one or more vehicle systems or vehicular components in each of one or more vehicles travelling on the roadway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public transit vehicle systems in each of one or more public transit vehicles travelling on the roadway, waterway, and/or railway (including, but not limited to, a vehicle computer, a vehicle engine, an ETC system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public display devices (e.g., electronic billboards, digital public signs, public televisions, public monitors, public touchscreen interface displays, public directories, and/or the like), one or more power distribution systems, one or more railway systems (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices associated with users who are currently located in the population area, one or more cleaning systems, one or more grounds-keeping systems, one or more emergency (response) systems, one or more transceivers, a WAP, and/or other IoT-capable devices. In some cases, the other IoT-capable devices might include, without limitation, a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, a data port, one or more building climate control systems, one or more public transport climate control systems, one or more air purifiers, one or more air filters, or one or more electrostatic particulate collecting tools, a fire suppression system, one or more lights (e.g., reading lights, LEDs, indicator lights, warning lights, etc.), and/or the like.

In some aspects, two or more of the smart home, building, or customer premises functionality, the smart vehicle functionality, the smart roadway functionality, and/or the smart city functionality might be implemented in conjunction, perhaps in an integrated manner to expand upon and otherwise enhance the overall smart environment functionality to provide seamless IoT functionality throughout the various living spaces.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, Internet of Things ("IoT") technology, machine-to-machine communication, and/or the like. In other aspects, certain embodiments, can improve the functioning of user equipment or systems themselves (e.g., automated home systems, IoT device networks, IoT devices, IoT systems, human interface devices, vehicle systems, roadway integration systems, municipal operations systems, etc.), for example, by autonomously analyzing sensor data from one or more (in some cases, two or more) IoT-capable sensors/devices to determine actions to be taken, by autonomously identifying one or more devices (e.g., household devices associated with a customer premises; vehicular components associated with a vehicle; devices disposed in, on, or along a roadway; devices disposed throughout a population area; etc.) for performing the determined actions to be taken, and by autonomously controlling each of the identified one or more devices to perform tasks based on the determined actions to be taken, thereby implementing smart environment functionality (e.g., smart home, building, or customer premises functionality, smart vehicle functionality, smart roadway functionality, smart city functionality, and so on), and/or the like. In particular, to the extent any abstract concepts are present in the various embodiments, those concepts can be implemented as described herein by devices, software, systems, and methods that involve specific novel functionality (e.g., steps or operations), such as autonomously analyzing sensor data from one or more (in some cases, two or more) IoT-capable sensors/devices to determine actions to be taken, by autonomously identifying one or more devices for performing the determined actions to be taken, and by autonomously controlling each of the identified one or more devices to perform tasks based on the determined actions to be taken, which improves the interaction amongst IoT-capable devices and sensors disposed within various environments and improves the interaction between the computing systems and the various IoT devices in the various environments, improves the functionalities of other devices and systems in the various environments, and/or the like, to name a few examples, that extend beyond mere conventional computer processing operations. These functionalities can produce tangible results outside of the implementing computer system, including, merely by way of example, improved functionality of devices and systems disposed in the various environments, improved user experience with IoT devices, improved lifestyle experience of the user with respect to connected devices in the user's life in the home or customer premises, in the vehicles, on the roadways, and in the city/population area in which the user lives, and/or the like, at least some of which may be observed or measured by customers and/or service providers.

Smart Home, Building, or Customer Premises Functionality

In an aspect, a method might comprise receiving, with a computing system, at least one first sensor data from each of two or more Internet of Things ("IoT")-capable devices via machine-to-machine communications, each of the two or more IoT-capable devices comprising one or more first sensors that collect the at least one first sensor data. The method might also comprise analyzing, with the computing system, the at least one first sensor data to determine one or more first actions to be taken and identifying, with the computing system, one or more household devices associated with a customer premises for performing the determined one or more first actions to be taken, based on the at least one first sensor data from each of the two or more IoT-capable devices. The method might further comprise autonomously controlling, with the computing system, each of the identified one or more household devices to perform one or more tasks, based on the determined one or more first actions to be taken.

In some embodiments, autonomously controlling, with the computing system, each of the identified one or more household devices to perform one or more tasks might comprise sending, with the computing system, one or more first control instructions to each of the identified one or more household devices to perform the one or more tasks, based on the determined one or more first actions to be taken.

In some cases, the computing system might comprise one of a single processor disposed within an IoT human interface device, a plurality of processors disposed within the IoT human interface device, an IoT management node, a server computer remote from the customer premises, a cloud computing system, a distributed computing system that integrates computing resources from two or more IoT-capable devices, or a combination of two or more of these computing systems, and/or the like.

In some instances, receiving the at least one first sensor data from each of the two or more IoT-capable devices via machine-to-machine communications might comprise receiving, with the computing system, at least one first sensor data from each of the two or more IoT-capable devices via machine-to-machine communications, via one or more first application programming interfaces ("APIs") established between the computing system and each of the two or more IoT-capable devices. In some embodiments, autonomously controlling, with the computing system, each of the identified one or more household devices to perform one or more tasks might comprise autonomously controlling, with the computing system, each of the identified one or more household devices, via one or more second APIs established between the computing system and each of the one or more household devices. In some cases, the at least one first sensor data that are received from each of the two or more IoT-capable devices each might comprise sensor data that exceeds a predetermined threshold for each corresponding type of sensor, wherein sensor data that do not exceed the predetermined threshold for each corresponding type of sensor are prevented from being sent to the computing system.

According to some embodiments, autonomously controlling, with the computing system, each of the identified one or more household devices to perform one or more tasks might comprise autonomously controlling, with the computing system, each of the identified one or more household devices to regulate indoor temperature in one or more rooms in the customer premises. In some cases, the one or more first sensors of each of the two or more IoT-capable devices might each comprise one or more conventional thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms, or one or more humidity sensors in at least one of the one or more rooms, and/or the like. The one or more household devices might comprise one or more of a furnace, an air conditioner, one or more automated window opening or closing systems, one or more automated door opening or closing systems, one or more automated skylight opening or closing systems, one or more automated window covering systems, one or more humidifiers, one or more dehumidifiers, or one or more ventilation fans, and/or the like.

In some embodiments, autonomously controlling, with the computing system, each of the identified one or more household devices to perform one or more tasks might comprise autonomously controlling, with the computing system, each of the identified one or more household devices to perform at least one of grounds-keeping or tending plant life in or around the customer premises. In some instances, the one or more first sensors of the two or more IoT-capable devices might comprise sensors monitoring at least one of one or more portions of customer premises lawn, one or more indoor plants, one or more outdoor plants, one or more shrubs, one or more bushes, or one or more trees, and/or the like. In some cases, the one or more first sensors of the two or more IoT-capable devices might each comprise one or more moisture sensors, one or more lawn height detectors, one or more nitrogen level sensors, one or more phosphate level sensors, one or more potassium level sensors, one or more leaf color detectors, one or more wind sensors, one or more indoor solar light sensors, one or more outdoor solar light sensors, one or more outdoor wind sensors, one or more neighborhood weather station sensors, one or more regional weather station sensors, one or more motion detectors detecting proximity of people or animals, or one or more humidity sensors, and/or the like. The one or more household devices might comprise one or more of one or more automated lawn mowers, one or more automated trimmers, one or more sprinkler systems, one or more fertilizer dispensers, or one or more animal deterrent systems, and/or the like.

Merely by way of example, in some instances, autonomously controlling, with the computing system, each of the identified one or more household devices to perform one or more tasks might comprise autonomously controlling, with the computing system, each of the identified one or more household devices to clear snow that has accumulated on at least one pathway. In some cases, the at least one pathway might comprise at least one of one or more outdoor walkways, one or more outdoor stairways, one or more driveways, or one or more roadways, and/or the like. The one or more first sensors of the two or more IoT-capable devices might comprise sensors monitoring snow accumulation on the at least one pathway. The one or more first sensors of the two or more IoT-capable devices might each, in some instances, comprise one or more moisture sensors, one or more snow accumulation sensors, one or more cameras, one or more temperature sensors, one or more wind sensors, one or more outdoor solar light sensors, one or more neighborhood weather station sensors, one or more regional weather station sensors, one or more motion detectors detecting proximity of people or animals, or one or more humidity sensors, and/or the like. The one or more household devices might comprise one or more of one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, or one or more drones with mounted heat lamps, and/or the like.

In some embodiments, autonomously controlling, with the computing system, each of the identified one or more household devices to perform one or more tasks might comprise autonomously controlling, with the computing system, each of the identified one or more household devices to clean the customer premises. In some instances, the one or more first sensors of the two or more IoT-capable devices might comprise sensors monitoring accumulation of at least one of dust, dirt, or dander on at least one of one or more furniture surfaces, one or more flooring surfaces, one or more wall surfaces, one or more ceiling surfaces, one or more stairway surfaces, one or more appliance surfaces, one or more lighting surfaces, one or more electronic device surfaces, one or more windows, one or more doors, one or more window coverings, one or more cabinets, one or more handles, one or more decorations, or one or more mirrors, and/or the like. The one or more first sensors of the two or more IoT-capable devices might each comprise two or more of one or more moisture sensors, one or more cameras, one or more motion detectors detecting proximity of people or animals, one or more humidity sensors, one or more air quality sensors, one or more particulate sensors, one or more optical particulate sensors, or one or more electrostatic particulate sensors, and/or the like. In some cases, the one or more household devices might comprise one or more of one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, or one or more electrostatic particulate collecting tools, and/or the like.

According to some embodiments, autonomously controlling, with the computing system, each of the identified one or more household devices to perform one or more tasks might comprise autonomously controlling, with the computing system, each of the identified one or more household devices to perform laundry tasks. In some instances, the one or more first sensors of the two or more IoT-capable devices might each comprise one or more moisture sensors, one or more object position sensors, one or more cameras, one or more motion detectors detecting proximity of people or animals, one or more particulate sensors, one or more optical particulate sensors, or one or more electrostatic particulate sensors, and/or the like. The one or more household devices might, in some cases, comprise one or more of a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, or one or more drones with clothes hanging tool, and/or the like.

In some instances, autonomously controlling, with the computing system, each of the identified one or more household devices to perform one or more tasks might comprise autonomously controlling, with the computing system, each of the identified one or more household devices to implement emergency response measures in response to at least one of fire or gas contamination at the customer premises. The one or more first sensors of the two or more IoT-capable devices might each comprise one or more temperature sensors, one or more air quality sensors, one or more flame detectors, one or more carbon monoxide sensors, one or more smoke detectors, one or more airflow sensors, one or more humidity sensors, one or more cameras, or one or more motion detectors, and/or the like. In some cases, the one or more household devices might comprise one or more of a fire suppression system, one or more telephone systems, a home security system, one or more ventilation fans, a furnace, an air conditioner, one or more emergency exit markers, one or more exit route markers, one or more speakers, one or more display devices, one or more lights, one or more automated window opening or closing systems, one or more automated door opening or closing systems, one or more automated skylight opening or closing systems, or one or more fire suppression drones, and/or the like.

In some embodiments, autonomously controlling, with the computing system, each of the identified one or more household devices to perform one or more tasks might comprise autonomously controlling, with the computing system, each of the identified one or more household devices to implement noise dampening measures in response to noise at the customer premises. In some instances, the one or more first sensors of the two or more IoT-capable devices might each comprise one or more sound amplitude sensors, one or more sound propagation detectors, one or more frequency sensors, one or more airflow sensors, one or more temperature sensors, or one or more humidity sensors, and/or the like. The one or more household devices might comprise one or more of one or more ventilation fans, a furnace, an air conditioner, one or more speakers, or one or more white noise generators, and/or the like.

According to some embodiments, the two or more IoT-capable devices are separate from the computing system, the two or more IoT-capable devices comprising at least two of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, one or more exercise equipment, or an IoT human interface device, and/or the like.

In some instances, the one or more first sensors of the two or more IoT-capable devices might each comprise at least one of one or more temperature sensors, one or more light sensors, one or more humidity sensors, one or more motion sensors, one or more air flow sensors, one or more air quality sensors, one or more carbon monoxide sensors, one or more smoke detectors, one or more water leak detectors, one or more contact sensors, one or more audio sensors, one or more accelerometers, one or more proximity sensors, one or more biometrics sensors, one or more location sensors, one or more radiation sensors, one or more telecommunications signal sensors, or one or more cameras, and/or the like.

In another aspect, a system might comprise two or more Internet of Things ("IoT")-capable devices, a computing system, and one or more household devices associated with the customer premises. The two or more IoT-capable devices might each comprise one or more first sensors, a first transceiver, at least one first processor, and a first non-transitory computer readable medium communicatively coupled to the at least one first processor. The first non-transitory computer readable medium might have stored thereon computer software comprising a first set of instructions that, when executed by the at least one first processor, causes the IoT-capable device to: receive at least one first sensor data from the one or more first sensors and send the at least one first sensor data to a computing system via machine-to-machine communications, via the first transceiver. The computing system might comprise a second transceiver, at least one second processor, and a second non-transitory computer readable medium communicatively coupled to the at least one second processor. The second non-transitory computer readable medium might have stored thereon computer software comprising a second set of instructions that, when executed by the at least one second processor, causes the computing system to: receive the at least one first sensor data from each of the two or more IoT-capable devices via machine-to-machine communications via the second transceiver; analyze the at least one first sensor data to determine one or more first actions to be taken; identify one or more household devices associated with a customer premises for performing the determined one or more first actions to be taken, based on the at least one first sensor data from each of the two or more IoT-capable devices; and autonomously control each of the identified one or more household devices to perform one or more tasks, based on the determined one or more first actions to be taken, by sending control instructions to each of the identified one or more household devices. The one or more household devices might each comprise a third transceiver, at least one third processor, and a third non-transitory computer readable medium communicatively coupled to the at least one third processor. The third non-transitory computer readable medium might have stored thereon computer software comprising a third set of instructions that, when executed by the at least one third processor, causes the household device to: receive the control instructions from the computing system and perform one or more tasks of the household device based on the control instructions.

According to some embodiments, receiving the at least one first sensor data from each of two or more IoT-capable devices via machine-to-machine communications might comprise receiving the at least one first sensor data from each of two or more IoT-capable devices via machine-to-machine communications, via one or more application programming interfaces ("APIs") established between the computing system and each of the two or more IoT-capable devices. In some cases, autonomously controlling each of the identified one or more household devices to perform one or more tasks might comprise autonomously controlling each of the identified one or more household devices, via one or more second APIs established between the computing system and each of the one or more household devices.

In some embodiments, the first set of instructions, when executed by the at least one first processor, might further cause the IoT-capable device to: determine whether at least one first sensor data from the one or more first sensors exceeds a predetermined threshold for each corresponding type of sensor; wherein sending the at least one first sensor data to the computing system via machine-to-machine communications, via the first transceiver, might comprise sending the at least one first sensor data to the computing system via machine-to-machine communications, via the first transceiver, in response to a determination that the at least one first sensor data from the one or more first sensors exceeds the predetermined threshold for each corresponding type of sensor; and in response to a determination that at least one second sensor data from the one or more first sensors does not exceed the predetermined threshold for at least one corresponding type of sensor, prevent the at least one second sensor data from being sent to the computing system.

In some instances, the two or more IoT-capable devices are separate from the computing system, the two or more IoT-capable devices comprising at least two of one or more sensor devices, one or more household appliances, one or more kitchen appliances, one or more lighting systems, one or more automated door locking systems, one or more automated door opening or closing systems, one or more automated window locking systems, one or more automated window opening or closing systems, one or more smart windows, one or more window covering control systems, one or more solar cells, one or more customer premises security systems, one or more customer premises environmental control systems, one or more electrical outlets, one or more power strips, one or more dimmer switches, one or more data ports, one or more display devices, one or more clocks, one or more sprinkler systems, one or more vehicles, one or more mobile user devices, one or more media recording or playback devices, one or more medical devices, one or more fitness trackers, one or more exercise equipment, or an IoT human interface device, and/or the like.

In yet another aspect, an apparatus might comprise one or more first processors and a non-transitory computer readable medium communicatively coupled with the one or more first processors. The non-transitory computer readable medium might have stored thereon computer software comprising a set of instructions that, when executed by the one or more first processors, causes the apparatus to: receive at least one first sensor data from each of two or more Internet of Things ("IoT")-capable devices via machine-to-machine communications, each of the two or more IoT-capable devices comprising one or more first sensors that collect the at least one first sensor data; analyze the at least one first sensor data to determine one or more first actions to be taken; identify one or more household devices associated with a customer premises for performing the determined one or more first actions to be taken, based on the at least one first sensor data from each of the two or more IoT-capable devices; and autonomously control each of the identified one or more household devices to perform one or more tasks, based on the determined one or more first actions to be taken.

In some cases, the apparatus might be one of an IoT human interface device, an IoT management node, a server computer remote from the IoT human interface device, or a distributed computing system that integrates computing resources from two or more IoT-capable devices, and/or the like. In some instances, autonomously controlling each of the identified one or more household devices to perform one or more tasks might comprise sending one or more first control instructions to each of the identified one or more household devices to perform the one or more tasks, based on the determined one or more first actions to be taken. According to some embodiments, receiving at least one first sensor data from each of the two or more IoT-capable devices via machine-to-machine communications might comprise receiving at least one first sensor data from each of the two or more IoT-capable devices via machine-to-machine communications, via one or more application programming interfaces ("APIs") established between the computing system and each of the two or more IoT-capable devices.

Smart Vehicle Functionality

In an aspect, a method might comprise receiving, with a computing system, at least one first sensor data from each of one or more Internet of Things ("IoT")-capable devices via machine-to-machine communications, each of the one or more IoT-capable devices comprising one or more first sensors that collect the at least one first sensor data. The method might also comprise analyzing, with the computing system, the at least one first sensor data to determine one or more first actions to be taken and identifying, with the computing system, one or more vehicular components associated with a vehicle for performing the determined one or more first actions to be taken, based on the at least one first sensor data from each of the one or more IoT-capable devices. The method might further comprise autonomously controlling, with the computing system, each of the identified one or more vehicular components to perform one or more tasks, based on the determined one or more first actions to be taken.

In some embodiments, autonomously controlling, with the computing system, each of the identified one or more vehicular components to perform the one or more tasks might comprise sending, with the computing system, one or more first control instructions to each of the identified one or more vehicular components to perform the one or more tasks, based on the determined one or more first actions to be taken. In some instances, the computing system might comprise one of a single processor disposed within the vehicle, a plurality of processors disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a server computer remote from the vehicle, a cloud computing system, a distributed computing system that integrates computing resources from one or more IoT-capable devices, or a combination of two or more of these computing systems, and/or the like.

In some cases, receiving the at least one first sensor data from each of the one or more IoT-capable devices via machine-to-machine communications might comprise receiving, with the computing system, at least one first sensor data from each of the one or more IoT-capable devices via machine-to-machine communications, via one or more first application programming interfaces ("APIs") established between the computing system and each of the one or more IoT-capable devices. In some instances, autonomously controlling, with the computing system, each of the identified one or more vehicular components to perform the one or more tasks might comprise autonomously controlling, with the computing system, each of the identified one or more vehicular components, via one or more second APIs established between the computing system and each of the one or more vehicular components. In some embodiments, the at least one first sensor data that are received from each of the one or more IoT-capable devices each comprises sensor data that exceeds a predetermined threshold for each corresponding type of sensor, wherein sensor data that do not exceed the predetermined threshold for each corresponding type of sensor are prevented from being sent to the computing system.

According to some embodiments, the identified one or more vehicular components might comprise at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, or a vehicle speaker system, and/or the like. In some cases, the one or more IoT-capable devices might comprise at least one of a vehicle camera-based collision avoidance system, a vehicle radar-based proximity detection system, a vehicle lidar-based proximity detection system, a vehicle sonar-based proximity detection system, a location sensor, or a transceiver device in communication with a corresponding transceiver device in each of one or more nearby vehicles, and/or the like. In some embodiments, autonomously controlling, with the computing system, each of the identified one or more vehicular components to perform the one or more tasks might comprise autonomously controlling, with the computing system, at least one of the vehicle brake system, the vehicle gear system, the vehicle electronic throttle control system, the vehicle steering system, or the vehicle turn signal system to maintain at least a predetermined safe distance between the vehicle and any adjacent vehicles based at least in part on data from each of at least one of the vehicle camera-based collision avoidance system, the vehicle radar-based proximity detection system, the vehicle lidar-based proximity detection system, the vehicle sonar-based proximity detection system, or the transceiver device in communication with the corresponding transceiver device in each of the one or more nearby vehicles; and autonomously controlling, with the computing system, at least one of the vehicle heads-up display system, the vehicle digital instrument gauge cluster, the vehicle display device, or the vehicle speaker system to alert a driver of the vehicle in response to any necessary changes in operating the vehicle due to maintaining the at least the predetermined safe distance between the vehicle and any adjacent vehicles.

Merely by way of example, in some instances, the identified one or more vehicular components might comprise at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, a vehicle speaker system, a vehicle hazard light system, or a vehicle self-diagnostics system, and/or the like. The one or more IoT-capable devices might comprise at least one of a vehicle camera-based collision avoidance system, a vehicle radar-based proximity detection system, a vehicle lidar-based proximity detection system, a vehicle sonar-based proximity detection system, or a transceiver device in communication with a corresponding transceiver device in each of one or more nearby vehicles, and/or the like. According to some embodiments, autonomously controlling, with the computing system, each of the identified one or more vehicular components to perform one or more tasks might comprise autonomously controlling, with the computing system, at least one of the vehicle brake system, the vehicle gear system, the vehicle electronic throttle control system, the vehicle steering system, or the vehicle turn signal system to safely navigate the vehicle to a safe road-side location while avoiding collisions with other vehicles and any obstacles, based at least in part on data from the vehicle self-diagnostics system and data from each of at least one of the vehicle camera-based collision avoidance system, the vehicle radar-based proximity detection system, the vehicle lidar-based proximity detection system, the vehicle sonar-based proximity detection system, or the transceiver device in communication with the corresponding transceiver device in each of the one or more nearby vehicles; autonomously controlling, with the computing system, at least one of vehicle hazard light system or the transceiver device in communication with the corresponding transceiver device in each of the one or more nearby vehicles to alert other drivers and other vehicles of problems with operation of the vehicle; and autonomously controlling, with the computing system, at least one of the vehicle heads-up display system, the vehicle digital instrument gauge cluster, the vehicle display device, or the vehicle speaker system to alert a driver of the vehicle of the problems with the operation of the vehicle and status related to safely navigating the vehicle to a safe road-side location while avoiding collisions with other vehicles and any obstacles. In some cases, the identified one or more vehicular components might further comprise a vehicle communications system, and autonomously controlling, with the computing system, each of the identified one or more vehicular components to perform one or more tasks might further comprise autonomously controlling, with the computing system, the vehicle communications system to send at least one of a message to one of a towing company or a roadside assistance service to send a tow truck, a message to a vehicle servicing company regarding the problems with the operation of the vehicle and regarding the vehicle being en route, a message to emergency responders regarding the problems with the operation of the vehicle and location of the vehicle, or a message to one or more of friends or family members of occupants of the vehicle regarding the problems with the operation of the vehicle, the location of the vehicle, and status of the occupants of the vehicle, and/or the like.

In some embodiments, the identified one or more vehicular components might comprise at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, or a vehicle speaker system, and/or the like. The one or more IoT-capable devices might comprise at least one of a transceiver device in communication with a corresponding transceiver device in each of one or more nearby vehicles, a transceiver in communication with one or more roadway IoT-capable devices, or the one or more roadway IoT-capable devices, the one or more roadway IoT-capable devices comprising IoT-capable devices embedded in one or more of at least one roadway structure, at least one street lamp, at least one sidewalk structure, or at least one apparatus each mounted to one or more of the at least one roadway structure, the at least one street lamp, or the at least one sidewalk structure, and/or the like. According to some embodiments, autonomously controlling, with the computing system, each of the identified one or more vehicular components to perform one or more tasks might comprise autonomously controlling, with the computing system, at least one of the vehicle brake system, the vehicle gear system, the vehicle electronic throttle control system, the vehicle steering system, or the vehicle turn signal system to perform one of driving within a lane, changing lanes, entering a freeway, exiting a freeway, moving to a shoulder of a road, slowing the vehicle, accelerating the vehicle, or stopping the vehicle, and/or the like, each based on data from at least one of the transceiver in communication with the corresponding transceiver device in each of one or more nearby vehicles, the transceiver in communication with the one or more roadway IoT-capable devices, or the one or more roadway IoT-capable devices; and autonomously controlling, with the computing system, at least one of the vehicle heads-up display system, the vehicle digital instrument gauge cluster, the vehicle display device, or the vehicle speaker system to alert a driver of the vehicle in response to any necessary changes in operating the vehicle due to performing the one of driving within a lane, changing lanes, entering a freeway, exiting a freeway, moving to a shoulder of a road, slowing the vehicle, accelerating the vehicle, or stopping the vehicle, and/or the like.

In some instances, the identified one or more vehicular components might comprise at least one of a vehicle communications system or a transceiver in communication with an external IoT-capable device that is external to the vehicle. The one or more IoT-capable devices might comprise at least one of a speed sensor, one or more brake sensors, a location sensor, an air quality sensor, one or more cameras, one or more smoke detectors, one or more tire pressure sensors, an engine temperature sensor, a fuel level sensor, one or more fluid leak detectors, one or more proximity sensors, one or more occupant sensors, one or more impact sensors, one or more stress sensors, or one or more suspension system diagnostic sensors, and/or the like.

In another aspect, a system might comprise one or more Internet of Things ("IoT")-capable devices, a computing system, and one or more vehicular components associated with the vehicle. The one or more IoT-capable devices might each comprise one or more first sensors, a first transceiver, at least one first processor, and a first non-transitory computer readable medium communicatively coupled to the at least one first processor. The first non-transitory computer readable medium might have stored thereon computer software comprising a first set of instructions that, when executed by the at least one first processor, causes the IoT-capable device to: receive at least one first sensor data from the one or more first sensors and send the at least one first sensor data to a computing system via machine-to-machine communications, via the first transceiver. The computing system might comprise a second transceiver, at least one second processor, and a second non-transitory computer readable medium communicatively coupled to the at least one second processor. The second non-transitory computer readable medium might have stored thereon computer software comprising a second set of instructions that, when executed by the at least one second processor, causes the computing system to: receive the at least one first sensor data from each of the one or more IoT-capable devices via machine-to-machine communications via the second transceiver; analyze the at least one first sensor data to determine one or more first actions to be taken; identify one or more vehicular components associated with a vehicle for performing the determined one or more first actions to be taken, based on the at least one first sensor data from each of the one or more IoT-capable devices; and autonomously control each of the identified one or more vehicular components to perform one or more tasks, based on the determined one or more first actions to be taken, by sending control instructions to each of the identified one or more vehicular components. The one or more vehicular components associated with the vehicle might each comprise a third transceiver, at least one third processor, and a third non-transitory computer readable medium communicatively coupled to the at least one third processor. The third non-transitory computer readable medium might have stored thereon computer software comprising a third set of instructions that, when executed by the at least one third processor, causes the one or more vehicular components to: receive the control instructions from the computing system and perform one or more tasks of the vehicle based on the control instructions.

According to some embodiments, receiving the at least one first sensor data from each of the one or more IoT-capable devices via machine-to-machine communications might comprise receiving at least one first sensor data from each of the one or more IoT-capable devices via machine-to-machine communications, via one or more first application programming interfaces ("APIs") established between the computing system and each of the one or more IoT-capable devices. In some cases, autonomously controlling each of the identified one or more vehicular components to perform the one or more tasks might comprise autonomously controlling each of the identified one or more vehicular components, via one or more second APIs established between the computing system and each of the one or more vehicular components.

In some embodiments, the first set of instructions, when executed by the at least one first processor, might further cause the IoT-capable device to: determine whether at least one first sensor data from the one or more first sensors exceeds a predetermined threshold for each corresponding type of sensor; wherein sending the at least one first sensor data to the computing system via machine-to-machine communications, via the first transceiver, comprises sending the at least one first sensor data to the computing system via machine-to-machine communications, via the first transceiver, in response to a determination that the at least one first sensor data from the one or more first sensors exceeds the predetermined threshold for each corresponding type of sensor; and in response to a determination that at least one second sensor data from the one or more first sensors does not exceed the predetermined threshold for at least one corresponding type of sensor, prevent the at least one second sensor data from being sent to the computing system.

In some cases, the identified one or more vehicular components might comprise at least one of a vehicle communications system or a transceiver in communication with an external IoT-capable device that is external to the vehicle. The one or more IoT-capable devices might comprise at least one of a speed sensor, one or more brake sensors, a location sensor, an air quality sensor, one or more cameras, one or more tire pressure sensors, an engine temperature sensor, a fuel level sensor, one or more proximity sensors, one or more occupant sensors, one or more impact sensors, one or more stress sensors, or one or more suspension system diagnostic sensors, and/or the like. In some instances, the computing system might comprise one of a single processor disposed within the vehicle, a plurality of processors disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a server computer remote from the vehicle, a cloud computing system, a distributed computing system that integrates computing resources from one or more IoT-capable devices, or a combination of two or more of these computing systems, and/or the like.

In yet another aspect, an apparatus might comprise one or more first processors and a non-transitory computer readable medium communicatively coupled with the one or more first processors. The non-transitory computer readable medium might have stored thereon computer software comprising a set of instructions that, when executed by the one or more first processors, causes the apparatus to: receive at least one first sensor data from each of one or more Internet of Things ("IoT")-capable devices via machine-to-machine communications, each of the one or more IoT-capable devices comprising one or more first sensors that collect the at least one first sensor data; analyze the at least one first sensor data to determine one or more first actions to be taken; identify one or more vehicular components associated with a vehicle for performing the determined one or more first actions to be taken, based on the at least one first sensor data from each of the one or more IoT-capable devices; and autonomously control each of the identified one or more vehicular components to perform one or more tasks, based on the determined one or more first actions to be taken.

In some embodiments, the apparatus might be one of a processing device disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a server computer remote from the vehicle, or a distributed computing system that integrates computing resources from one or more IoT-capable devices, and/or the like.

In some cases, autonomously controlling each of the identified one or more vehicular components to perform the one or more tasks might comprise sending one or more first control instructions to each of the identified one or more vehicular components to perform the one or more tasks, based on the determined one or more first actions to be taken. According to some embodiments, receiving the at least one first sensor data from each of the one or more IoT-capable devices via machine-to-machine communications might comprise receiving at least one first sensor data from each of the one or more IoT-capable devices via machine-to-machine communications, via one or more first application programming interfaces ("APIs") established between the computing system and each of the one or more IoT-capable devices. In some instances, autonomously controlling each of the identified one or more vehicular components to perform the one or more tasks might comprise autonomously controlling each of the identified one or more vehicular components, via one or more second APIs established between the computing system and each of the one or more vehicular components.

Smart Roadway Functionality

In an aspect, a method might comprise receiving, with a computing system, at least one first sensor data from each of one or more first Internet of Things ("IoT")-capable devices of a plurality of IoT-capable devices via machine-to-machine communications, each of the one or more first IoT-capable devices comprising one or more first sensors that collect the at least one first sensor data (which data might be raw actual data or processed result data, or the like), each of the one or more first IoT-capable devices being embedded within a roadway structure of a roadway. The method might also comprise analyzing, with the computing system, the at least one first sensor data to determine one or more first actions to be taken and identifying, with the computing system, one or more devices for performing the determined one or more first actions to be taken, based on the at least one first sensor data from each of the one or more first IoT-capable devices. The method might further comprise autonomously controlling, with the computing system, each of the identified one or more devices to perform one or more tasks, based on the determined one or more first actions to be taken.

In some embodiments, autonomously controlling, with the computing system, each of the identified one or more devices to perform the one or more tasks might comprise sending, with the computing system, one or more first control instructions to each of the identified one or more devices to perform the one or more tasks, based on the determined one or more first actions to be taken. In some cases, the computing system might comprise one of a single processor disposed within a vehicle, a plurality of processors disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, an IoT management node disposed at one or more roadway service provider facilities associated with service providers that provide roadway services, a server computer remote from the vehicle, a roadway-embedded IoT management node, a plurality of roadway-embedded IoT management nodes, a municipal, state, federal, or private entity IoT management node, a plurality of municipal, state, federal, or private entity IoT management nodes, a computing system disposed at a vehicle traffic control center, a cloud computing system, a distributed computing system that integrates computing resources from plurality of IoT-capable devices, or a combination of two or more of these computing systems, and/or the like.

Merely by way of example, in some embodiments, the roadway might comprise at least one of a local road, a main road, a highway, an airport apron, an airport ramp, an airport runway, a canal, a lock, or a waterway, and/or the like. In some instances, the one or more first IoT-capable devices, which are embedded in the roadway structure of the roadway, might each comprise one of one or more communications signal detectors, one or more wireless access points, one or more pressure sensors, one or more temperature sensors, one or more motion sensors, one or more structural integrity sensors, one or more solar light sensors, one or more seismic sensors, one or more weather station sensors, one or more air quality sensors, one or more moisture sensors, one or more wind sensors, or one or more particulate sensors, and/or the like, a top surface of each first IoT-capable device being one of substantially level with a top surface of the roadway or below the top surface of the roadway. In some instances, at least one of the first IoT-capable device might be mounted on a side surface of a roadway structure that has a vertical component. In some cases, the one or more structural integrity sensors might comprise at least one of two or more global positioning system sensors or two or more relative position sensors, and the at least one first sensor data might comprise data indicating a change in position of one structural integrity sensor relative to another structural integrity sensor beyond a predetermined threshold amount. The identified one or more devices might comprise a communications system, and autonomously controlling, with the computing system, each of the identified one or more devices to perform one or more tasks might comprise autonomously controlling, with the computing system, the communications system to send a message to a repair crew to repair the roadway in response to the at least one first sensor data indicating a change in position of one structural integrity sensor relative to another structural integrity sensor beyond a predetermined threshold amount. In some instances, the computing system might be at least one of a roadway-embedded IoT management node, a plurality of roadway-embedded IoT management nodes, a municipal, state, federal, or private entity IoT management node, a plurality of municipal, state, federal, or private entity IoT management nodes, a computing system disposed at a vehicle traffic control center, a cloud computing system, or a distributed computing system that integrates computing resources from plurality of IoT-capable devices, and/or the like. In some cases, the plurality of IoT-capable devices might further comprise one or more second IoT-capable devices that are each disposed in one of a street lamp, a traffic control signal device, or an above-ground structure, and/or the like, and the one or more second IoT-capable devices might each comprise one of one or more communications signal detectors, one or more wireless access points, one or more temperature sensors, one or more solar light sensors, one or more weather station sensors, one or more air quality sensors, one or more humidity sensors, one or more moisture sensors, one or more wind sensors, or one or more particulate sensors, and/or the like. The implementation of such sensors may be as a primary service to said IoT system or as a secondary or redundant service to one or more existing management or services platforms that may or may not be integrated with said IoT system.

According to some embodiments, the one or more first IoT-capable devices might comprise at least one of one or more pressure sensors, one or more temperature sensors, or one or more motion sensors, and/or the like. In some cases, autonomously controlling, with the computing system, each of the identified one or more devices to perform one or more tasks might comprise autonomously controlling, with the computing system, each of the identified one or more devices to halt or reroute traffic based on a determination that a traffic congestion condition exists. In some instances, the identified one or more devices might comprise at least one of a navigation system disposed in one or more vehicles travelling on the roadway or one or more traffic control signal devices, and/or the like, and autonomously controlling, with the computing system, each of the identified one or more devices to halt or reroute traffic based on a determination that a traffic congestion condition exists might comprise autonomously controlling, with the computing system, each of the identified one or more devices to halt or reroute traffic based on a determination that a traffic congestion condition exists, by performing at least one of sending updated navigation instructions to the navigation system disposed in the one or more vehicles travelling on the roadway or sending control instructions to the one or more traffic control signal devices.

In some embodiments, the one or more first IoT-capable devices might comprise at least one of one or more pressure sensors, one or more temperature sensors, or one or more motion sensors, and/or the like. The plurality of IoT-capable devices might further comprises one or more second IoT-capable devices comprising at least one of a speedometer sensor, a vehicle navigation system, an electronic throttle control system, a braking system, a gear system, a steering system, or a vehicle turn signal system of each of one or more vehicles travelling on the roadway, and/or the like. The identified one or more devices might comprise at least one of the electronic throttle control system, the braking system, the gear system, the steering system, or the vehicle turn signal system, and/or the like of each of the one or more vehicles travelling on the roadway. In some cases, autonomously controlling, with the computing system, each of the identified one or more devices to perform one or more tasks might comprise autonomously controlling, with the computing system, each of the at least one of the electronic throttle control system, the braking system, the gear system, the steering system, or the vehicle turn signal system, and/or the like of each of the one or more vehicles travelling on the roadway to coordinate changes in travelling speed of the one or more vehicles (in some cases, to coordinate increasing the speed of the one or more vehicles to increase flow of traffic), while reducing or optimizing gaps between the one or more vehicles to predetermined safe distances, and releasing control of any of the one or more vehicles whose navigation system indicates its route includes the vehicle moving beyond a designated control portion of the roadway.

According to some embodiments, the one or more first IoT-capable devices might comprise at least one of one or more pressure sensors, one or more temperature sensors, one or more motion sensors, one or more location sensors, one or more impact sensors, or one or more stress sensors, and/or the like. The identified one or more devices might comprise a communications system, and autonomously controlling, with the computing system, each of the identified one or more devices to perform one or more tasks might comprise autonomously controlling, with the computing system, the communications system to send a message to each of one or more of a towing company to send a tow truck to a location of an accident or a message to emergency responders regarding details and location of the accident. In some cases, the computing system might autonomously control the communications system to further send a message to an insurance company or to one or more other persons identified by the vehicle operator. In some instances, the identified one or more devices might further comprise at least one of a navigation system disposed in one or more vehicles travelling on the roadway or one or more traffic control signal devices, and/or the like. In some cases, autonomously controlling, with the computing system, each of the identified one or more devices might further comprise autonomously controlling, with the computing system, each of the identified one or more devices to halt or reroute traffic around the location of the accident, by performing at least one of sending updated navigation instructions to the navigation system disposed in the one or more vehicles travelling on the roadway or sending control instructions to the one or more traffic control signal devices, and/or the like.

In some embodiments, the one or more first IoT-capable devices might comprise at least one of one or more pressure sensors, one or more temperature sensors, one or more motion sensors, or one or more location sensors, and/or the like. The identified one or more devices might comprise at least one of a navigation system disposed in one or more vehicles travelling on the roadway, a display device disposed in the one or more vehicles travelling on the roadway, a digital instrument gauge cluster disposed in the one or more vehicles travelling on the roadway, one or more traffic control signal devices, or a communications system, and/or the like. In some cases, autonomously controlling, with the computing system, each of the identified one or more devices to perform one or more tasks might comprise, based on a determination that one or more of at least one person or at least one animal is likely to move in a path of at least one of the one or more vehicles travelling on the roadway, autonomously controlling, with the computing system, the communications system to perform at least one of displaying an alert message on one or more of the navigation system, the display device, or the digital instrument gauge cluster that are disposed in the one or more vehicles travelling on the roadway or sending control instructions to an identified at least one traffic control signal device of the one or more traffic control signal devices that is located between the one or more vehicles and the one or more of the at least one person or the at least one animal, and/or the like.

According to some embodiments, autonomously controlling, with the computing system, each of the identified one or more devices to perform one or more tasks might comprise autonomously controlling, with the computing system, each of the identified one or more devices to dynamically change lane markers on the roadway to divert traffic around one of a construction zone, an accident area, a school zone, or a congested portion of traffic, and/or the like. In some cases, autonomously controlling, with the computing system, each of the identified one or more devices to perform one or more tasks might comprise autonomously controlling, with the computing system, each of the identified one or more devices to dynamically change lane markers on the roadway to perform one of creating one or more bicycle lanes when bicycles are detected on the roadway or creating one or more pedestrian crossing paths when at least one pedestrian is determined to likely cross the roadway, and/or the like.

Merely by way of example, in some instances, autonomously controlling, with the computing system, each of the identified one or more devices to perform one or more tasks might comprise, during non-peak times, autonomously controlling, with the computing system, each of the identified one or more devices to dynamically change lane markers on the roadway to change one or more roadway lanes into one or more street parking spots and, during peak times, autonomously controlling, with the computing system, each of the identified one or more devices to dynamically change lane markers on the roadway to change the one or more street parking spots back into the one or more roadway lanes, and/or the like. Alternatively, or additionally, in some cases, autonomously controlling, with the computing system, each of the identified one or more devices to perform one or more tasks might comprise, during non-peak times, autonomously controlling, with the computing system, each of the identified one or more devices to dynamically change lane markers on the roadway to reduce a number of lanes to control flow of traffic and, during peak times, autonomously controlling, with the computing system, each of the identified one or more devices to dynamically change lane markers on the roadway to increase the number of lanes to improve flow of traffic, and/or the like.

In some instances, the identified one or more devices might comprise two or more roadway-embedded wireless access points ("WAPs"), and autonomously controlling, with the computing system, each of the identified one or more devices to perform one or more tasks might comprise autonomously controlling, with the computing system, each of the two or more roadway-embedded WAPs to provide wireless communications connections to one or more wireless user devices in each of one or more vehicles travelling on the roadway and to provide wireless hand-off between nearby ones of the two or more roadway-embedded WAPs.

According to some embodiments, the identified one or more devices might comprise one or more power generation nodes embedded in the roadway, the one or more power generation nodes generating and providing power to at least one of one or more batteries or an electrical power grid interface. In some cases, autonomously controlling, with the computing system, each of the identified one or more devices to perform one or more tasks might comprise autonomously controlling, with the computing system, each of the one or more power generation nodes to transfer generated power to the at least one of the one or more batteries or the electrical power grid interface. In some instances, the one or more power generation nodes might comprise at least one of one or more piezoelectric transducers that generate power when vehicles are travelling on the roadway, one or more heat transducers that generate power when solar energy heats up the roadway or when friction is generated by vehicles travelling on the roadway, or one or more high-impact solar arrays that generate power from solar energy, and/or the like.

In some embodiments, the identified one or more devices might comprise one or more battery charging nodes embedded in the roadway or parking spots, the one or more battery charging nodes generating and providing power to at least one of one or more batteries of a vehicle. In some cases, autonomously controlling, with the computing system, each of the identified one or more devices to perform one or more tasks might comprise autonomously controlling, with the computing system, each of the one or more battery charging nodes to transfer generated power to the at least one of the one or more batteries of the vehicle.

In another aspect, a system might comprise one or more first Internet of Things ("IoT")-capable devices of a plurality of IoT-capable devices, a computing system, and one or more devices. The one or more first IoT-capable devices might be embedded within a roadway structure of a roadway. The one or more first IoT-capable devices might each comprise one or more first sensors, a first transceiver, at least one first processor, and a first non-transitory computer readable medium communicatively coupled to the at least one first processor. The first non-transitory computer readable medium might have stored thereon computer software comprising a first set of instructions that, when executed by the at least one first processor, causes the IoT-capable device to: receive at least one first sensor data from the one or more first sensors and send the at least one first sensor data to a computing system via machine-to-machine communications, via the first transceiver. The computing system might comprise a second transceiver, at least one second processor, and a second non-transitory computer readable medium communicatively coupled to the at least one second processor. The second non-transitory computer readable medium might have stored thereon computer software comprising a second set of instructions that, when executed by the at least one second processor, causes the computing system to: receive the at least one first sensor data from each of one or more first IoT-capable devices via machine-to-machine communications via the second transceiver; analyze the at least one first sensor data to determine one or more first actions to be taken; identify one or more devices for performing the determined one or more first actions to be taken, based on the at least one first sensor data from each of the one or more first IoT-capable devices; and autonomously control each of the identified one or more devices to perform one or more tasks, based on the determined one or more first actions to be taken, by sending control instructions to each of the identified one or more devices. The one or more devices might each comprise a third transceiver, at least one third processor, and a third non-transitory computer readable medium communicatively coupled to the at least one third processor. The third non-transitory computer readable medium might have stored thereon computer software comprising a third set of instructions that, when executed by the at least one third processor, causes the device to: receive the control instructions from the computing system and perform one or more tasks of the device based on the control instructions.

According to some embodiments, the first set of instructions, when executed by the at least one first processor, might further cause the IoT-capable device to: determine whether at least one first sensor data from the one or more first sensors exceeds a predetermined threshold for each corresponding type of sensor; wherein sending the at least one first sensor data to the computing system via machine-to-machine communications, via the first transceiver, might comprise sending the at least one first sensor data to the computing system via machine-to-machine communications, via the first transceiver, in response to a determination that the at least one first sensor data from the one or more first sensors exceeds the predetermined threshold for each corresponding type of sensor; and in response to a determination that at least one second sensor data from the one or more first sensors does not exceed the predetermined threshold for at least one corresponding type of sensor, prevent the at least one second sensor data from being sent to the computing system.

In some instances, the computing system might comprise one of a single processor disposed within a vehicle, a plurality of processors disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a remote server computer remote from the vehicle, a roadway-embedded IoT management node, a plurality of roadway-embedded IoT management nodes, a municipal, state, federal, or private entity IoT management node, a plurality of municipal, state, federal, or private entity IoT management nodes, a computing system disposed at a vehicle traffic control center, a cloud computing system, a distributed computing system that integrates computing resources from plurality of IoT-capable devices, or a combination of two or more of these computing systems, and/or the like.

In some embodiments, the roadway might comprise at least one of a local road, a main road, a highway, an airport apron, an airport ramp, an airport runway, a canal, a lock, or a waterway, and/or the like, and the identified one or more IoT-capable devices, which are embedded in the roadway structure of the roadway, might each comprise one of one or more communications signal detectors, one or more wireless access points, one or more pressure sensors, one or more temperature sensors, one or more motion sensors, one or more structural integrity sensors, one or more solar light sensors, one or more seismic sensors, one or more weather station sensors, one or more air quality sensors, one or more moisture sensors, one or more wind sensors, one or more particulate sensors, one or more power generation nodes, or one or more battery charging nodes, and/or the like, a top surface of each IoT-capable device being one of substantially level with a top surface of the roadway or below the top surface of the roadway.

In some cases, the identified one or more devices might comprise at least one of a communications system, one or more traffic control signal devices, or at least one of a navigation system, a display device, a digital instrument gauge cluster, an electronic throttle control system, a braking system, a gear system, a steering system, or a vehicle turn signal system of each of one or more vehicles travelling on the roadway, and/or the like.

In yet another aspect, an apparatus might comprise one or more first processors and a non-transitory computer readable medium communicatively coupled with the one or more first processors. The non-transitory computer readable medium might have stored thereon computer software comprising a set of instructions that, when executed by the one or more first processors, causes the apparatus to: receive at least one first sensor data from each of one or more first Internet of Things ("IoT")-capable devices of a plurality of IoT-capable devices via machine-to-machine communications, each of the one or more first IoT-capable devices comprising one or more first sensors that collect the at least one first sensor data, each of the one or more first IoT-capable devices being embedded within a roadway structure of a roadway; analyze the at least one first sensor data to determine one or more first actions to be taken; identify one or more devices for performing the determined one or more first actions to be taken, based on the at least one first sensor data from each of the one or more first IoT-capable devices; and autonomously control each of the identified one or more devices to perform one or more tasks, based on the determined one or more first actions to be taken.

In some embodiments, the apparatus might be one of a processor disposed within a vehicle, a plurality of processors disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a server computer remote from the vehicle, a roadway-embedded IoT management node, a plurality of roadway-embedded IoT management nodes, a municipal, state, federal, or private entity IoT management node, a plurality of municipal, state, federal, or private entity IoT management nodes, a computing system disposed at a vehicle traffic control center, or a distributed computing system that integrates computing resources from plurality of IoT-capable devices, and/or the like.

In some cases, autonomously controlling each of the identified one or more devices to perform the one or more tasks might comprise sending one or more first control instructions to each of the identified one or more devices to perform the one or more tasks, based on the determined one or more first actions to be taken.

In some instances, the roadway might comprise at least one of a local road, a main road, a highway, an airport apron, an airport ramp, an airport runway, a canal, a lock, or a waterway, and/or the like. The identified one or more first IoT-capable devices, which are embedded in the roadway structure of the roadway, might each comprise one of one or more communications signal detectors, one or more wireless access points, one or more pressure sensors, one or more temperature sensors, one or more motion sensors, one or more structural integrity sensors, one or more solar light sensors, one or more seismic sensors, one or more weather station sensors, one or more air quality sensors, one or more moisture sensors, one or more wind sensors, one or more particulate sensors, one or more power generation nodes, or one or more battery charging nodes, and/or the like, a top surface of each IoT-capable device being one of substantially level with a top surface of the roadway or below the top surface of the roadway.

According to some embodiments, the identified one or more devices might comprise at least one of a communications system, one or more traffic control signal devices, one or more roadway-embedded wireless access points ("WAPs"), one or more power generation nodes embedded in the roadway, or at least one of a navigation system, a display device, a digital instrument gauge cluster, an electronic throttle control system, a braking system, a gear system, a steering system, or a vehicle turn signal system of each of one or more vehicles travelling on the roadway, and/or the like.

Smart City Functionality

In an aspect, a method might comprise receiving, with a computing system, at least one first sensor data from each of one or more Internet of Things ("IoT")-capable devices of a plurality of IoT-capable devices disposed throughout a population area via machine-to-machine communications, each of the one or more IoT-capable devices comprising one or more first sensors that collect the at least one first sensor data. The method might also comprise analyzing, with the computing system, the at least one first sensor data to determine one or more first actions to be taken and identifying, with the computing system, one or more devices disposed within the population area for performing the determined one or more first actions to be taken, based on the at least one first sensor data from each of the one or more IoT-capable devices. The method might further comprise autonomously controlling, with the computing system, each of the identified one or more devices to perform one or more tasks, based on the determined one or more first actions to be taken.

In some embodiments, the population area might be one of a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, and/or the like. In some cases, the computing system might comprise one of an IoT management node disposed at a service provider facility associated with providing services to the population area, a municipal, state, federal, or private entity IoT management node, a plurality of municipal, state, federal, or private entity IoT management nodes, a computing system disposed at a vehicle traffic control center, a cloud computing system, a distributed computing system that integrates computing resources from plurality of IoT-capable devices, or a combination of two or more of these computing systems, and/or the like. In some cases, autonomously controlling, with the computing system, each of the identified one or more devices to perform the one or more tasks might comprise sending, with the computing system, one or more first control instructions to each of the identified one or more devices to perform the one or more tasks, based on the determined one or more first actions to be taken.

According to some embodiments, autonomously controlling, with the computing system, each of the identified one or more devices to perform one or more tasks might comprise autonomously controlling, with the computing system, each of the identified one or more devices to halt or reroute traffic around one of a construction zone, an accident area, a school zone, or a congested portion of traffic, and/or the like. In some cases, the identified one or more devices might comprise at least one of a navigation system disposed in each of one or more vehicles travelling on the roadway or one or more traffic control signal devices, and/or the like. Autonomously controlling, with the computing system, each of the identified one or more devices to halt or reroute traffic might comprise autonomously controlling, with the computing system, each of the identified one or more devices to halt or reroute traffic, by performing at least one of sending updated navigation instructions to the navigation system disposed in each of the one or more vehicles travelling on one or more roadways, sending control instructions to the one or more traffic control signal devices along the one or more roadways, or dynamically changing lane markers along the one or more roadways, and/or the like. In some instances, rerouting traffic might comprise at least two of rerouting a first set of vehicles along a first alternative path, rerouting a second set of vehicles along a second alternative path, or rerouting a third set of vehicles along a third alternative path, around the one of the construction zone, the accident area, the school zone, or the congested portion of traffic, and/or the like.

In some embodiments, the identified one or more devices might comprise at least one of a navigation system disposed in each of one or more vehicles travelling on the roadway, a navigation system disposed in each of one or more emergency response vehicles, one or more traffic control signal devices, one or more news media access devices, one or more user devices associated with each of one or more residents of the population area, one or more electronic billboards, one or more digital street signs, or one or more display devices disposed through the population area, and/or the like. The one or more IoT-capable devices might each comprise one of one or more pressure sensors, one or more temperature sensors, one or more motion sensors, one or more structural integrity sensors, one or more solar light sensors, one or more seismic sensors, one or more weather station sensors, one or more air quality sensors, one or more moisture sensors, one or more wind sensors, or one or more particulate sensors, and/or the like. In some instances, based on detection of signs of disaster comprising at least one of a tornado, flooding, lightning storms, hurricanes, blizzards, fires, smog, meteor impact, airplane crash, automobile accident, construction accident, train accident, building collapse, dam breach, or terrorist attack, and/or the like, autonomously controlling, with the computing system, each of the identified one or more devices to perform the one or more tasks might comprise autonomously controlling, with the computing system, each of the at least one of the navigation system disposed in each of the one or more vehicles travelling on the roadway, the navigation system disposed in each of the one or more emergency response vehicles, the one or more traffic control signal devices, the one or more news media access devices, the one or more user devices associated with each of the one or more residents of the population area, the one or more electronic billboards, the one or more digital street signs, or the one or more display devices disposed through the population area, and/or the like to direct emergency response teams to locations of the disaster while directing residents and other people away from the disaster. In some cases, the identified one or more devices might further comprise one or more dynamic lane change markers on one or more roadways, and/or the like, and autonomously controlling, with the computing system, each of the identified one or more devices to perform one or more tasks might further comprise autonomously controlling, with the computing system, the one or more dynamic lane change markers to perform at least one of creating one or more emergency lanes for the emergency response teams to travel along or changing existing lanes to direct traffic to travel on lanes other than the lanes along which the emergency response teams are determined to be likely to travel, and/or the like.

According to some embodiments, the one or more IoT-capable devices might comprise at least one of one or more pressure sensors, one or more temperature sensors, one or more motion sensors, one or more communications signal detectors, one or more user devices associated with one or more users, or one or more location sensors disposed in the one or more user devices, and/or the like. The identified one or more devices might comprise at least one of one or more street lamps, one or more traffic control signal devices, or one or more dynamic lane change markers on one or more roadways, and/or the like. In some instances, autonomously controlling, with the computing system, each of the identified one or more devices to perform one or more tasks might comprise performing corresponding at least one of autonomously controlling, with the computing system, the one or more street lamps to turn on above and ahead of a predicted path of each of the one or more users and to turn off a predetermined number of street lamps behind the predicted path of each of the one or more users; autonomously controlling, with the computing system, the one or more traffic control signal devices to stop cross traffic along the one or more roadways and allow pedestrian traffic along the predicted path of two or more users when the two or more users are determined to be likely to cross the one or more roadways; or autonomously controlling, with the computing system, the one or more dynamic lane change markers on the one or more roadways to dynamically change lane markers into cross-walk markers along the predicted path of the two or more users when the two or more users are determined to be likely to cross the one or more roadways; and/or the like. Each of the one or more users or each of the two or more users might be one of a pedestrian, a cyclist, a rider of other motor-less devices, or a rider of a low-power motored device, and/or the like.

In some embodiments, the one or more IoT-capable devices might comprise at least one of one or more pressure sensors, one or more temperature sensors, or one or more motion sensors, and/or the like. The identified one or more devices might comprise at least one of one or more street lamps, one or more traffic control signal devices, or one or more dynamic lane change markers on one or more roadways, and/or the like. In some cases, autonomously controlling, with the computing system, each of the identified one or more devices to perform one or more tasks might comprise performing corresponding at least one of autonomously controlling, with the computing system, the one or more street lamps to turn on above and ahead of a predicted path of each of one or more vehicles and to turn off a predetermined number of street lamps behind the predicted path of each of the one or more vehicles; autonomously controlling, with the computing system, the one or more traffic control signal devices to allow a greater number of vehicles to continue past an intersection based on the predicted path of each of the greater number of vehicles while stopping a lesser number of vehicles moving along a cross-direction of the intersection for a predetermined period based on the predicted path of each of the lesser number of vehicles; or autonomously controlling, with the computing system, the one or more dynamic lane change markers on the one or more roadways to dynamically change lane markers to control flow of the one or more vehicles along the one or more roadways; and/or the like.

Merely by way of example, in some cases, the one or more IoT-capable devices might comprise at least one of one or more pressure sensors, one or more temperature sensors, one or more motion sensors, or one or more location sensors disposed on one or more public transit vehicles, and/or the like. The identified one or more devices might comprise at least one of one or more display devices on public transit platforms or stops, one or more traffic control signal devices, one or more dynamic lane change markers on one or more roadways, one or more railway signaling systems, one or more railway track switches, one or more railway network control systems, or one or more railway power control systems, and/or the like. In some instances, autonomously controlling, with the computing system, each of the identified one or more devices to perform one or more tasks might comprise performing corresponding at least one of autonomously controlling, with the computing system, the one or more display devices on public transit platforms or stops to notify passengers of real-time schedules, status, and delays of public transit vehicles; autonomously controlling, with the computing system, at least one of the one or more traffic control signal devices or the one or more dynamic lane change markers on the one or more roadways to coordinate roadway-based public transit vehicles along the one or more roadways to service passengers while diverting the roadway-based public transit vehicles away from or around at least one of accident areas, construction zones, congested portions of traffic, or disaster areas, and/or the like; or autonomously controlling, with the computing system, at least one of the one or more railway signaling systems, the one or more railway track switches, the one or more railway network control systems, or the one or more railway power control systems, and/or the like to coordinate railway-based public transit vehicles along the one or more railway tracks to service passengers while diverting the railway-based public transit vehicles away from or around at least one of railway accident areas, railway construction zones, congested portions of track, or disaster areas. The railway-based public transit vehicles might comprise at least one of light rail commuter trains, regional commuter trains, trams, street cars, high speed trains, magnetic levitation trains, or subway trains, and/or the like.

According to some embodiments, the one or more IoT-capable devices might comprise at least one of one or more pressure sensors, one or more temperature sensors, one or more motion sensors, or one or more location sensors disposed on one or more railway trains, and/or the like. The identified one or more devices might comprise at least one of one or more display devices in an operator's cab of each of one or more railway trains, one or more display devices beside railway crossings, one or more alert devices along railway tracks, one or more railway signaling systems, one or more railway track switches, one or more railway network control systems, or one or more railway power control systems, and/or the like. In some cases, autonomously controlling, with the computing system, each of the identified one or more devices to perform one or more tasks might comprise performing at least one of autonomously controlling, with the computing system, the one or more display devices in the operator's cab of each of the one or more railway trains to display alerts regarding any roadway vehicles, people, animals, or obstructions near or along the railway tracks; autonomously controlling, with the computing system, at least one of the one or more display devices beside railway crossings or the one or more alert devices along railway tracks to alert nearby vehicles, people, or animals of oncoming trains, and/or the like; or autonomously controlling, with the computing system, at least one of the one or more railway signaling systems, the one or more railway track switches, the one or more railway network control systems, or the one or more railway power control systems to avoid any railway accidents; and/or the like.

In some embodiments, the identified one or more devices might comprise one or more power generation nodes, the one or more power generation nodes generating and providing power to at least one of one or more batteries or an electrical power grid interface. In some instances, autonomously controlling, with the computing system, each of the identified one or more devices to perform one or more tasks might comprise autonomously controlling, with the computing system, each of the one or more power generation nodes to transfer generated power to the at least one of the one or more batteries or the electrical power grid interface. In some cases, the one or more power generation nodes might comprise at least one of one or more piezoelectric transducers embedded in a roadway that generate power when vehicles are travelling on the roadway, one or more heat transducers embedded in the roadway that generate power when solar energy heats up the roadway or when friction is generated by vehicles travelling on the roadway, one or more high-impact solar arrays embedded in the roadway that generate power from solar energy, one or more piezoelectric transducers embedded in tracks of a railway that generate power when trains are travelling on the tracks, one or more heat transducers embedded in the tracks of the railway that generate power when solar energy heats up the tracks or when friction is generated by trains travelling on the tracks, one or more high-impact solar arrays embedded in between the tracks of the railway that generate power from solar energy, one or more solar arrays embedded in windows of one or more buildings in the population area that generate power from solar energy, or one or more solar arrays embedded on rooftops of one or more buildings in the population area that generate power from solar energy, wherein the roadway comprises at least one of a local road, a main road, a highway, an airport apron, an airport ramp, an airport runway, a canal, a lock, or a waterway, and/or the like.

According to some embodiments, the identified one or more devices might comprise one or more high-voltage power distribution switches, and autonomously controlling, with the computing system, each of the identified one or more devices to perform one or more tasks might comprise autonomously controlling, with the computing system, each of the one or more high-voltage power distribution switches to transfer electrical power from low usage portions of the population area to high usage portions of the population area.

In some embodiments, the one or more IoT-capable devices might comprise one or more pressure sensors, one or more temperature sensors, one or more solar light sensors, one or more seismic sensors, one or more weather station sensors, one or more air quality sensors, one or more moisture sensors, one or more wind sensors, or one or more particulate sensors that are at least one of embedded within one or more roadways, embedded within one or more walkways, disposed within exterior walls of one or more buildings, disposed on exterior windows of one or more buildings, disposed within rooftops of one or more buildings, disposed on one or more traffic control signal devices, disposed on one or more street lamps, disposed on one or more communications towers, disposed on one or more utility posts, disposed on one or more high voltage towers, or disposed in one or more vehicles, and/or the like. In some cases, autonomously controlling, with the computing system, each of the identified one or more devices to perform one or more tasks might comprise aggregating data from the one or more IoT-capable devices to generate at least one of one or more local weather maps, one or more regional weather maps, one or more national weather maps, one or more local pollution maps, one or more regional pollution maps, one or more national pollution maps, one or more local air quality maps, one or more regional air quality maps, one or more national air quality maps, one or more local traffic density maps, one or more regional traffic density maps, one or more national traffic density maps, one or more local pedestrian density maps, one or more regional pedestrian density maps, one or more national pedestrian density maps, one or more local construction area maps, one or more regional construction area maps, one or more national construction area maps, one or more local accident area maps, one or more regional accident area maps, or one or more national accident area maps, and/or the like.

According to some embodiments, the one or more first sensors of the one or more IoT-capable devices might comprise sensors monitoring at least one of one or more portions of public lawn areas, one or more public area indoor plants, one or more public area outdoor plants, one or more public area shrubs, one or more public area bushes, or one or more public area trees, and/or the like. The one or more first sensors of the one or more IoT-capable devices might each comprise one or more moisture sensors, one or more lawn height detectors, one or more nitrogen level sensors, one or more phosphate level sensors, one or more potassium level sensors, one or more leaf color detectors, one or more wind sensors, one or more indoor solar light sensors, one or more outdoor solar light sensors, one or more outdoor wind sensors, one or more local weather station sensors, one or more regional weather station sensors, one or more motion detectors detecting proximity of people or animals, or one or more humidity sensors, and/or the like. The identified one or more devices might comprise at least one of one or more user devices associated with grounds-keeping crew members, one or more automated lawn mowers, one or more automated trimmers, one or more sprinkler systems, one or more fertilizer dispensers, or one or more animal deterrent systems, and/or the like. In some instances, autonomously controlling, with the computing system, each of the identified one or more devices to perform one or more tasks might comprise autonomously controlling, with the computing system, the at least one of the one or more user devices associated with grounds-keeping crew members, the one or more automated lawn mowers, the one or more automated trimmers, the one or more sprinkler systems, the one or more fertilizer dispensers, or the one or more animal deterrent systems, and/or the like to coordinate irrigation and greens-keeping for the at least one of the one or more portions of public lawn areas, the one or more public area indoor plants, the one or more public area outdoor plants, the one or more public area shrubs, the one or more public area bushes, or the one or more public area trees, and/or the like.

In some embodiments, the one or more first sensors of the one or more IoT-capable devices might comprise sensors monitoring cleanliness of at least one of one or more portions of public parks, one or more public areas, one or more roadways, one or more walkways, one or more public buildings, one or more transportation terminals, one or more transportation platforms, or one or more transportation stops, and/or the like. The one or more first sensors of the one or more IoT-capable devices might each comprise one or more moisture sensors, one or more cameras, one or more motion detectors detecting proximity of people or animals, one or more humidity sensors, one or more air quality sensors, one or more particulate sensors, one or more optical particulate sensors, or one or more electrostatic particulate sensors, and/or the like. The identified one or more devices might comprise at least one of one or more user devices associated with cleaning crew members, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, or one or more electrostatic particulate collecting tools, and/or the like. In some cases, autonomously controlling, with the computing system, each of the identified one or more devices to perform one or more tasks might comprise autonomously controlling, with the computing system the at least one of the one or more user devices associated with cleaning crew members, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more street cleaners, one or more sidewalk cleaners, or one or more electrostatic particulate collecting tools, and/or the like to coordinate cleaning and maintenance for the at least one of the public parks, the one or more public areas, the one or more roadways, the one or more walkways, the one or more public buildings, the one or more transportation terminals, the one or more transportation platforms, or the one or more transportation stops, and/or the like.

In another aspect, a system might comprise one or more Internet of Things ("IoT")-capable devices of a plurality of IoT-capable devices disposed throughout a population area, a computing system, and one or more devices disposed within the population area. The one or more first IoT-capable devices might each comprise one or more first sensors, a first transceiver, at least one first processor, and a first non-transitory computer readable medium communicatively coupled to the at least one first processor. The first non-transitory computer readable medium might have stored thereon computer software comprising a first set of instructions that, when executed by the at least one first processor, causes the IoT-capable device to: receive at least one first sensor data from the one or more first sensors and send the at least one first sensor data to a computing system via machine-to-machine communications, via the first transceiver. The computing system might comprise a second transceiver, at least one second processor, and a second non-transitory computer readable medium communicatively coupled to the at least one second processor. The second non-transitory computer readable medium might have stored thereon computer software comprising a second set of instructions that, when executed by the at least one second processor, causes the computing system to: receive the at least one first sensor data from each of one or more IoT-capable devices via machine-to-machine communications via the second transceiver; analyze the at least one first sensor data to determine one or more first actions to be taken; identify one or more devices disposed within the population area for performing the determined one or more first actions to be taken, based on the at least one first sensor data from each of the one or more IoT-capable devices; and autonomously control each of the identified one or more devices to perform one or more tasks, based on the determined one or more first actions to be taken, by sending control instructions to each of the identified one or more devices. The one or more devices disposed within the population area might each comprise a third transceiver, at least one third processor, and a third non-transitory computer readable medium communicatively coupled to the at least one third processor. The third non-transitory computer readable medium might have stored thereon computer software comprising a third set of instructions that, when executed by the at least one third processor, causes the device to: receive the control instructions from the computing system and perform one or more tasks of the device based on the control instructions.

According to some embodiments, the first set of instructions, when executed by the at least one first processor, might further cause the IoT-capable device to: determine whether at least one first sensor data from the one or more first sensors exceeds a predetermined threshold for each corresponding type of sensor; wherein sending the at least one first sensor data to the computing system via machine-to-machine communications, via the first transceiver, might comprise sending the at least one first sensor data to the computing system via machine-to-machine communications, via the first transceiver, in response to a determination that the at least one first sensor data from the one or more first sensors exceeds the predetermined threshold for each corresponding type of sensor; and in response to a determination that at least one second sensor data from the one or more first sensors does not exceed the predetermined threshold for at least one corresponding type of sensor, prevent the at least one second sensor data from being sent to the computing system.

In some embodiments, the population area might be one of a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, and/or the like. In some instances, the computing system might comprise one of an IoT management node disposed at a service provider facility associated with providing services to the population area, a municipal, state, federal, or private entity IoT management node, a plurality of municipal, state, federal, or private entity IoT management nodes, a computing system disposed at a vehicle traffic control center, a cloud computing system, a distributed computing system that integrates computing resources from plurality of IoT-capable devices, or a combination of two or more of these computing systems, and/or the like.

In some cases, the identified one or more devices might comprise at least one of a navigation system disposed in each of one or more vehicles travelling on the roadway, a navigation system disposed in each of one or more emergency response vehicles, one or more street lamps, one or more traffic control signal devices, one or more dynamic lane change markers on one or more roadways, one or more news media access devices, one or more user devices associated with each of one or more residents of the population area, one or more electronic billboards, one or more digital street signs, one or more display devices disposed through the population area, one or more display devices on public transit platforms or stops, one or more power generation nodes, one or more high-voltage power distribution switches, one or more railway trains, one or more display devices beside railway crossings, one or more alert devices along railway tracks, one or more railway signaling systems, one or more railway track switches, one or more railway network control systems, one or more railway power control systems, one or more user devices associated with groundskeeping crew members, one or more automated lawn mowers, one or more automated trimmers, one or more sprinkler systems, one or more fertilizer dispensers, one or more animal deterrent systems, one or more user devices associated with cleaning crew members, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, or one or more electrostatic particulate collecting tools, and/or the like.

In yet another aspect, an apparatus might comprise one or more first processors and a non-transitory computer readable medium communicatively coupled with the one or more first processors. The non-transitory computer readable medium might have stored thereon computer software comprising a set of instructions that, when executed by the one or more first processors, causes the apparatus to: receive at least one first sensor data from each of one or more Internet of Things ("IoT")-capable devices of a plurality of IoT-capable devices disposed throughout a population area via machine-to-machine communications, each of the one or more IoT-capable devices comprising one or more first sensors that collect the at least one first sensor data; analyze the at least one first sensor data to determine one or more first actions to be taken; identify one or more devices disposed within the population area for performing the determined one or more first actions to be taken, based on the at least one first sensor data from each of the one or more IoT-capable devices; and autonomously control each of the identified one or more devices to perform one or more tasks, based on the determined one or more first actions to be taken.

In some embodiments, the apparatus might be one of an IoT management node disposed at a service provider facility associated with providing services to the population area, a municipal, state, federal, or private entity IoT management node, a plurality of municipal, state, federal, or private entity IoT management nodes, a computing system disposed at a vehicle traffic control center, or a distributed computing system that integrates computing resources from plurality of IoT-capable devices, and/or the like. In some cases, autonomously controlling each of the identified one or more devices to perform the one or more tasks might comprise sending one or more first control instructions to each of the identified one or more devices to perform the one or more tasks, based on the determined one or more first actions to be taken.

According to some embodiments, the population area might be one of a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, and/or the like.

In some instances, the identified one or more devices might comprise at least one of a navigation system disposed in each of one or more vehicles travelling on the roadway, a navigation system disposed in each of one or more emergency response vehicles, one or more street lamps, one or more traffic control signal devices, one or more dynamic lane change markers on one or more roadways, one or more news media access devices, one or more user devices associated with each of one or more residents of the population area, one or more electronic billboards, one or more digital street signs, one or more display devices disposed through the population area, one or more display devices on public transit platforms or stops, one or more power generation nodes, one or more high-voltage power distribution switches, one or more railway trains, one or more display devices beside railway crossings, one or more alert devices along railway tracks, one or more railway signaling systems, one or more railway track switches, one or more railway network control systems, one or more railway power control systems, one or more user devices associated with groundskeeping crew members, one or more automated lawn mowers, one or more automated trimmers, one or more sprinkler systems, one or more fertilizer dispensers, one or more animal deterrent systems, one or more user devices associated with cleaning crew members, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, or one or more electrostatic particulate collecting tools, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

Figure 2:
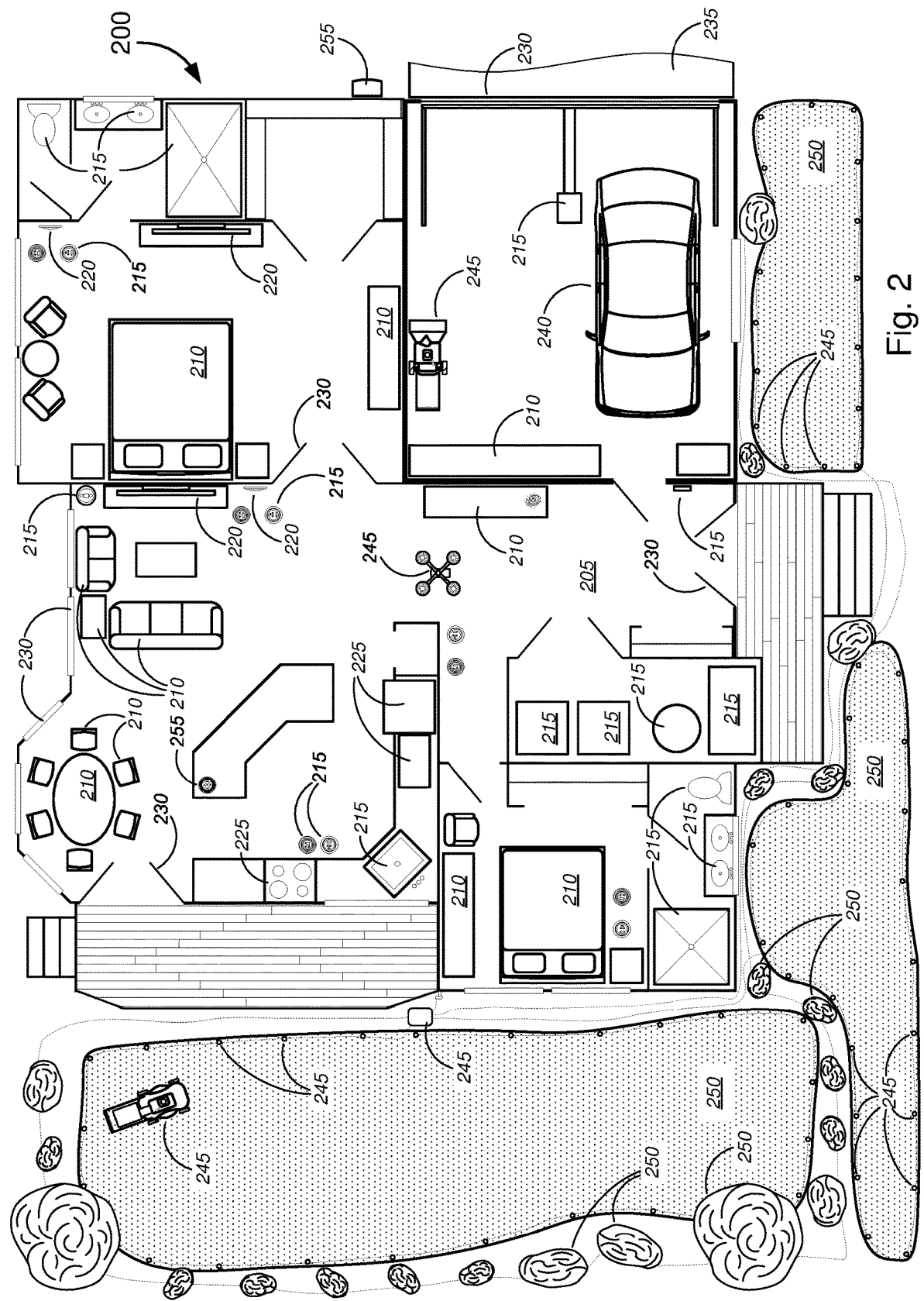
FIGS. 2 and 3 are schematic diagrams illustrating customer premises and system for implementing IoT-based smart home, building, or customer premises functionality, in accordance with various embodiments.
Figure 3:
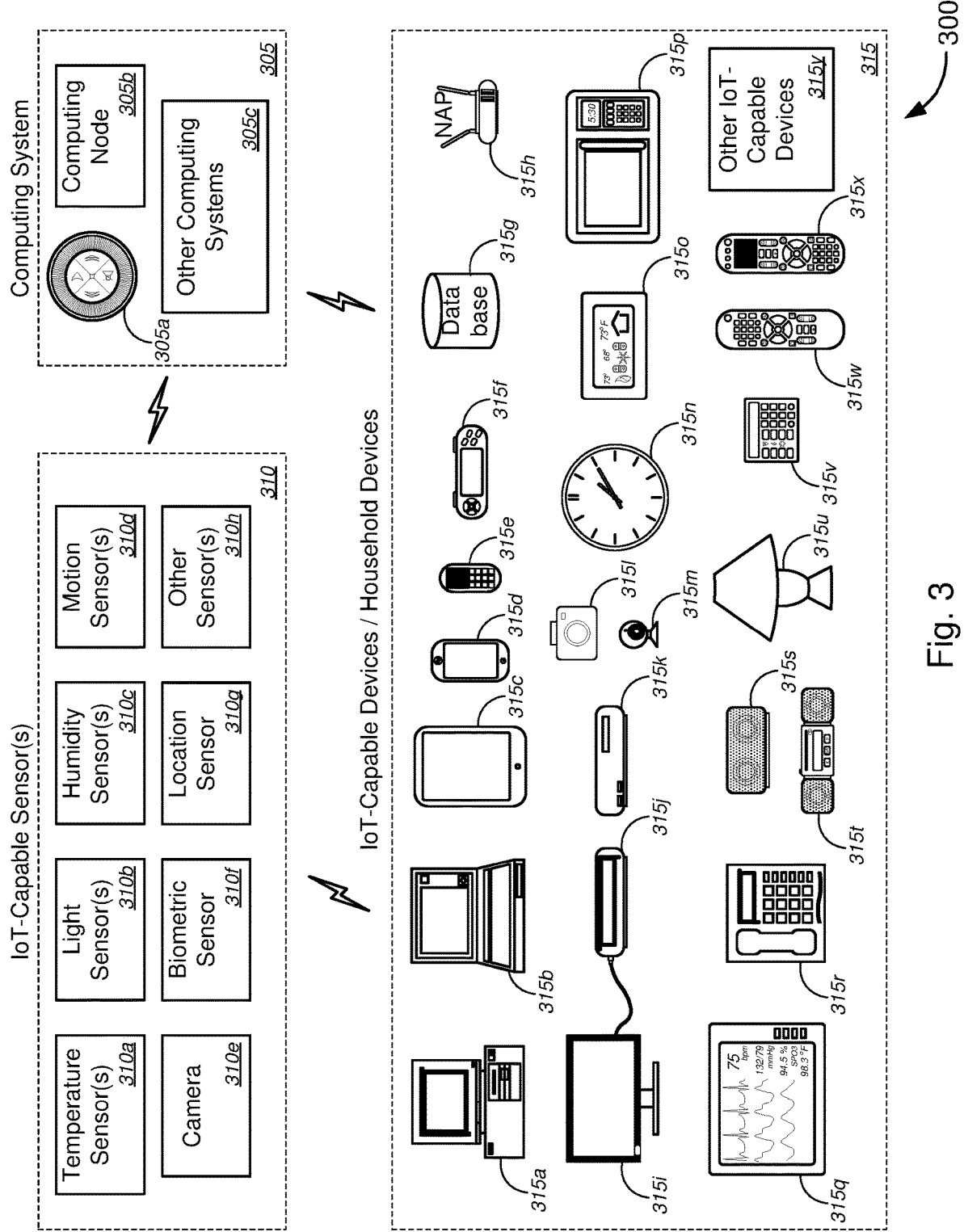
Figure 4A:
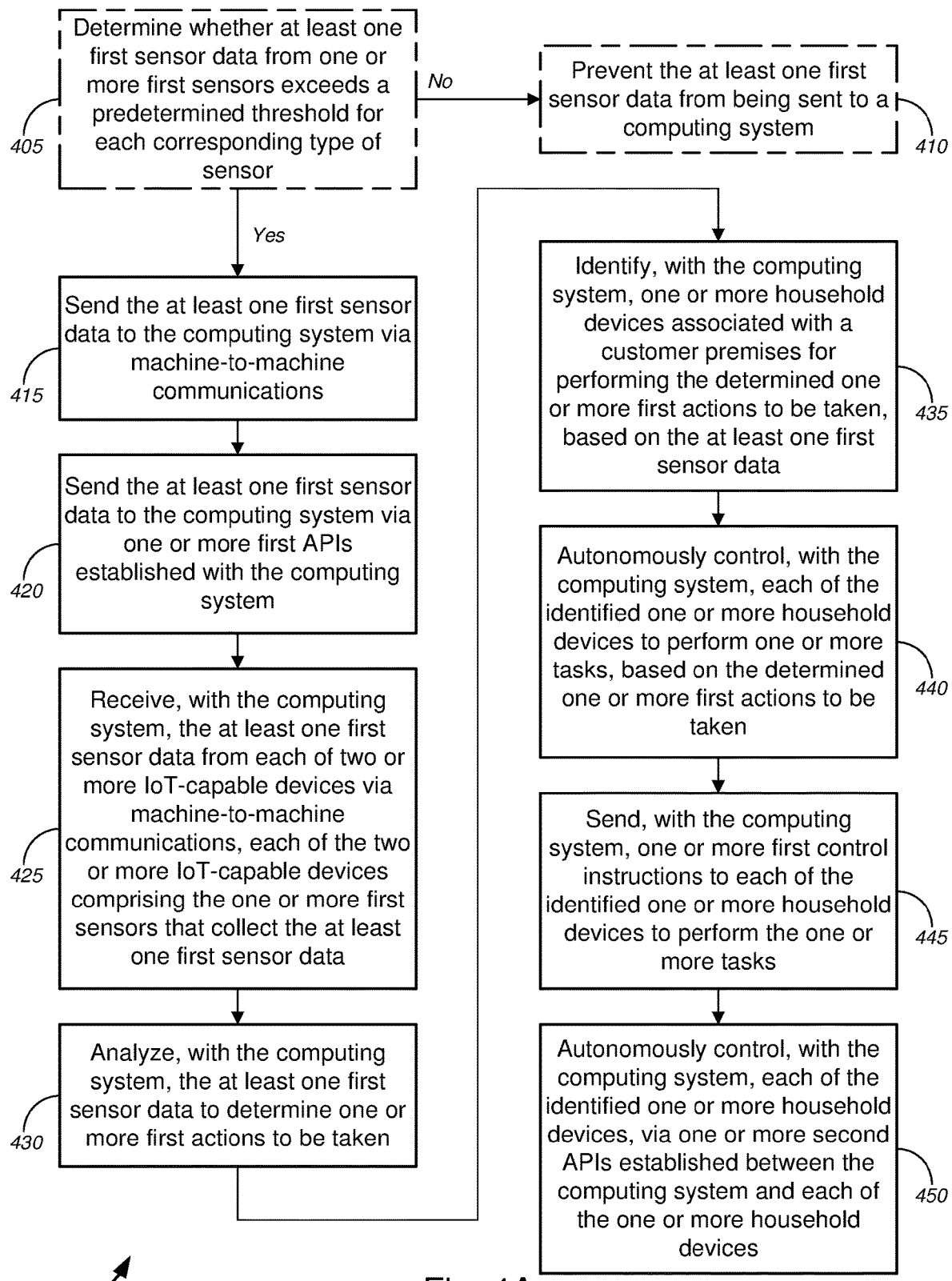
FIGS. 4A and 4B are flow diagrams illustrating a method for implementing IoT-based smart home, building, or customer premises functionality, in accordance with various embodiments.
Figure 4B:
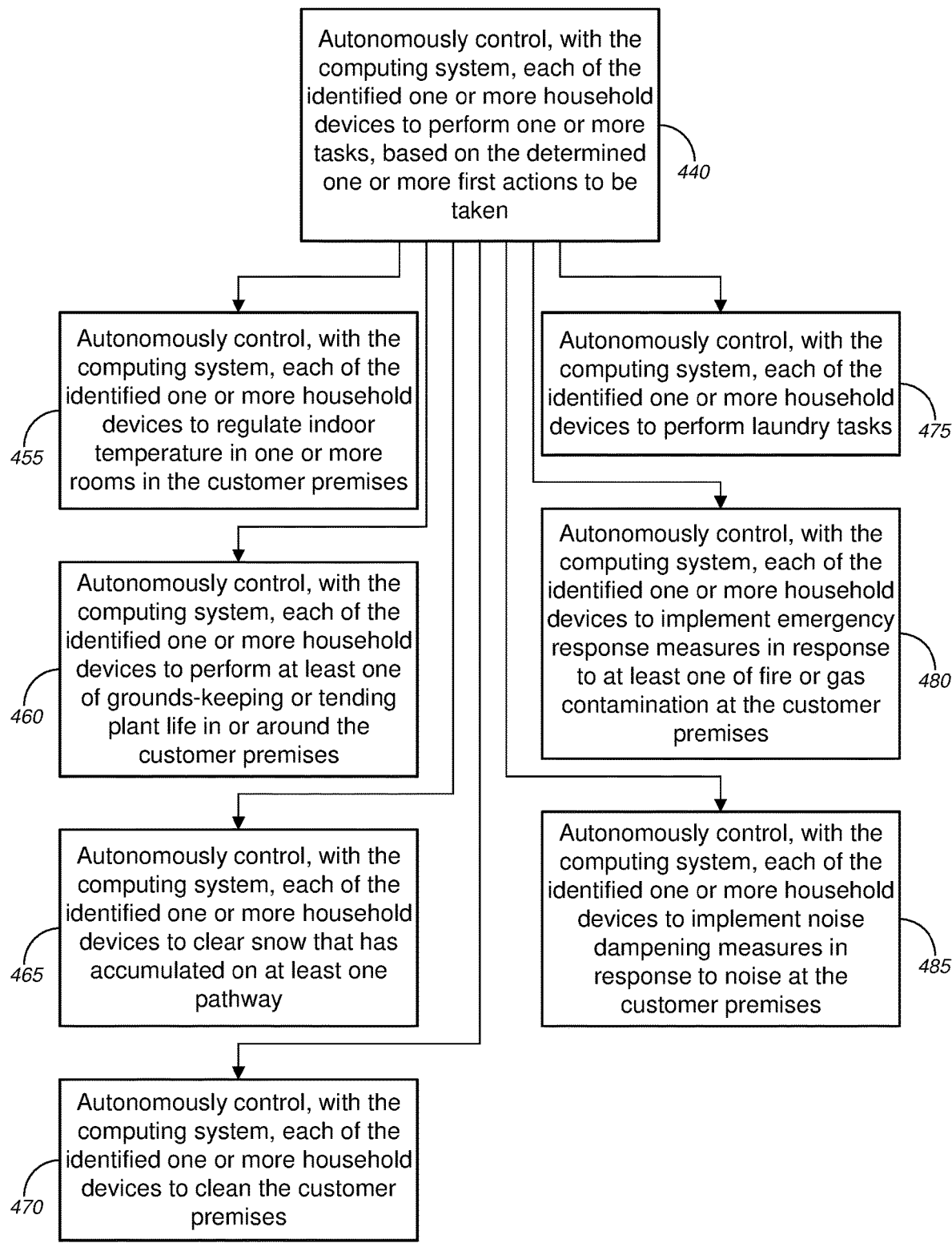
Figure 5:
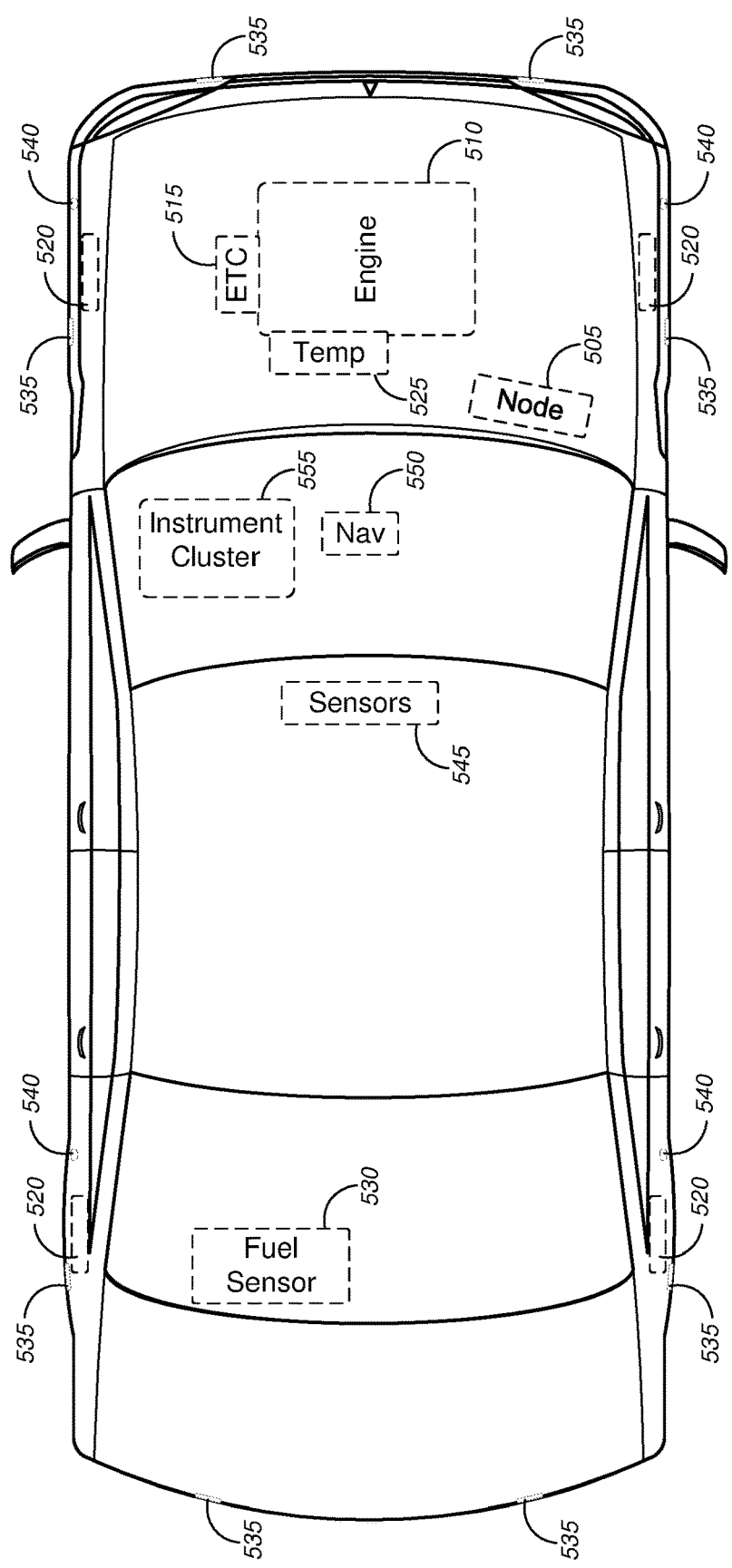
FIGS. 5 and 6 are schematic diagrams illustrating vehicle and system for implementing IoT-based smart vehicle functionality, in accordance with various embodiments.
Figure 6:
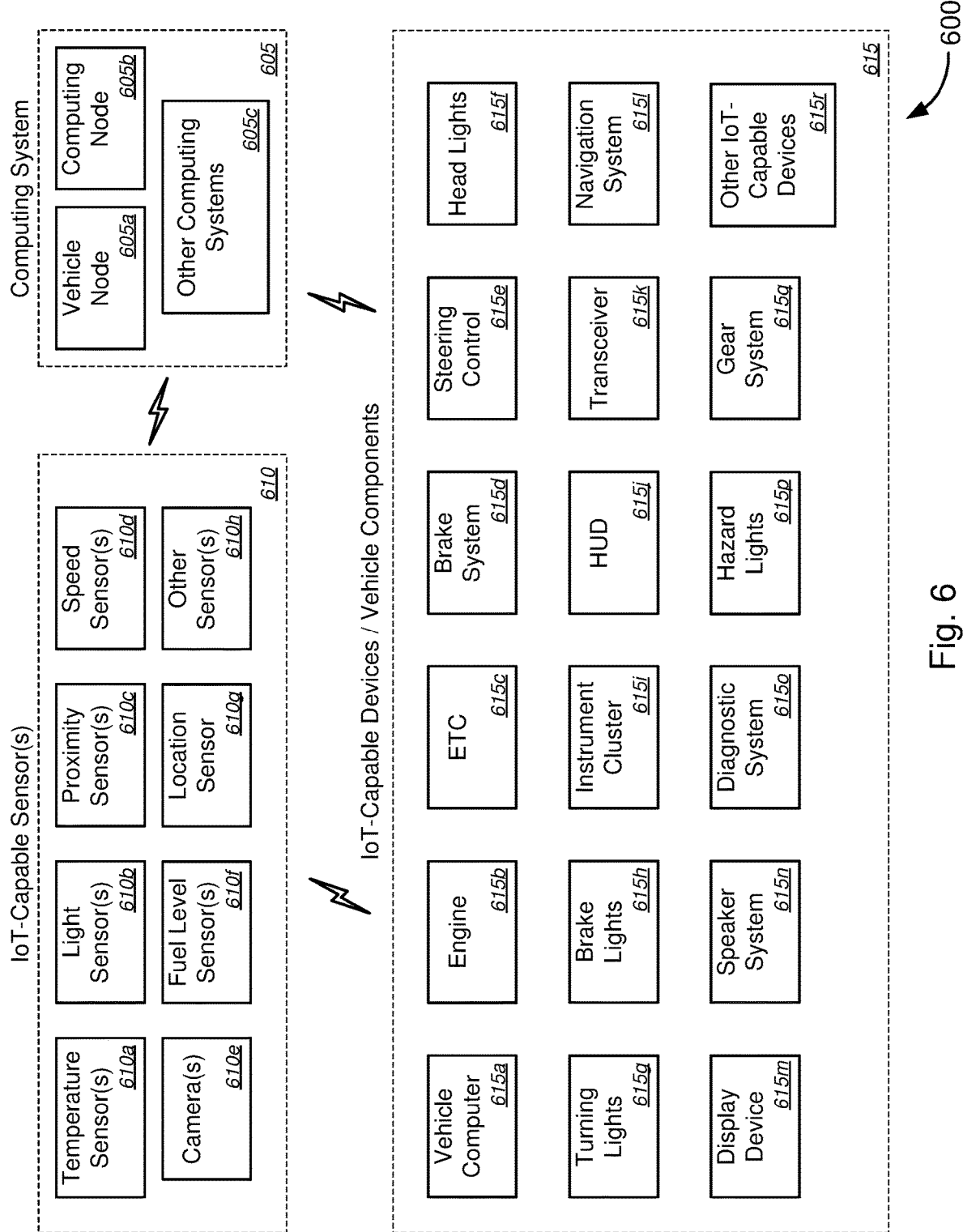
Figure 8:
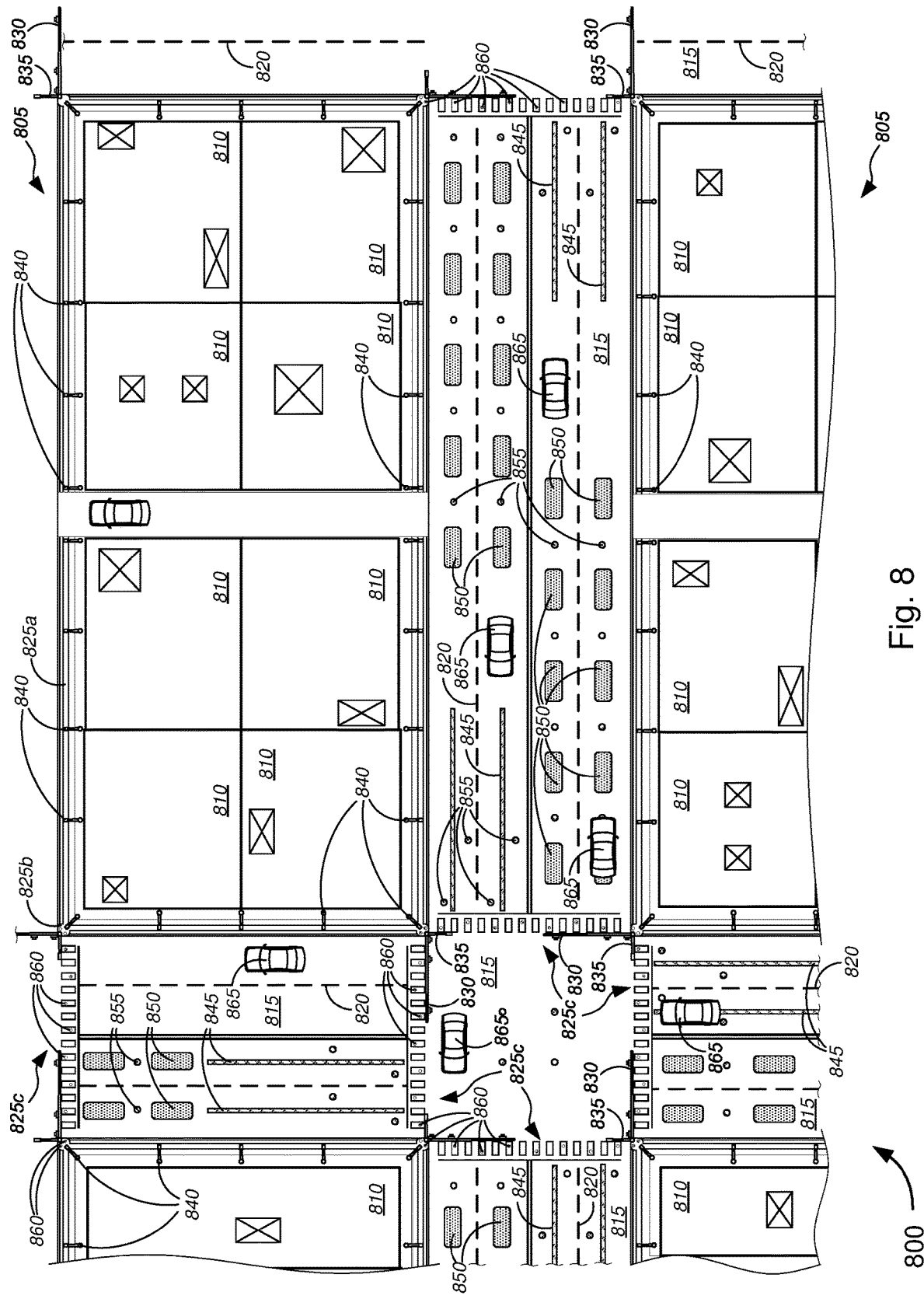
FIGS. 8 and 9 are schematic diagrams illustrating roadway and system for implementing IoT-based smart roadway functionality, in accordance with various embodiments.
Figure 9:
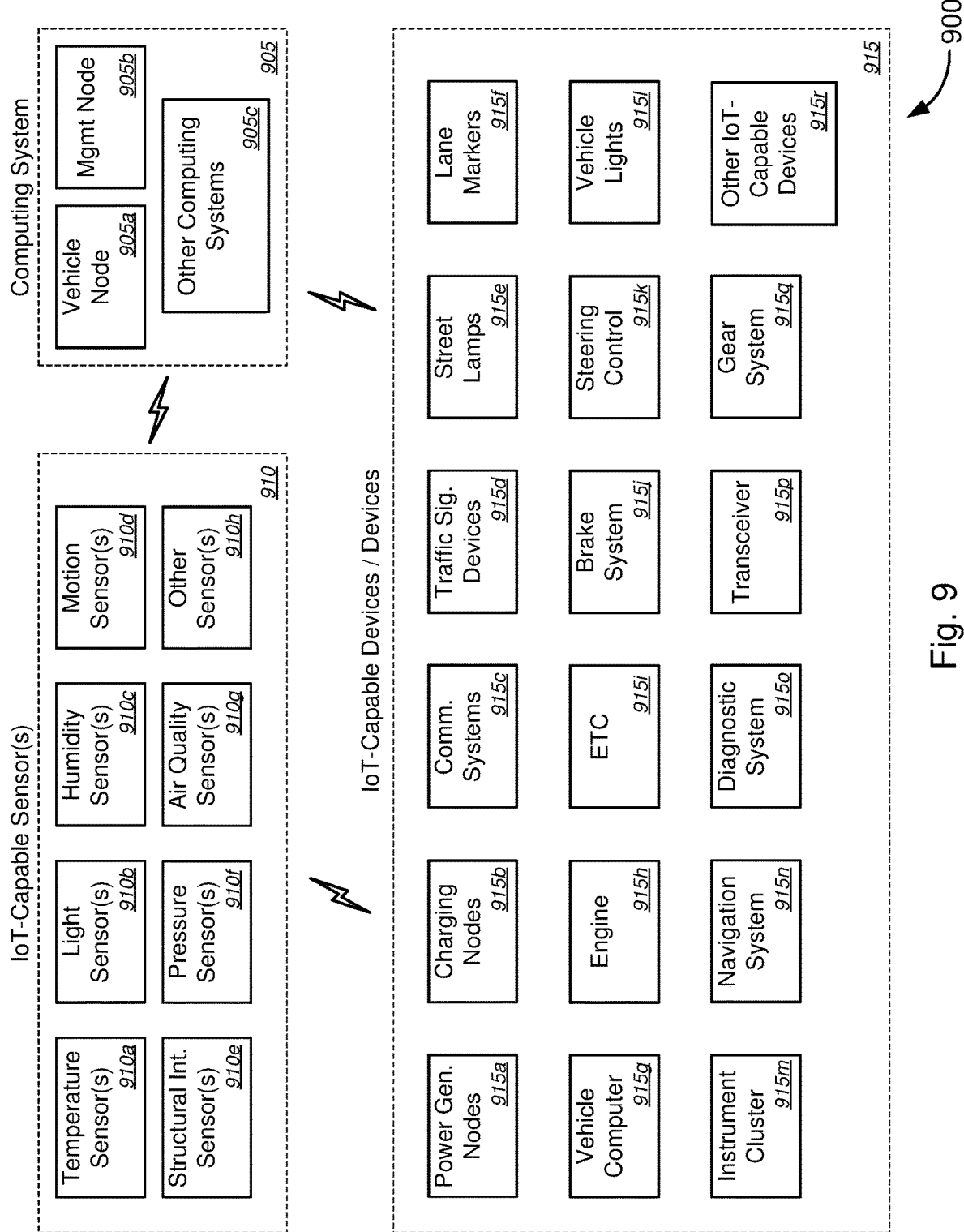
Figure 11:
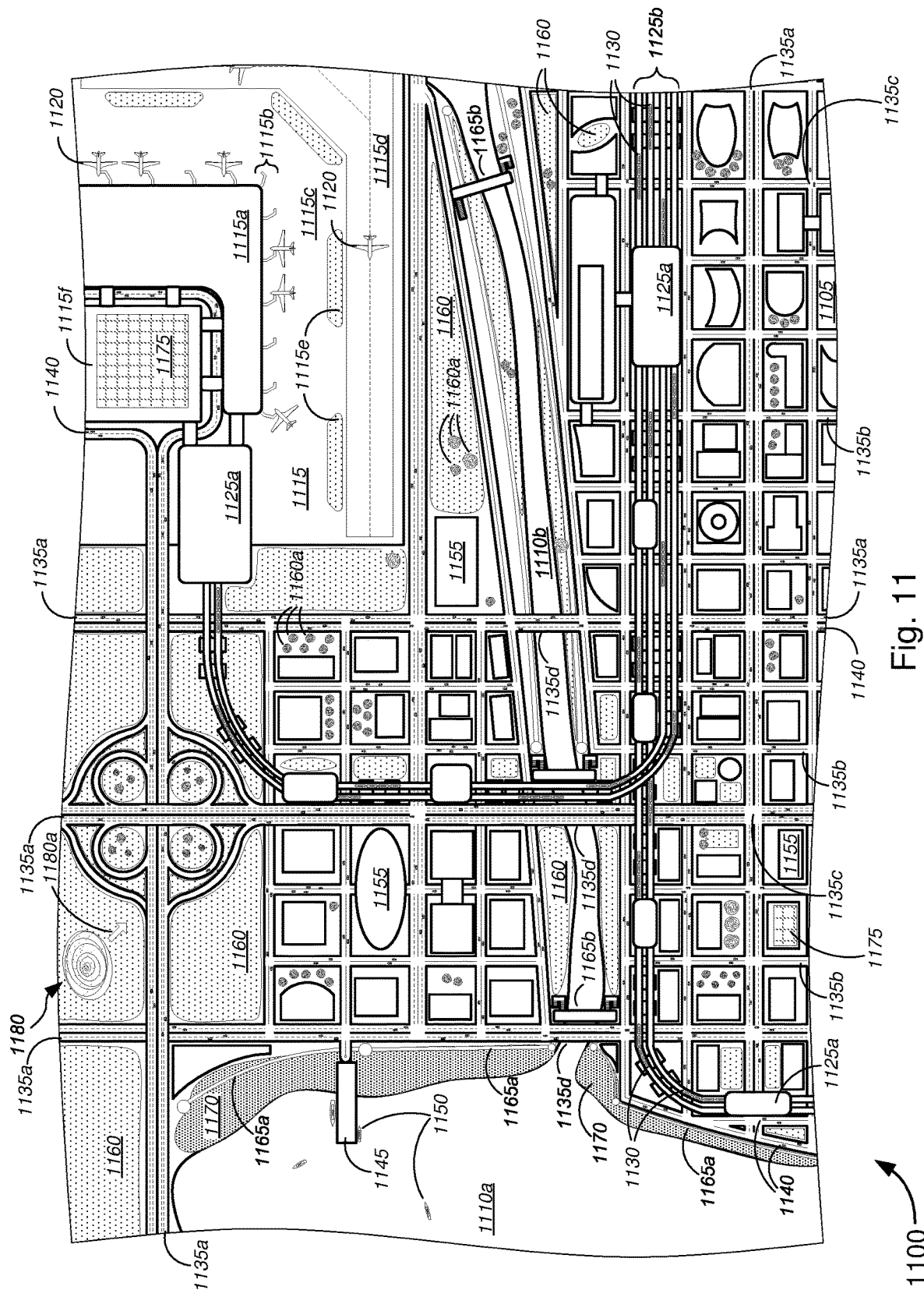
FIGS. 11 and 12 are schematic diagrams illustrating population area and system for implementing IoT-based smart city functionality, in accordance with various embodiments.
Figure 12:
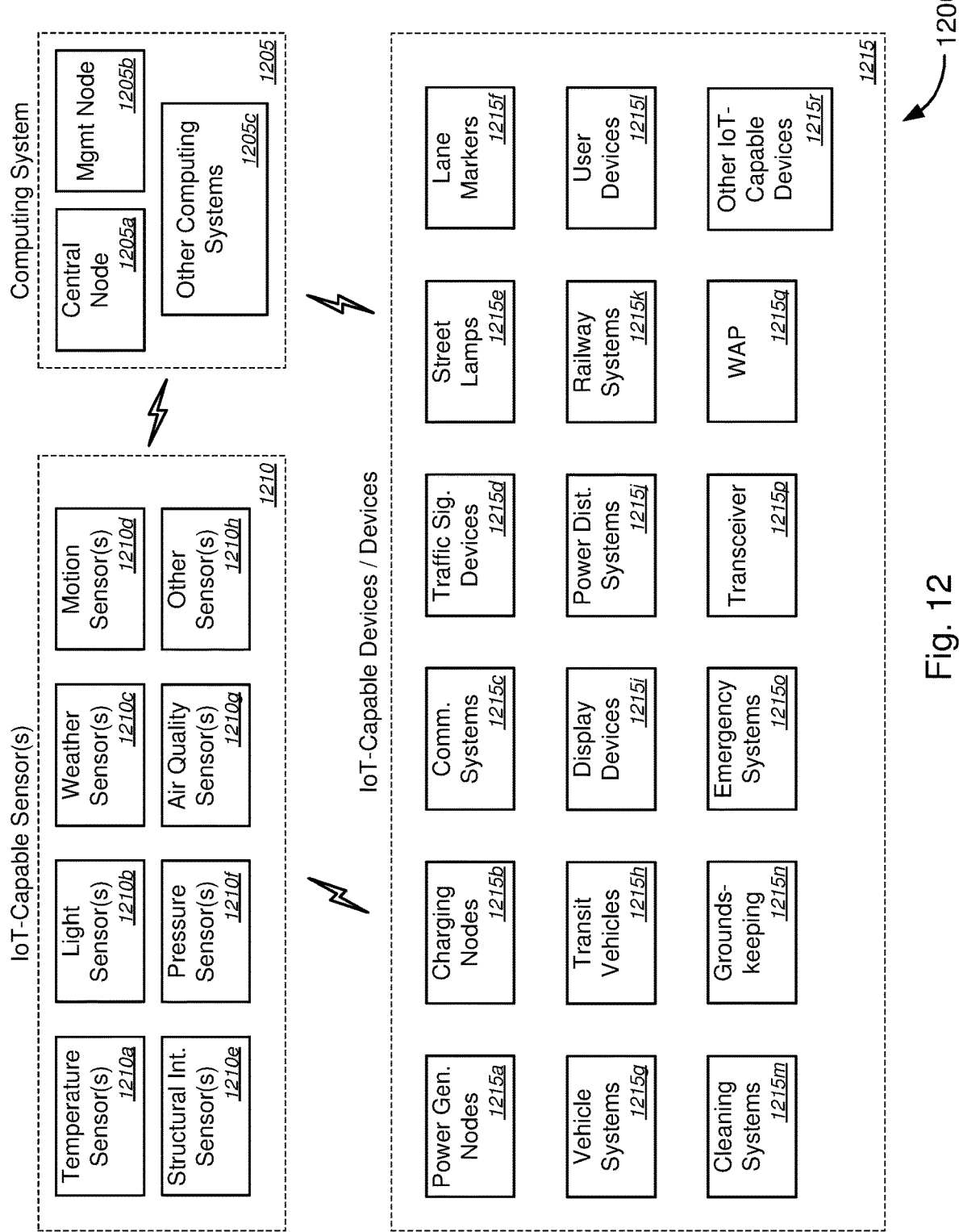
Figure 14:
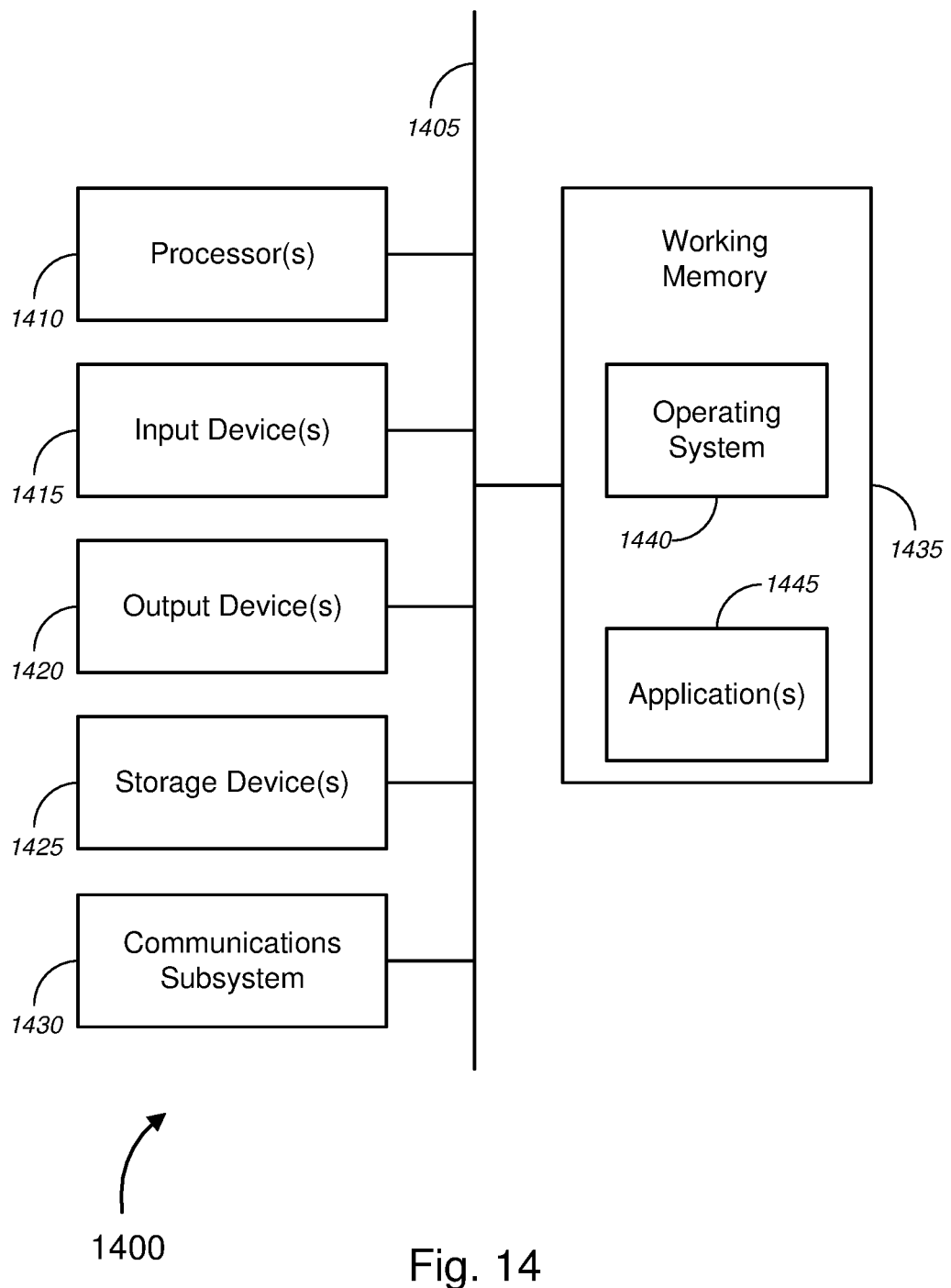
FIG. 14 is a block diagram illustrating an exemplary computer or system hardware architecture, in accordance with various embodiments.
Figure 15:
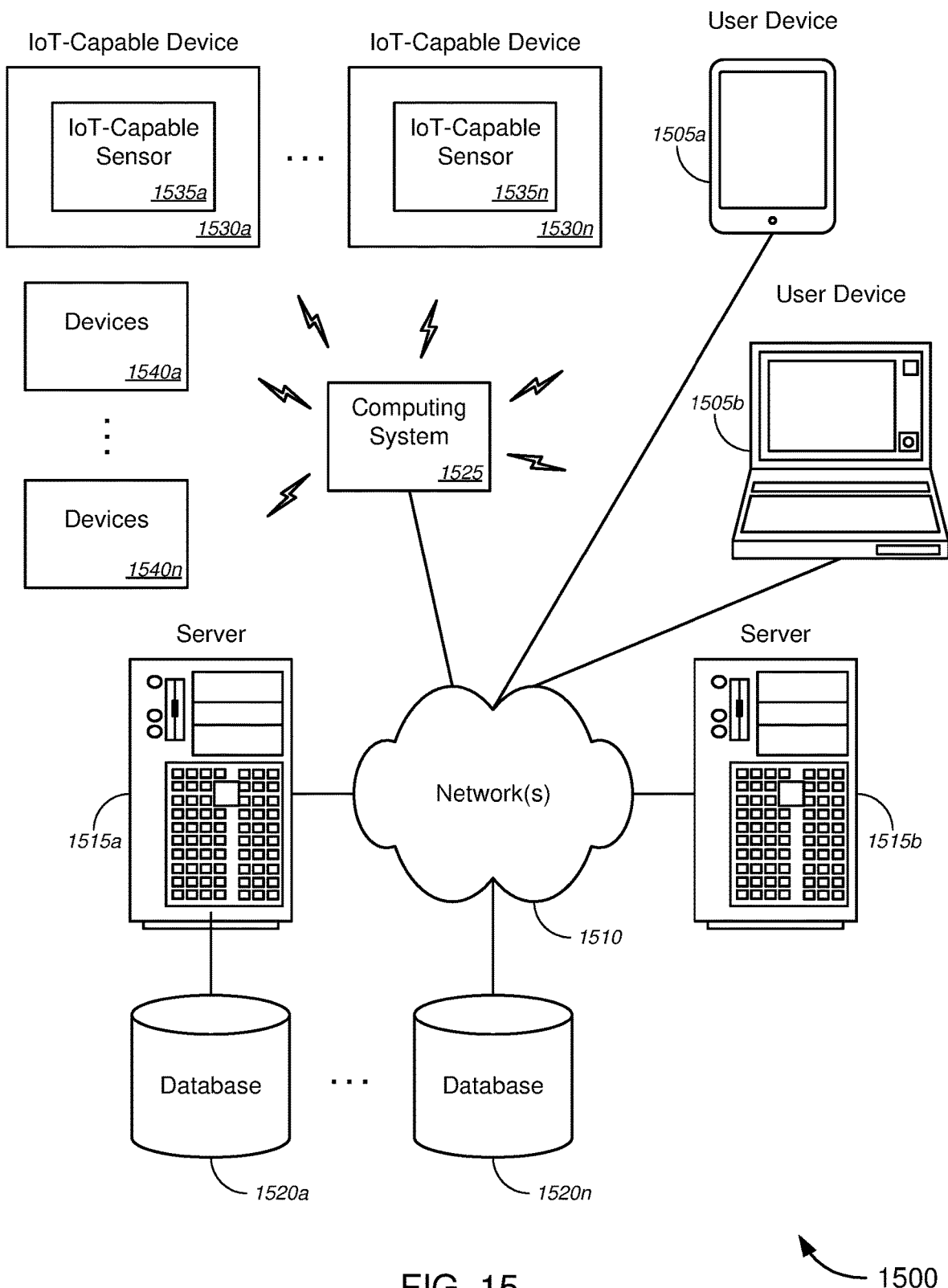
FIG. 15 is a block diagram illustrating an example of a networked system of computers, computing systems, or system hardware architecture, which can be used in accordance with various embodiments.

We now turn to the embodiments as illustrated by the drawings. FIGS. 1-15 illustrate some of the features of the method, system, and apparatus for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, and so on, as referred to above. In particular, FIG. 1 depicts a generic system for implementing smart environment functionality, while FIGS. 2-4 depict systems and methods for implementing smart home, building, or customer premises functionality, FIGS. 5-7 depict systems and methods for implementing smart vehicle functionality, FIGS. 8-10 depict systems and methods for implementing smart roadway functionality, and FIGS. 11-13 depict systems and methods for implementing smart city functionality. FIGS. 14 and 15 illustrate exemplary system and hardware implementation. The methods, systems, and apparatuses illustrated by FIGS. 1-15 refer to examples of different embodiments that include various components and steps, which can be considered alternatives or which can be used in conjunction with one another in the various embodiments. The description of the illustrated methods, systems, and apparatuses shown in FIGS. 1-15 is provided for purposes of illustration and should not be considered to limit the scope of the different embodiments.

Smart Environment Functionality

With reference to the figures, FIG. 1 is a schematic diagram illustrating a system 100 for implementing Internet of Things ("IoT")-based smart environment functionality, in accordance with various embodiments. In FIG. 1, system 100 might comprise one or more computing systems 105a and/or 105b (collectively, "computing systems 105"), one or more IoT-capable devices 110a-110n (collectively, "IoT-capable devices 110"), one or more IoT-capable sensors 115a-115n (collectively, "IoT-capable sensors 115"), and one or more devices 120a-120n (collectively, "devices 120"). In some cases, the one or more computing systems 105 might comprise at least one local computing system 105a that is local to one or more of at least one IoT-capable device 110, at least one IoT-capable sensor 115, at least one device 120, or a customer premises/vehicle/roadway/portion of a population area in which the one or more of the at least one IoT-capable device 110, the at least one IoT-capable sensor 115, or the at least one device 120 are disposed. The one or more computing systems 105 might alternatively or additionally comprise at least one remote computing system 105b that is remote from the one or more of the at least one IoT-capable device 110, the at least one IoT-capable sensor 115, the at least one device 120, or the customer premises/vehicle/roadway/portion of the population area in which the one or more of the at least one IoT-capable device 110, the at least one IoT-capable sensor 115, or the at least one device 120 are disposed. The at least one remote computing system 105b might be accessible by any of the local computing system 105a, the IoT-capable devices 110, the IoT-capable sensors 115, the devices 120, and/or the like via one or more networks 125, and in some cases, via one or more telecommunications relay systems 130. In some embodiments, one or more of the devices 120, the computing system 105, the IoT-capable devise 110, and/or the IoT-capable sensors 115 may be integrated into a single physical unit.

In some cases, each of the local computing systems 105a might include, but are not limited to, at least one of an IoT human interface device (or a single processor or a plurality of processors disposed therein, whereas, such processor or processors may be physical or virtual in nature), a vehicle node, a central node, a computing node, an IoT management node, one or more roadway-embedded IoT management nodes, a distributed computing system that integrates computing resources from two or more IoT-capable devices, and/or the like, each of which is located in a customer premises/vehicle/roadway/portion of the population area in which the one or more of the at least one IoT-capable device 110, the at least one IoT-capable sensor 115, or the at least one device 120 are disposed. Each of the remote computing systems 105b might include, but are not limited to, at least one of a remote IoT management node, one or more municipal, state, federal, or private entity IoT management nodes, a computing system disposed at a vehicle traffic control center, a server computer, a cloud computing system, and/or the like, each of which is located outside of (or remote from) the customer premises/vehicle/roadway/portion of the population area in which the one or more of the at least one IoT-capable device 110, the at least one IoT-capable sensor 115, or the at least one device 120 are disposed.

According to some embodiments, the IoT-capable devices 110 might include, without limitation, at least one of a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, an array of one or more sensors, and/or the like. The IoT-capable devices 110, in some cases, might further include, but are not limited to, one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, one or more drones with clothes hanging tool, a fire suppression system, one or more emergency exit markers, one or more exit route markers, one or more lights (e.g., LEDs, indicator lights, warning lights, etc.), one or more fire suppression drones, one or more white noise generators, and/or the like.

In some embodiments, the IoT-capable devices 110 might further include, without limitation, at least one of one or more vehicle systems or vehicular components in each of one or more vehicles (e.g., private vehicles, company vehicles, commercial, public transit vehicles, etc.) travelling on the roadway (including, but not limited to, a vehicle computer, a vehicle engine, an electronic throttle control ("ETC") system, a vehicle brake system, a vehicle gear system, a vehicle steering system, a vehicle light system (e.g., vehicle head light system, vehicle turn signal light system, vehicle brake light system, vehicle hazard light system, etc.), a vehicle (analog or digital) instrument gauge cluster, a navigation system, a vehicle (self-) diagnostic system, a vehicle-based transceiver or communications system, a vehicle-based wireless access point ("WAP"), a vehicle door unlocking/locking system, an automated vehicle door opening/closing system, an automated vehicle window opening or closing system, an automated vehicle window covering control system, one or more vehicle climate control systems, and/or the like), one or more public display devices (e.g., electronic billboards, digital public signs, public televisions, public monitors, public touchscreen interface displays, public directories, and/or the like), one or more power distribution systems, one or more railway systems (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices associated with users who are currently located in the population area, one or more cleaning systems, one or more grounds-keeping systems, one or more emergency (response) systems, one or more transceivers, a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, one or more building climate control systems, one or more public transport climate control systems, one or more air purifiers, one or more air filters, or one or more electrostatic particulate collecting tools, a fire suppression system, one or more lights (e.g., reading lights, LEDs, indicator lights, warning lights, etc.), and/or the like. In some instances, the IoT-capable devices 110 might further include, but are not limited to, one or more power generation nodes, one or more battery charging nodes, one or more communications systems, one or more traffic control signal devices, one or more street lamps, one or more dynamic lane change markers, and/or the like.

In some embodiments, the IoT-capable sensors 115—which might be disposed within, on a surface of, or within but extending to a surface of, each of the IoT-capable devices 110—might include, but are not limited to, at least one of one or more temperature sensors (e.g., heat sensors, infrared sensors, thermometers, etc.), one or more light sensors (e.g., ambient light sensors, luminosity sensors, illuminance sensors, solar light sensors, etc.), one or more humidity sensors (e.g., room humidity sensors, outdoor humidity sensors, etc.), one or more moisture sensors, one or more motion sensors, one or more cameras, one or more biometric sensors (e.g., fingerprint sensors, palm print sensors, footprint sensors, handprint sensors, voice identification sensors, iris scanners, retina scanners, etc.), one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more water leak detectors, one or more contact sensors (e.g., for building/vehicle door lock system, for building/vehicle moon/sky light ajar detector, for building/vehicle window open detector, for vehicle hood ajar detector, for vehicle trunk ajar detector, and/or the like), one or more audio sensors, one or more accelerometers, one or more proximity sensors, one or more seismic sensors, one or more radiation sensors, one or more telecommunications signal sensors or communications signal detectors, and/or the like. In some cases, the IoT-capable sensors 115 might further include, without limitation, one or more conventional thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more lawn height detectors, one or more nitrogen level sensors, one or more phosphate level sensors, one or more potassium level sensors, one or more leaf color detectors, one or more wind sensors, one or more snow accumulation sensors, one or more indoor solar light sensors, one or more outdoor solar light sensors, one or more weather station sensors (e.g., one or more neighborhood weather station sensors, one or more regional weather station sensors, one or more national weather station sensors, one or more global weather station sensors, etc.), one or more motion detectors detecting proximity of people or animals, one or more particulate sensors (e.g., one or more optical particulate sensors, one or more electrostatic particulate sensors, etc.), one or more object position sensors, one or more flame detectors, one or more sound amplitude sensors, one or more sound propagation detectors, one or more frequency sensors, and/or the like.

According to some embodiments, the IoT-capable sensors 115 might further include, but are not limited to, at least one of one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more fuel level sensors (e.g., gasoline tank level sensors, diesel tank level sensors, battery charge level sensors, etc.), one or more brake sensors, one or more fluid leak detectors, one or more tire pressure sensors, an engine temperature sensor, one or more fluid leak detectors, one or more occupant sensors, one or more impact sensors, one or more stress sensors, or one or more suspension system diagnostic sensors, and/or the like. In some instances, the IoT-capable sensors 115 might further include, without limitation, one or more structural integrity sensors (e.g., for roadways, pathways, buildings, airport terminal buildings, airport hangars and service buildings, railway facilities, railway tracks, marine ports, public transit structures, utility structures, monuments and/or art pieces, bridges, tunnels, etc.), one or more pressure sensors, and/or the like.

In some cases, the devices 120—which might be IoT-capable or might simply be controllable by an IoT-capable device 110 (or by the computing system 105), and might, for purposes of description herein, be a device that does not have any IoT-capable sensors 115 disposed therein or thereon—might include, without limitation, at least one of one or more conventional display devices, one or more conventional traffic control signal devices, one or more conventional street lamps, one or more conventional emergency exit markers, one or more conventional building lights, one or more conventional building furnace, one or more conventional building air conditioner, one or more conventional building ventilation fans, one or more conventional sprinkler systems, one or more conventional wireless electrical outlets, and/or the like.

The machine-to-machine communications between the computing system 105a and each of the IoT-capable devices 110a-110n, between the computing system 105a and each of the IoT-capable sensors 115a-115n, between the computing system 105a and each of the IoT-capable devices 120a-120n, between each of the IoT-capable devices 110a-110n and another of the IoT-capable devices 110a-110n, between each of the IoT-capable devices 110a-110n and one or more IoT-capable sensors 115 in another of the IoT-capable devices 110a-110n, and so on are represented in FIG. 1 by the lightning bolt symbols, which in some cases denote wireless communications (although, in some instances, need not be wireless, but can be wired communications). Herein, "machine-to-machine communications" refers to communications between or among machines or devices that are not initiated by or instructed by a human, but are rather initiated autonomously by one of the machines based on triggers (e.g., conditions being met; particular sensor data being received, observed, recorded, etc.; sensor data exceeding predetermined threshold levels for particular types of sensors; and/or the like). In some instances, each IoT-capable device of the plurality of IoT-capable devices 110a-110n, each IoT-capable sensor of the plurality of IoT-capable sensors 115a-115n, and, in some cases, each device of the plurality of devices 120a-120n as well, might be assigned a unique IPv6 identifier(s) or the like that enables secure and non-confused communications with particular IoT-capable devices or sensors (as no two devices or sensors will have the same identifier, although some devices may be collocated and unique identifiers may exist for various layers of the protocol stack, or the like). In some cases, the IPv6 identifiers may be used together with other identifiers for the same device. In some instances, such identification capability can simplify device registration and/or can be used to facilitate machine-to-machine communications, machine-to-network communications, and/or the like.

In some instances, the network 125 might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, and/or any other wireless protocol, and/or any combination of these and/or other networks. In a particular embodiment, the network 125 might include an access network of the service provider (e.g., an Internet service provider ("ISP")), or the like. The one or more telecommunications relay systems 130 might include, without limitation, one or more wireless network interfaces (e.g., wireless modems, wireless access points, and the like), one or more towers, one or more satellites, and/or the like.

In some embodiments, the system 100 might further comprise a data store or data lake 135 that stores information regarding the one or more computing systems 105, information regarding the IoT-capable devices 110, information regarding the IoT-capable sensors 115, information regarding the devices 120, information regarding communications amongst these devices and sensors, information regarding communications between each user of the various devices and the computing system 105 or any of the IoT-capable devices and sensors, information regarding the network, information regarding communications between the computing systems 105 and each of the IoT-capable devices 110, the IoT-capable sensors 115, and the devices 120, and/or the like. In some cases, the system 100 might further comprise an analytics engine 140 and an associated database 145 that together analyze and track (or record) communications amongst the various components of system 100 (i.e., the one or more computing systems 105, the IoT-capable devices 110, the IoT-capable sensors 115, the devices 120, and/or the like) to identify trends as well as to identify potential issues with communications or efficiency of the system, and/or the like, the results of which might cause the one or more computing systems 105 to send software updates to affected or applicable ones of the IoT-capable devices 110, the IoT-capable sensors 115, the devices 120, and/or the like).

FIGS. 2-4 depict systems and methods for implementing smart home, building, or customer premises functionality, while FIGS. 5-7 depict systems and methods for implementing smart vehicle functionality, FIGS. 8-10 depict systems and methods for implementing smart roadway functionality, and FIGS. 11-13 depict systems and methods for implementing smart city functionality.

Smart Home, Building, or Customer Premises Functionality

FIGS. 2 and 3 are schematic diagrams illustrating customer premises 200 and system 300 for implementing IoT-based smart home, building, or customer premises functionality, in accordance with various embodiments.

With reference to FIG. 2, a customer premises 200 (although shown in FIG. 2 as a ranch-style residential home) might comprise a home, building, or other customer premises structure (e.g., business premises, commercial office, school, industrial building, etc.) 205, in which might comprise one or more pieces of furniture 210 (including, but not limited to, dining tables, dining chairs, couches or sofas, side tables, coffee tables, entertainment stands, beds, seats, dressers, cabinets, shelves, stools, etc.), home appliances or fixtures 215 (including, without limitation, kitchen sinks, bathroom sinks, toilets, shower enclosures, bathtubs, smoke detectors, CO monitors, home/business/premises security systems, thermostat, mirrors, lights, furnace, air conditioner, water heater, washer, dryer, garage door opener, a pool(s), a gazebo or pergola, etc.), user or electronic devices 220 (including, but not limited to, televisions, smart phones, mobile phones, tablet computers, desktop computers, set-top boxes ("STBs"), gaming devices or consoles, virtual reality goggles, augmented reality goggles, etc.), kitchen appliances 225 (including, without limitation, electric stoves, induction stoves, gas stoves, refrigerators, freezers, microwave ovens, electric ovens, convectional ovens, gas ovens, rice cookers, steamers, coffee machines, tea machines, toasters, toaster ovens, mixers, and/or the like), doorways and windows 230 (e.g., front door(s), patio door(s), room doors, closet doors, bathroom doors, garage doors, windows, etc.), pathways 235 (e.g., driveways, walkways, sidewalks, patio, steps, porch, garden paths, etc.), vehicles 240, grounds-keeping equipment 245 (e.g., sprinkler system (including, without limitation, sprinkler heads, sprinkler lines, sprinkler switches, sprinkler controllers, lawn mower, snow blower, fertilizer distributors, grounds-keeping drones, and/or the like), lawn and plant life 250 (including, but not limited to, lawn, trees, bushes, shrubs, flowers, plants, and/or the like that may be planted indoors or outdoors), control or management nodes 255 (including, without limitation, IoT human interface devices, computing nodes, management nodes, gateway devices, etc.), and/or the like.

In some embodiments, the control or management nodes 255 (also referred to herein as "computing systems") might interact in a machine-to-machine manner with each of at least one of one or more home appliances or fixtures 215, one or more user or electronic devices 220, one or more kitchen appliances 225, one or more grounds-keeping equipment 245, and/or the like, which might be IoT-capable versions of such devices and systems, and/or with IoT-capable sensors that might be embodied within one or more of these devices or systems or embodied in stand-alone housings. These and other IoT-capable devices and systems are described in greater detail with respect to FIG. 3. FIGS. 4A and 4B below describe several non-limiting embodiments of interactions amongst the computing systems, the IoT-capable devices, and the IoT-capable sensors, and/or the like for implementing IoT-based smart home, building, or customer premises functionality.

In FIG. 3, system 300 might comprise one or more computing systems 305, one or more IoT-capable sensors 310, and one or more IoT-capable devices or household devices 315, each of which might communicate with one or both of the other two via machine-to-machine communications (not unlike the machine-to-machine communications as described above with respect to FIG. 1). Inter-device communications may be restricted by design, by different vendor manufacturers, or by other logic, and the like.

The computing system 305 might include, without limitation, at least one of an IoT human interface device 305a (or a single processor or a plurality of processors disposed therein, whereas, such processor or processors may be physical or virtual in nature), a computing node 305b that is located within the customer premises, or other computing systems 305c, which might include, but are not limited to, an IoT management node (that is either located within the customer premises or at a remote facility associated with a service provider), a server computer that is remote the customer premises, a cloud computing system, a distributed computing system that integrates computing resources from two or more IoT-capable devices, or a combination of two or more of these computing systems, and/or the like. The IoT human interface device and its functionalities are described in greater detail in the '764 and '710 applications, which have already been incorporated herein by reference in their entirety for all purposes.

According to some embodiments, the IoT-capable sensors 310 might include, without limitation, one or more temperature sensors 310a (e.g., heat sensors, infrared sensors, thermometers, etc.), one or more light sensors 310b (e.g., ambient light sensors, luminosity sensors, illuminance sensors, solar light sensors, etc.), one or more humidity sensors 310c, one or more motion sensors 310d, one or more cameras 310e, one or more biometric sensors 310f (e.g., fingerprint sensors, palm print sensors, footprint sensors, handprint sensors, voice identification sensors, iris scanners, retina scanners, etc.), one or more location sensors 310g (e.g., global positioning system ("GPS") devices, global navigation satellite system ("GNSS") devices, other location sensors, etc.), one or more other sensors 310h, and/or the like. In some cases, the one or more other sensors 310h might include, but are not limited to, one or more air quality sensors, one or more carbon monoxide sensors, one or more smoke detectors, one or more water leak detectors, one or more contact sensors, one or more audio sensors, one or more accelerometers, one or more proximity sensors, one or more radiation sensors, one or more telecommunications signal sensors, and/or the like. In some embodiments, the IoT-capable sensors 310 might further include, without limitation, one or more conventional thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more humidity sensors in at least one of the one or more rooms, one or more outdoor humidity sensors, one or more moisture sensors, one or more lawn height detectors, one or more nitrogen level sensors, one or more phosphate level sensors, one or more potassium level sensors, one or more leaf color detectors, one or more wind sensors, one or more snow accumulation sensors, one or more indoor solar light sensors, one or more outdoor solar light sensors, one or more neighborhood weather station sensors, one or more regional weather station sensors, one or more motion detectors detecting proximity of people or animals, one or more particulate sensors, one or more optical particulate sensors, one or more electrostatic particulate sensors, one or more object position sensors, one or more flame detectors, one or more sound amplitude sensors, one or more sound propagation detectors, one or more frequency sensors, and/or the like.

In some embodiments, the IoT-capable devices 315 might include one or more IoT-capable sensors 310 and/or might further include, without limitation, a desktop computer 315a, a laptop computer 315b, a tablet computer 315c, a smart phone 315d, a mobile phone 315e, a portable gaming device 315f, a database or data storage device 315g, a network access point ("NAP") 315h, a television or monitor 315i, a set-top box ("STB") 315j, a gaming console 315k, an image capture device 315l, a video capture device 315m, a time piece 315n (including, without limitation, a clock, a watch, or other time piece, and the like), a thermostat or environmental control system 315o, a kitchen appliance 315p (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device 315q, a telephone system 315r, a speaker 315s, a media recording and/or playback device 315t, a lighting system 315u, a customer premises security control system 315v, one or more dedicated remote control devices 315w, one or more universal remote control devices 315x, and/or other IoT-capable devices 315y. In some cases, the other IoT-capable devices 315y might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like. The IoT-capable devices or household devices 315 might further include, but are not limited to one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, one or more drones with clothes hanging tool, a fire suppression system, one or more emergency exit markers, one or more exit route markers, one or more lights (e.g., LEDs, indicator lights, warning lights, etc.), one or more fire suppression drones, one or more white noise generators, and/or the like.

The one or more computing systems 305, the IoT-capable sensors 310, and the IoT-capable devices/household devices 315 are otherwise similar, if not identical, to the one or more computing systems 105, the IoT-capable sensors 115, and the IoT-capable devices 110 or devices 120, respectively, as described above with respect to FIG. 1.

FIGS. 4A and 4B (collectively, "FIG. 4") are flow diagrams illustrating a method 400 for implementing IoT-based smart home, building, or customer premises functionality, in accordance with various embodiments. FIG. 4A depicts the method 400 for implementing IoT-based smart home, building, or customer premises functionality, while FIG. 4B depicts various different embodiments for autonomously controlling each of the identified one or more household devices to perform the one or more tasks in the method 400 of FIG. 4A.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3 respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

With reference to FIG. 4A, method 400, at optional block 405, might comprise determining whether at least one first sensor data from one or more first sensors exceeds a predetermined threshold for each corresponding type of sensor. In response to a determination that the at least one first sensor data from the one or more first sensors does not exceed the predetermined threshold for at least one corresponding type of sensor, the at least one first sensor data is prevented from being sent to a computing system (optional block 410). On the other hand, in response to a determination that the at least one first sensor data from the one or more first sensors does exceed the predetermined threshold for each corresponding type of sensor, the at least one first sensor data is sent to the computing system via machine-to-machine communications (block 415). In some embodiments, sending the at least one first sensor data to the computing system via machine-to-machine communications comprises sending the at least one first sensor data to the computing system via machine-to-machine communications, via one or more first application programming interfaces ("APIs") established with the computing system (block 420).

At block 425, method 400 might comprise receiving, with the computing system, the at least one first sensor data from each of two or more Internet of Things ("IoT")-capable devices via machine-to-machine communications, each of the two or more IoT-capable devices comprising the one or more first sensors that collect the at least one first sensor data. In some embodiments, a "heartbeat" may be used, in which a wake-up signal/response pair is used to validate that the communication channel is working. After x number of missed attempts, the IoT-capable device may be marked off-line and unavailable. Method 400, at block 430, might comprise analyzing, with the computing system, the at least one first sensor data to determine one or more first actions to be taken. Method 400 might further comprise, at block 435, identifying, with the computing system, one or more household devices associated with a customer premises for performing the determined one or more first actions to be taken, based on the at least one first sensor data from each of the two or more IoT-capable devices. At block 440, method 400 might comprise autonomously controlling, with the computing system, each of the identified one or more household devices to perform one or more tasks, based on the determined one or more first actions to be taken.

According to some embodiments, autonomously controlling, with the computing system, each of the identified one or more household devices to perform one or more tasks might comprise sending, with the computing system, one or more first control instructions to each of the identified one or more household devices to perform the one or more tasks, based on the determined one or more first actions to be taken (block 445). Additionally or alternatively, autonomously controlling, with the computing system, each of the identified one or more household devices to perform one or more tasks might comprise autonomously controlling, with the computing system, each of the identified one or more household devices, via one or more second APIs established between the computing system and each of the one or more household devices (block 450).

Turning to FIG. 4B, autonomously controlling, with the computing system, each of the identified one or more household devices to perform one or more tasks (at block 440) might comprise autonomously controlling, with the computing system, each of the identified one or more household devices to regulate indoor temperature in one or more rooms in the customer premises (block 455). In some embodiments, the one or more first sensors of each of the two or more IoT-capable devices might each include, without limitation, one or more conventional thermometers in at least one of the one or more rooms, one or more infrared ("IR") thermometers aimed at one or more positions in at least one of the one or more rooms, one or more air flow sensors in at least one of the one or more rooms, one or more air flow sensors in air ducts directed toward at least one of the one or more rooms, one or more indoor solar light sensors, one or more outdoor solar light sensors, one or more outdoor wind sensors, one or more neighborhood weather station sensors, one or more regional weather station sensors, one or more motion detectors detecting presence of people or animals in at least one of the one or more rooms, or one or more humidity sensors in at least one of the one or more rooms, and/or the like. The one or more household devices might include, but are not limited to, one or more of a furnace, an air conditioner, one or more automated window opening or closing systems, one or more automated door opening or closing systems, one or more automated skylight opening or closing systems, one or more automated window covering systems, one or more humidifiers, one or more dehumidifiers, or one or more ventilation fans, and/or the like, in some cases, using control signals from the computing system directly or indirectly to actuators, solenoids, motors, switches, relays, electronic circuits, logic, and/or the like, where said devices, communications, protocols, and/or other systems employ physical, electronic, and logical security mechanisms to prevent unauthorized access and/or to maintain privacy, or the like. Autonomously controlling, with the computing system, each of the identified one or more household devices to regulate indoor temperature in one or more rooms in the customer premises might comprise controlling the one or more of a furnace, an air conditioner, one or more automated window opening or closing systems, one or more automated door opening or closing systems, one or more automated skylight opening or closing systems, one or more automated window covering systems, one or more humidifiers, one or more dehumidifiers, or one or more ventilation fans, and/or the like, based at least in part on sensor data from at least one of the one or more conventional thermometers in the at least one of the one or more rooms, the one or more IR thermometers aimed at the one or more positions in the at least one of the one or more rooms, the one or more air flow sensors in the at least one of the one or more rooms, the one or more air flow sensors in the air ducts directed toward the at least one of the one or more rooms, the one or more indoor solar light sensors, the one or more outdoor solar light sensors, the one or more outdoor wind sensors, the one or more neighborhood weather station sensors, the one or more regional weather station sensors, the one or more motion detectors detecting presence of people or animals in the at least one of the one or more rooms, or the one or more humidity sensors in the at least one of the one or more rooms, and/or the like.

In some cases, solar light, outdoor temperature, and/or the number of people and/or animals in particular rooms might increase the temperature in the rooms, while shaded rooms, low outdoor light, low outdoor temperature, wind, air flow, and/or limited number of people and/or animals in particular rooms might result in lower temperature in the rooms. The system can sense such warm or hot room temperatures and conditions that might lead to such room temperatures, and can autonomously control at least one of the furnace to turn off, the air conditioner to turn on, the one or more automated window opening systems to open one or more windows, the one or more automated door opening systems to open one or more doors, the one or more automated skylight opening systems to open one or more skylights, the one or more automated window covering systems to close or partially close one or more window coverings (e.g., drapes, curtains, vertical blinds, venetian blinds, shutters, etc.), the one or more humidifiers to turn off, the one or more dehumidifiers to turn on, the one or more ventilation fans to turn on, and/or the like. Likewise, the system can sense such cool or cold room temperatures and conditions that might lead to such room temperatures, and can autonomously control at least one of the furnace to turn on, the air conditioner to turn off, the one or more automated window opening systems to close one or more windows, the one or more automated door opening systems to close one or more doors, the one or more automated skylight opening systems to close one or more skylights, the one or more automated window covering systems to open or partially open one or more window coverings (e.g., drapes, curtains, vertical blinds, venetian blinds, shutters, etc.), the one or more humidifiers to turn on, the one or more dehumidifiers to turn off, the one or more ventilation fans to turn on to circulate warm air or to turn off to stop circulating cold air, and/or the like.

In some instances, autonomously controlling, with the computing system, each of the identified one or more household devices to perform one or more tasks (at block 440) might comprise autonomously controlling, with the computing system, each of the identified one or more household devices to perform at least one of groundskeeping or tending plant life in or around the customer premises (block 460). In some embodiments, the one or more first sensors of the two or more IoT-capable devices might comprise sensors monitoring at least one of one or more portions of customer premises lawn, one or more indoor plants, one or more outdoor plants, one or more shrubs, one or more bushes, one or more trees, and/or the like. The one or more first sensors of the two or more IoT-capable devices might each include, without limitation, one or more moisture sensors, one or more lawn height detectors, one or more nitrogen level sensors, one or more phosphate level sensors, one or more potassium level sensors, one or more leaf color detectors, one or more wind sensors, one or more indoor solar light sensors, one or more outdoor solar light sensors, one or more outdoor wind sensors, one or more neighborhood weather station sensors, one or more regional weather station sensors, one or more motion detectors detecting proximity of people or animals, or one or more humidity sensors, and/or the like. In some cases, the one or more household devices might include, but are not limited to, one or more of one or more automated lawn mowers, one or more automated trimmers, one or more sprinkler systems, one or more fertilizer dispensers, or one or more animal deterrent systems, and/or the like.

According to some embodiments, in response to detecting that the lawn has grown beyond a certain predetermined or preset height in at least a portion of a lawn at the customer premises, the system might autonomously control a lawn mower or trimmer to mow at least that portion of the lawn with the relatively high grass. In response to detecting that the moisture sensors indicate that the soil near or surrounding the roots of one or more trees, plants, shrubs, and/or portions of the lawn is below predetermined or preset levels and/or in response to detecting abnormal leaf colors of the at least one tree, plant, shrub, and/or portion of the lawn indicative of deficient levels of water, the system might autonomously control the sprinkler system (or at least certain emitters or certain zones of sprinklers) to water the relatively parched one or more trees, plants, shrubs, and/or portions of the lawn. In response to detecting that the nitrogen, phosphate, and/or potassium level(s) of the soil near or surrounding the roots of at least one tree, plant, shrub, and/or portion of the lawn is either too high or too low and/or in response to detecting abnormal leaf colors of the at least one tree, plant, shrub, and/or portion of the lawn indicative of excess or deficient levels of nitrogen, phosphate, and/or potassium, the system might water the particular area (as above) to dilute any high level of nitrogen, phosphate, and/or potassium, while sending or autonomously controlling one or more fertilizer dispensers (which might be a drone-based system or the like) to add deficient amounts of nitrogen, phosphate, and/or potassium to the particular area (if deemed necessary). In any of these situations and conditions, the system might receive and analyze sensor data from the one or more wind sensors, the one or more outdoor solar light sensors, the one or more outdoor wind sensors, the one or more neighborhood weather station sensors, the one or more regional weather station sensors, the one or more humidity sensors, and/or the like to determine whether any of these environmental conditions might affect any of the mowing of the lawn, the watering of the one or more trees, plants, shrubs, and/or portions of the lawn, and/or the fertilizing of the at least one tree, plant, shrub, and/or portion of the lawn. If so, the affected processes might be postponed, modified, or canceled, as appropriate (e.g., if there will be sufficient rain to water the one or more trees, plants, shrubs, and/or portions of the lawn, then there would be no need to additionally water them; if the water levels are still deficient, the amount of additional watering might be recalculated and the watering might be supplemented accordingly; if winds might cause sprinkler or drip-line water to needlessly evaporate rather than providing the needed water, watering might be postponed and/or a drone might be sent to block the wind during watering). In some cases, while sending or autonomously controlling the lawn mower, the fertilizer dispenser(s), and/or any drones, the system might receive and analyze sensor data (e.g., motion detectors, proximity detectors, etc.) to determine whether any people and/or animals might cross paths with these machines; if so, the system might divert the machines, might stop the machines temporarily, and/or might use light, messages, and/or sounds to warn the people and/or animals, and/or the like.

For indoor plants, trees, flowers, and shrubs (collectively, "indoor plants"), one or more of moisture sensors, leaf color sensors, indoor solar light sensors, fertilizer level sensors, and/or temperature sensors might be used to determine health of the indoor plants. In response to such determination, and based on analysis of what course of action to take, the system might fully or partially open window coverings or turn on particular lights (if it is deemed that light is lacking), might fully or partially close window coverings or turn off particular lights (if it is deemed that there is too much light), might water the indoor plants with calculated amount of water (if it is deemed that water is lacking), might drain water (or dehumidify the area near the affected indoor plant(s), etc.) (if it is deemed that there is too much water), might add or dilute nitrogen, phosphate, and/or potassium (if it is deemed that the fertilizer levels are deficient or excessive, respectively), and so on.

In some instances, autonomously controlling, with the computing system, each of the identified one or more household devices to perform one or more tasks (at block 440) might comprise autonomously controlling, with the computing system, each of the identified one or more household devices to clear snow that has accumulated on at least one pathway (block 465). In some embodiments, the at least one pathway might comprise at least one of one or more outdoor walkways, one or more outdoor stairways, one or more driveways, or one or more roadways, and/or the like. According to some embodiments, the one or more first sensors of the two or more IoT-capable devices might comprise sensors monitoring snow accumulation on the at least one pathway, and the one or more first sensors of the two or more IoT-capable devices might each include, without limitation, one or more moisture sensors, one or more snow accumulation sensors, one or more cameras, one or more temperature sensors, one or more wind sensors, one or more outdoor solar light sensors, one or more neighborhood weather station sensors, one or more regional weather station sensors, one or more motion detectors detecting proximity of people or animals, or one or more humidity sensors, and/or the like. In some cases, the one or more household devices might include, but are not limited to, one or more of one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, or one or more drones with mounted heat lamps, and/or the like.

In some embodiments, the system might receive and analyze sensor data to determine whether there is any snow accumulation (as well as how much snow accumulation and perhaps also the moisture content in the snow (e.g., whether heavy wet snow, light powdery dry snow, or something in between, etc.) on at least one of one or more outdoor walkways, one or more outdoor stairways, one or more driveways, or one or more roadways, and/or the like. In response to such determinations, the system might send or autonomously control one or more of one or more automated snow shovels, one or more automated snow blowers, one or more de-icing machines, one or more heating mats, one or more built-in radiant heat systems under the at least one pathway, or one or more drones with mounted heat lamps, and/or the like to clear or melt the accumulated snow. Wind and weather sensors might inform the system as to when is appropriate to send or autonomously control these machines (e.g., if it is too windy, the wind might blow back any snow that is cleared or moved, although melted snow might not be affected; if it is going to drop in temperature further below freezing, de-icing versus blowing might be needed, while melting might require analysis of whether the melted stream would flow to some place that will not result in frozen and clogged up gutters or the like beyond the reach of the heat systems due to the temperature drop; etc.). In some cases, while sending or autonomously controlling the snow blower, de-icing machines, and/or any drones, the system might receive and analyze sensor data (e.g., motion detectors, proximity detectors, etc.) to determine whether any people and/or animals might cross paths with these machines; if so, the system might divert the machines, might stop the machines temporarily, and/or might use light, messages, and/or sounds to warn the people and/or animals, and/or the like.

In some instances, autonomously controlling, with the computing system, each of the identified one or more household devices to perform one or more tasks (at block 440) might comprise autonomously controlling, with the computing system, each of the identified one or more household devices to clean the customer premises (block 470). In some embodiments, the one or more first sensors of the two or more IoT-capable devices might comprise sensors monitoring accumulation of at least one of dust, dirt, or dander on at least one of one or more furniture surfaces, one or more flooring surfaces, one or more wall surfaces, one or more ceiling surfaces, one or more stairway surfaces, one or more appliance surfaces, one or more lighting surfaces, one or more electronic device surfaces, one or more windows, one or more doors, one or more window coverings, one or more cabinets, one or more handles, one or more decorations, or one or more mirrors, and/or the like. According to some embodiments, the one or more first sensors of the two or more IoT-capable devices might each include, without limitation, two or more of one or more moisture sensors, one or more cameras, one or more motion detectors detecting proximity of people or animals, one or more humidity sensors, one or more air quality sensors, one or more particulate sensors, one or more optical particulate sensors, or one or more electrostatic particulate sensors, and/or the like. In some cases, the one or more household devices might include, but are not limited to, one or more of one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, or one or more electrostatic particulate collecting tools, and/or the like.

In some cases, in response to detecting accumulation of at least one of dust, dirt, or dander (e.g., human hair and/or skin flakes, animal hair and/or skin flakes, and/or the like) on the at least one of the one or more furniture surfaces, the one or more flooring surfaces, the one or more wall surfaces, the one or more ceiling surfaces, the one or more stairway surfaces, the one or more appliance surfaces, the one or more lighting surfaces, the one or more electronic device surfaces, the one or more windows, the one or more doors, the one or more window coverings, the one or more cabinets, the one or more handles, the one or more decorations, or the one or more mirrors, and/or the like, using two or more of the one or more moisture sensors, the one or more cameras, the one or more humidity sensors, the one or more air quality sensors, the one or more particulate sensors, the one or more optical particulate sensors, or the one or more electrostatic particulate sensors, and/or the like, the system might send or autonomously control one or more of the one or more automated vacuum machines, the one or more automated sweeping machines, the one or more automated mopping machines, the one or more drones with dusting tool, the one or more aerial drones with vacuuming tool, the one or more aerial drones with wiping tool, the one or more air purifiers, the one or more air filters, or the one or more electrostatic particulate collecting tools, and/or the like to clean the at least one of dust, dirt, or dander from the affected areas. In some cases, while sending or autonomously controlling these machines, the system might receive and analyze sensor data (e.g., motion detectors, proximity detectors, etc.) to determine whether any people and/or animals might cross paths with these machines; if so, the system might divert the machines, might stop the machines temporarily, and/or might use light, messages, and/or sounds to warn the people and/or animals, and/or the like.

In some instances, autonomously controlling, with the computing system, each of the identified one or more household devices to perform one or more tasks (at block 440) might comprise autonomously controlling, with the computing system, each of the identified one or more household devices to perform laundry tasks (block 475).

According to some embodiments, the one or more first sensors of the two or more IoT-capable devices might each include, without limitation, one or more moisture sensors, one or more object position sensors, one or more cameras, one or more motion detectors detecting proximity of people or animals, one or more particulate sensors, one or more optical particulate sensors, or one or more electrostatic particulate sensors, and/or the like. The one or more household devices might include, but are not limited to, one or more of a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, or one or more drones with clothes hanging tool, and/or the like.

In some embodiments, the system might detect clothes on the floors or on furniture and such, and might send or autonomously control drones to transfer the clothes to a hamper (or to a particular hamper of a plurality of hampers based on sorting functionality by the drones that is based on colors of clothing, type of washing cycles, material of clothes, types of clothes, etc.). Drones might also be used to sort and transfer clothes from a particular hamper to the washing machine, while the system coordinates with the washing machine to set the cleaning cycle, which might be informed by what the drone "sees" in terms of washing labels and such, what the drone "sees" in terms of soil level, or what the drone scans in terms of QR codes or other codes on the washing labels, and/or the like. Drones might also be used to transfer (after self-cleaning its manipulators, perhaps by returning to its dock, which might have a cleaning station) washed clothes to a dryer, or to transfer particular clothes from the washing machine to hang on a hanger and pole/line, to hang on a clothes line, to hang on a hanging rack, and/or the like. Drones might also be used to transfer clothes from the dryer, sort the clothes, fold or hang clothes on hangers, and transfer the folded clothes to drawers or the like while transferring hung clothes to particular closets or the like, and so on. In some cases, drones might be used to either directly steam certain clothes or transfer to a steaming machine (which might also be autonomously controlled by the system) to steam certain clothes. Other laundry functions might also be controlled by the system as desired or as appropriate. In some cases, while sending or autonomously controlling the drones, the system might receive and analyze sensor data (e.g., motion detectors, proximity detectors, etc.) to determine whether any people and/or animals might cross paths with these machines; if so, the system might divert the drones, might stop the drones temporarily, and/or might use light, messages, and/or sounds to warn the people and/or animals, and/or the like.

In some instances, autonomously controlling, with the computing system, each of the identified one or more household devices to perform one or more tasks (at block 440) might comprise autonomously controlling, with the computing system, each of the identified one or more household devices to implement emergency response measures in response to at least one of fire or gas contamination at the customer premises (block 480). In some embodiments, the one or more first sensors of the two or more IoT-capable devices might each include, without limitation, one or more temperature sensors, one or more air quality sensors, one or more flame detectors, one or more carbon monoxide sensors, one or more smoke detectors, one or more airflow sensors, one or more humidity sensors, one or more cameras, or one or more motion detectors, and/or the like. The one or more household devices might include, but are not limited to, one or more of a fire suppression system, one or more telephone systems, a home security system, one or more ventilation fans, a furnace, an air conditioner, one or more emergency exit markers, one or more exit route markers, one or more speakers, one or more display devices, one or more lights, one or more automated window opening or closing systems, one or more automated door opening or closing systems, one or more automated skylight opening or closing systems, or one or more fire suppression drones, and/or the like.

According to some embodiments, in response to detecting fire within the customer premises, using at least one of the one or more temperature sensors, the one or more air quality sensors, the one or more flame detectors, the one or more carbon monoxide sensors, the one or more smoke detectors, the one or more airflow sensors, the one or more humidity sensors, the one or more cameras, or the one or more motion detectors, and/or the like, the system might send or autonomously control one or more of the fire suppression system, the one or more telephone systems, the home security system, the one or more ventilation fans, the furnace, the air conditioner, the one or more emergency exit markers, the one or more exit route markers, the one or more speakers, the one or more display devices, the one or more lights, the one or more automated window opening or closing systems, the one or more automated door opening or closing systems, the one or more automated skylight opening or closing systems, or the one or more fire suppression drones, and/or the like to try to extinguish the fire (using at least one of the fire suppression system, the one or more ventilation fans, the furnace, the air conditioner, the one or more automated window opening or closing systems, the one or more automated door opening or closing systems, the one or more automated skylight opening or closing systems, or the one or more fire suppression drones, and/or the like) or (failing that) to direct the flow of air into and out of particular rooms (using at least one of the fire suppression system, the one or more ventilation fans, the furnace, the air conditioner, the one or more automated window opening or closing systems, the one or more automated door opening or closing systems, the one or more automated skylight opening or closing systems, or the one or more fire suppression drones, and/or the like) to either contain the fire in certain areas or to divert the fire away from people and/or animals. Meanwhile, the system might direct people and/or animals along safe exit routes (using at least one of the one or more emergency exit markers, the one or more exit route markers, the one or more speakers, the one or more display devices, the one or more lights, and/or the like), while contacting the fire department and updating them regarding the status of the fire, contacting paramedics and updating them on affected persons and/or animals, and contacting police regarding the situation using the one or more telephone systems, the home security system, and/or the like.

In some instances, autonomously controlling, with the computing system, each of the identified one or more household devices to perform one or more tasks (at block 440) might comprise autonomously controlling, with the computing system, each of the identified one or more household devices to implement noise dampening measures in response to noise at the customer premises (block 485). According to some embodiments, the one or more first sensors of the two or more IoT-capable devices might each include, without limitation, one or more sound amplitude sensors, one or more sound propagation detectors, one or more frequency sensors, one or more airflow sensors, one or more temperature sensors, or one or more humidity sensors, and/or the like. The one or more household devices might include, but are not limited to, one or more of one or more ventilation fans, a furnace, an air conditioner, one or more speakers, or one or more white noise generators, and/or the like.

In some embodiments, in response to detecting noise emanating from one direction or one area, the system might determine the frequency, amplitude, airflow, temperature, and humidity, and might autonomously control at least one of the one or more ventilation fans, the furnace, the air conditioner, the one or more speakers, or the one or more white noise generators, and/or the like to either try to cancel out the noise and/or dampen the noise by controlling propagation of the sound waves caused by the noise.

Various other embodiments for implementing smart home, building, or customer premises functionalities may be provided consistent with the invention as described above.

Smart Vehicle Functionality

FIGS. 5 and 6 are schematic diagrams illustrating vehicle 500 and system 600 for implementing IoT-based smart vehicle functionality, in accordance with various embodiments.

With reference to FIG. 5, a vehicle 500 (although shown in FIG. 5 as a passenger car) might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like, in which might comprise one or more vehicle components, some of which might be IoT-capable devices or systems. The IoT-capable vehicle components, in some embodiments, might include, but are not limited to, a vehicle computing or control node 505, an engine 510, an electronic throttle control ("ETC") system 515, a vehicle brake system 520, an engine temperature sensor 525, a fuel level sensor 530, one or more proximity sensors 535 (e.g., vehicle camera-based collision avoidance system, the vehicle radar-based proximity detection system, the vehicle lidar-based proximity detection system, the vehicle sonar-based proximity detection system, etc.), one or more tire diagnostic sensors 540 (e.g., tire-pressure sensors, tire thread sensors, tire temperature sensors, tire slip sensors, etc.), one or more other sensors 545, a navigation system 550, a vehicle (analog or digital) instrument gauge cluster or vehicle heads-up-display ("HUD") system 555, and/or the like. Herein, the dash-lined modules representing the various vehicle components described above denote that the particular vehicle components are at or below the surface of the body of the vehicle 500.

In some cases, the one or more other sensors 545 might include, but not limited to, one or more other temperature sensors (e.g., heat sensors, infrared sensors, thermometers, etc.), one or more light sensors (e.g., ambient light sensors, luminosity sensors, illuminance sensors, solar light sensors, etc.), one or more speed sensors, one or more cameras, one or more location sensors (e.g., global positioning system ("GPS") devices, global navigation satellite system ("GNSS") devices, other location sensors, etc.), one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more fluid leak detectors, one or more occupant sensors, one or more impact sensors, one or more stress sensors, or one or more suspension system diagnostic sensors, and/or the like.

In some embodiments, the vehicle computing or control node 505 (also referred to herein as "computing systems") might interact in a machine-to-machine manner with each of at least one of one or more IoT-capable vehicle components and/or IoT-capable sensors that might be embodied within one or more of these devices or systems or embodied in stand-alone housings. These and other IoT-capable devices and systems are described in greater detail with respect to FIG. 6. FIGS. 7A-7D below describe several non-limiting embodiments of interactions amongst the computing systems, the IoT-capable devices, and the IoT-capable sensors, and/or the like for implementing IoT-based smart vehicle functionality.

In FIG. 6, system 600 might comprise one or more computing systems 605, one or more IoT-capable sensors 610, and one or more IoT-capable devices or vehicular components 615, each of which might communicate with one or both of the other two via machine-to-machine communications (not unlike the machine-to-machine communications as described above with respect to FIG. 1).

The computing system 605 might include, without limitation, at least one of a vehicle node 605a (or a single processor or a plurality of processors disposed therein, whereas, such processor or processors may be physical or virtual in nature), a computing node 605b that is located within the vehicle, or other computing systems 605c, which might include, but are not limited to, an IoT management node (that is either located within the vehicle, located at a customer premises associated with an owner of the vehicle, located at a business premises associated with a company that owns or operates the vehicle, or located at a service provider facility associated with a service provider that provides services to the owner of the vehicle), a server computer that is remote from the vehicle, a cloud computing system, a distributed computing system that integrates computing resources from two or more IoT-capable devices, or a combination of two or more of these computing systems, and/or the like.

According to some embodiments, the IoT-capable sensors 610 might include, without limitation, one or more temperature sensors 610a (e.g., heat sensors, infrared sensors, thermometers, etc.), one or more light sensors 610b (e.g., ambient light sensors, luminosity sensors, illuminance sensors, solar light sensors, etc.), one or more proximity sensors 610c (e.g., vehicle camera-based collision avoidance system, the vehicle radar-based proximity detection system, the vehicle lidar-based proximity detection system, the vehicle sonar-based proximity detection system, etc.), one or more speed sensors 610d, one or more cameras 610e, one or more fuel level sensors 610f (e.g., gasoline tank level sensors, diesel tank level sensors, battery charge level sensors, etc.), one or more location sensors 610g (e.g., global positioning system ("GPS") devices, global navigation satellite system ("GNSS") devices, other location sensors, etc.), one or more other sensors 610h, and/or the like. In some cases, the one or more other sensors 610h might include, but are not limited to, one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, one or more stress sensors, or one or more suspension system diagnostic sensors, and/or the like.

In some embodiments, the IoT-capable devices 615 might include one or more IoT-capable sensors 610 and/or might further include, without limitation, a vehicle computer 615a, a vehicle engine 615b, an electronic throttle control ("ETC") system 615c, a vehicle brake system 615d, a vehicle steering system 615e, a vehicle head light system 615f, a vehicle turn signal light system 615g, a vehicle brake light system 615h, a vehicle (analog or digital) instrument gauge cluster 615i, a vehicle heads-up-display ("HUD") system 615j, a vehicle-based transceiver or communications system 615k, a navigation system 615l, a vehicle display device 615m, a vehicle speaker system 615n, a vehicle (self-) diagnostic system 615o, a vehicle hazard light system 615p, a vehicle gear system 615q, and/or other IoT-capable devices 615r. In some cases, the other IoT-capable devices 615r might include, without limitation, a door unlocking/locking system, an automated door opening/closing system, an automated window opening or closing system, an automated vehicle window covering control system, a data port, one or more vehicle climate control systems, one or more air purifiers, one or more air filters, or one or more electrostatic particulate collecting tools, a fire suppression system, one or more lights (e.g., reading lights, LEDs, indicator lights, warning lights, etc.), a vehicle-based wireless access point ("WAP"), and/or the like.

In some embodiments, the IoT-capable sensors 610 might further include one or more snow accumulation sensors that detect the amount of snow that has accumulated on the vehicle. In some cases, heat pads might be distributed under various surfaces of the vehicle that, in response to the detection of snow on the vehicle from the one or more snow accumulation sensors, might turn on to melt the accumulated snow from the vehicle. According to some embodiments, the IoT-capable sensors 610 might further include at least one of one or more sound amplitude sensors, one or more sound propagation detectors, one or more frequency sensors, and/or the like on the exterior and/or on the interior of the vehicle. One or more white noise generators might utilize the data from the at least one of the one or more sound amplitude sensors, the one or more sound propagation detectors, the one or more frequency sensors, and/or the like to dampen or eliminate noise external to the vehicle for the occupants of the vehicle, while dampening or eliminating noise or conversations in the vehicle to protect the privacy of the occupants of the vehicle from people outside of the vehicle (and perhaps to protect people outside the vehicle from loud music playing in the vehicle), and/or the like.

The one or more computing systems 605, the IoT-capable sensors 610, and the IoT-capable devices/vehicular components 615 are otherwise similar, if not identical, to the one or more computing systems 105, the IoT-capable sensors 115, and the IoT-capable devices 110 or devices 120, respectively, as described above with respect to FIG. 1.

Figure 7A:
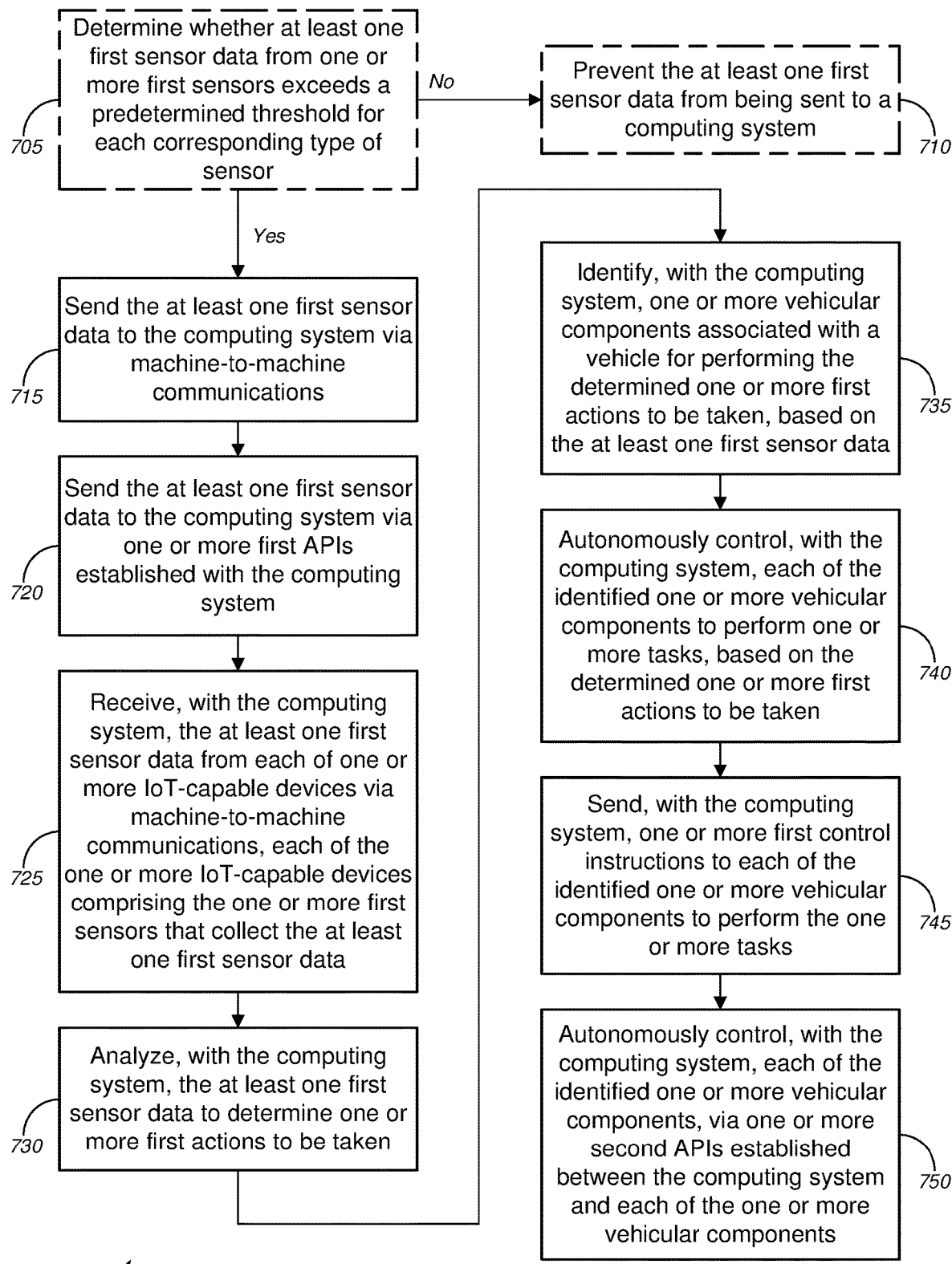
FIGS. 7A-7D are flow diagrams illustrating a method for implementing IoT-based smart vehicle functionality, in accordance with various embodiments.
Figure 7B:
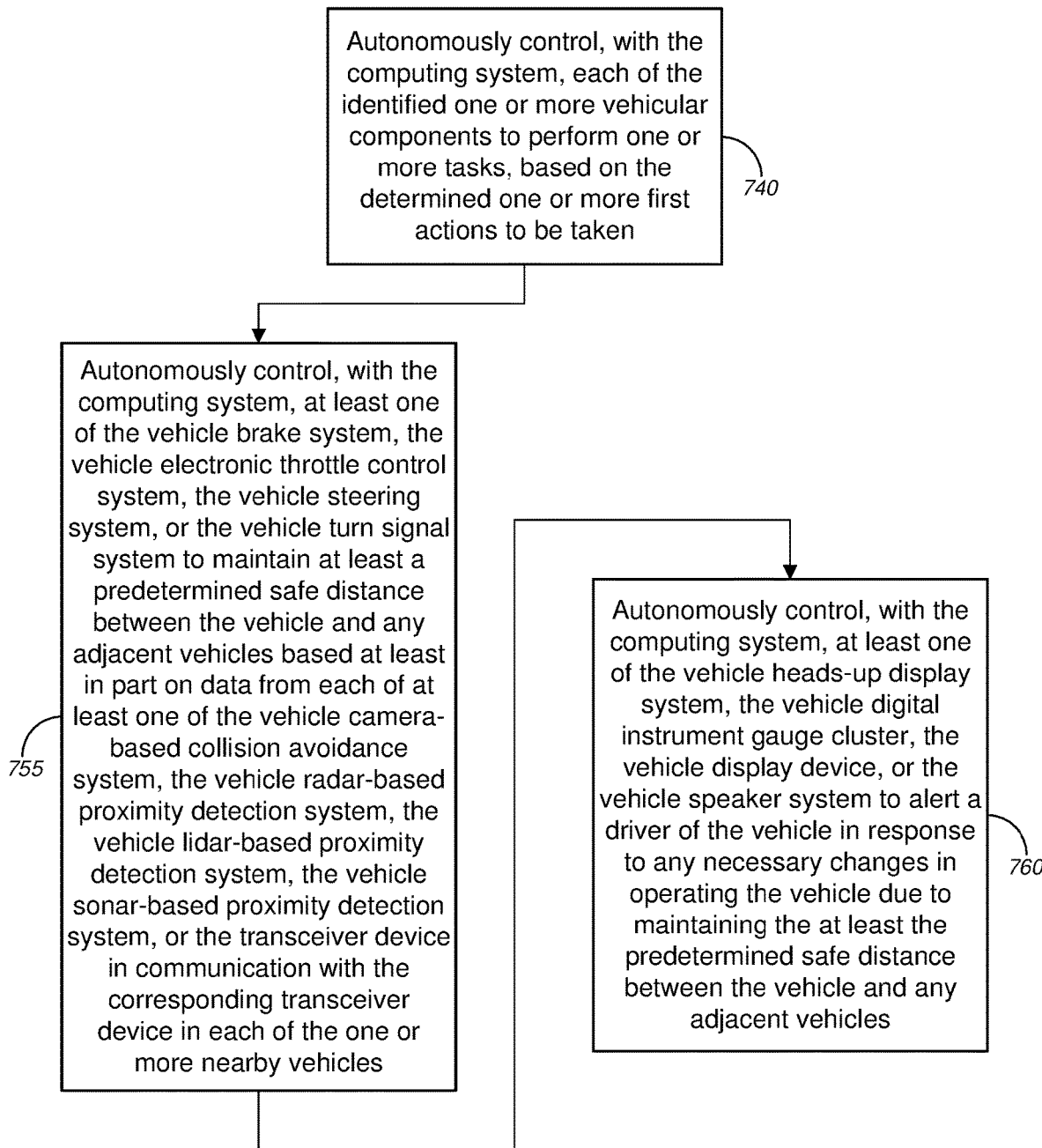
Figure 7C:
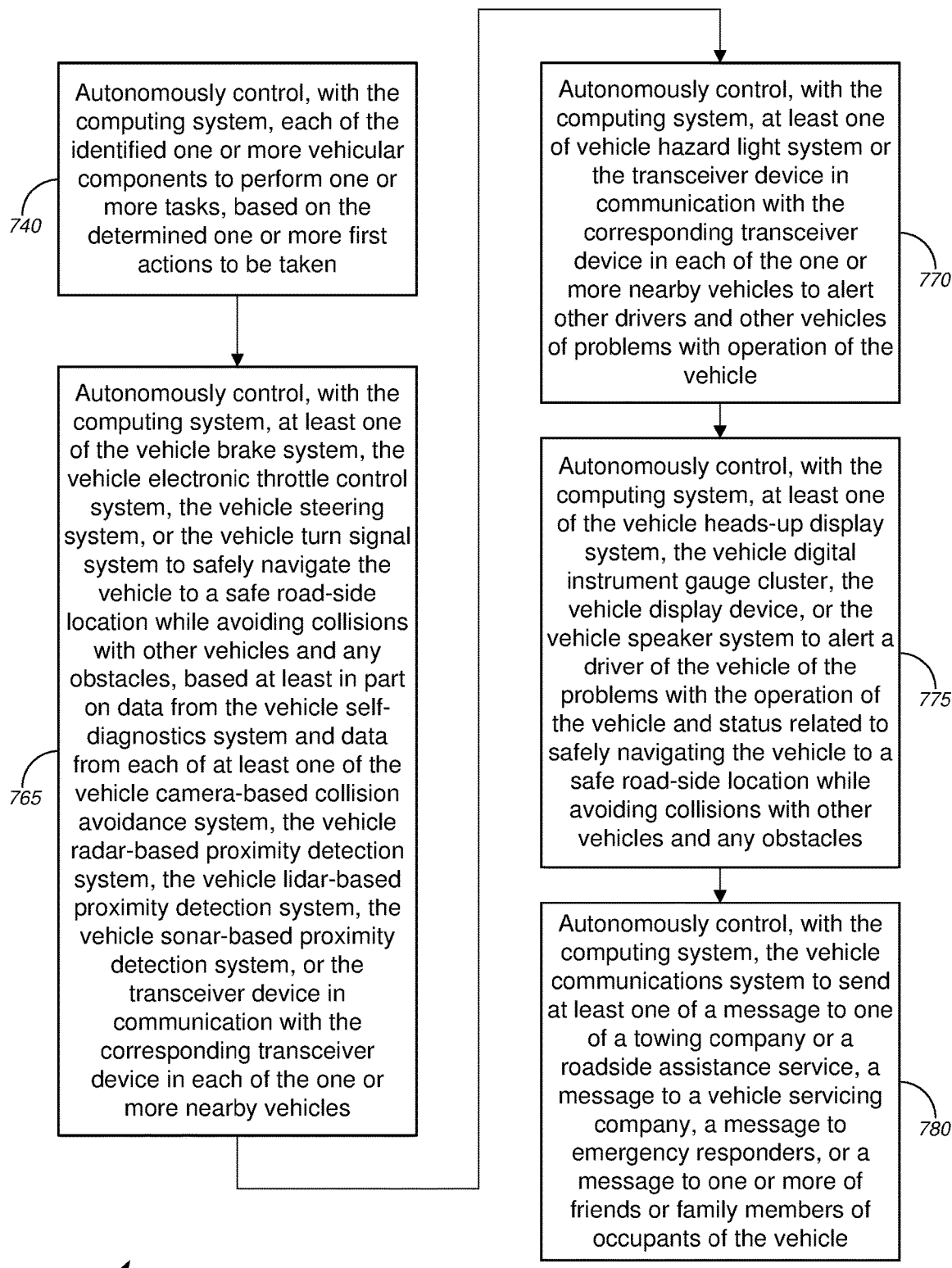
Figure 7D:
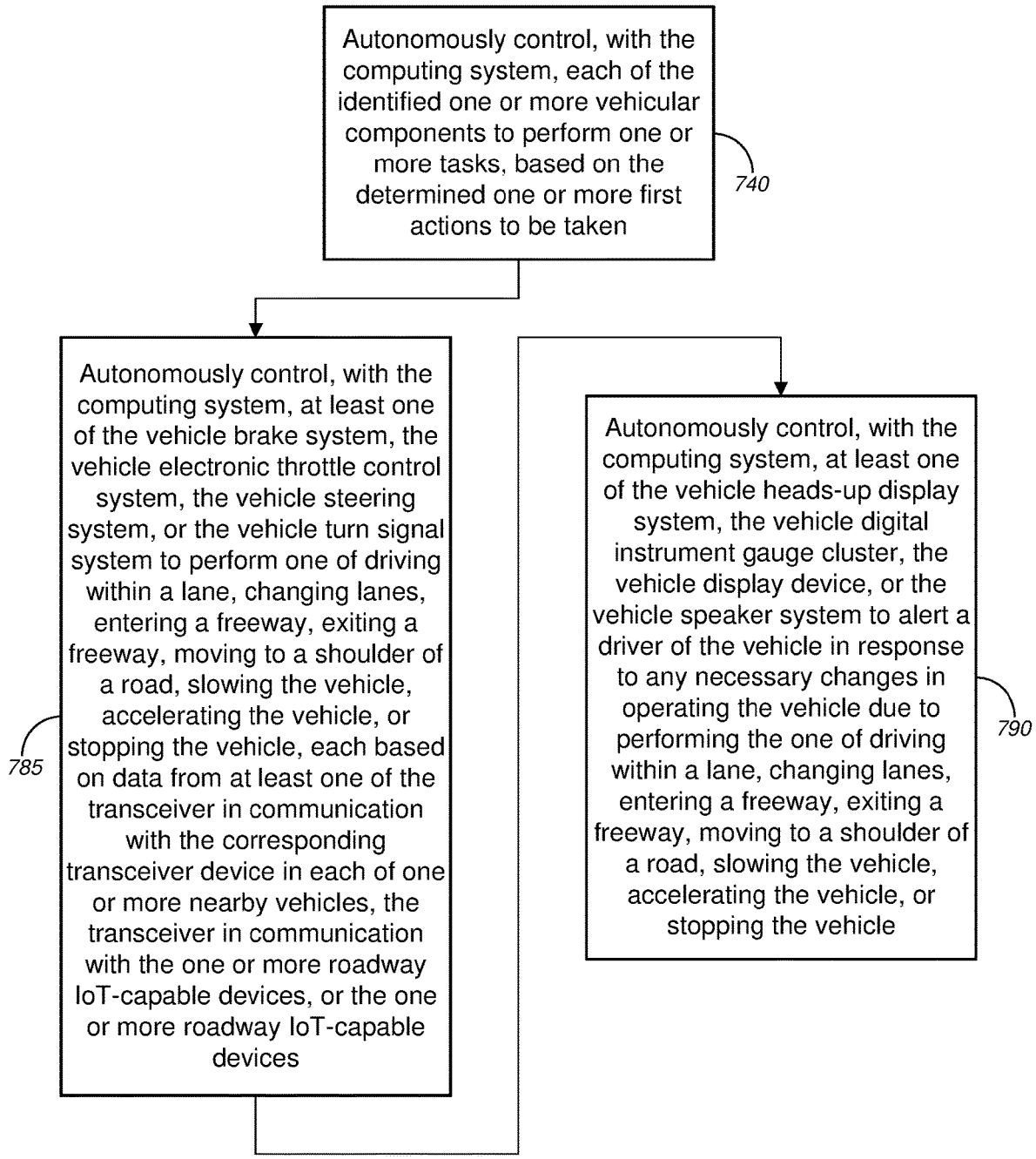

FIGS. 7A-7D (collectively, "FIG. 7") are flow diagrams illustrating a method 700 for implementing IoT-based smart vehicle functionality, in accordance with various embodiments. FIG. 7A depicts the method 700 for implementing IoT-based smart vehicle functionality, while FIGS. 7B-7D depict various different embodiments for autonomously controlling each of the identified one or more vehicular components to perform the one or more tasks in the method 700 of FIG. 7A.

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems 100, 500, and 600 of FIGS. 1, 5, and 6 respectively (or components thereof), such methods may also be implemented using any suitable hardware (or software) implementation. Similarly, while each of the systems 100, 500, and 600 of FIGS. 1, 5, and 6, respectively (or components thereof), can operate according to the method 700 illustrated by FIG. 7 (e.g., by executing instructions embodied on a computer readable medium), the systems 100, 500, and 600 of FIGS. 1, 5, and 6 can each also operate according to other modes of operation and/or perform other suitable procedures.

In FIG. 7A, method 700, at optional block 705, might comprise determining whether at least one first sensor data from one or more first sensors exceeds a predetermined threshold for each corresponding type of sensor. In response to a determination that the at least one first sensor data from the one or more first sensors does not exceed the predetermined threshold for at least one corresponding type of sensor, the at least one first sensor data is prevented from being sent to a computing system (optional block 710). On the other hand, in response to a determination that the at least one first sensor data from the one or more first sensors does exceed the predetermined threshold for each corresponding type of sensor, the at least one first sensor data is sent to the computing system via machine-to-machine communications (block 715). In some embodiments, sending the at least one first sensor data to the computing system via machine-to-machine communications comprises sending the at least one first sensor data to the computing system via machine-to-machine communications, via one or more first application programming interfaces ("APIs") established with the computing system (block 720).

At block 725, method 700 might comprise receiving, with the computing system, the at least one first sensor data from each of one or more Internet of Things ("IoT")-capable devices via machine-to-machine communications, each of the one or more IoT-capable devices comprising the one or more first sensors that collect the at least one first sensor data. Method 700, at block 730, might comprise analyzing, with the computing system, the at least one first sensor data to determine one or more first actions to be taken. Method 700 might further comprise, at block 735, identifying, with the computing system, one or more vehicular components associated with a vehicle for performing the determined one or more first actions to be taken, based on the at least one first sensor data from each of the one or more IoT-capable devices. At block 740, method 700 might comprise autonomously controlling, with the computing system, each of the identified one or more vehicular components to perform one or more tasks, based on the determined one or more first actions to be taken.

According to some embodiments, autonomously controlling, with the computing system, each of the identified one or more vehicular components to perform one or more tasks might comprise sending, with the computing system, one or more first control instructions to each of the identified one or more vehicular components to perform the one or more tasks, based on the determined one or more first actions to be taken (block 745). Additionally or alternatively, autonomously controlling, with the computing system, each of the identified one or more vehicular components to perform one or more tasks might comprise autonomously controlling, with the computing system, each of the identified one or more vehicular components, via one or more second APIs established between the computing system and each of the one or more vehicular components (block 750).

Turning to FIG. 7B, in some embodiments, the identified one or more vehicular components might include, but are not limited to, at least one of a vehicle brake system, a vehicle gear system, a vehicle electronic throttle control ("ETC") system, a vehicle steering system, a vehicle turn signal system, a vehicle heads-up display system, a vehicle digital instrument gauge cluster, a vehicle display device, or a vehicle speaker system, and/or the like. The one or more IoT-capable devices, in some cases, might include, without limitation, at least one of a vehicle camera-based collision avoidance system, a vehicle radar-based proximity detection system, a vehicle lidar-based proximity detection system, a vehicle sonar-based proximity detection system, a location sensor, or a transceiver device in communication with a corresponding transceiver device in each of one or more nearby vehicles, and/or the like. According to some embodiments, autonomously controlling, with the computing system, each of the identified one or more vehicular components to perform one or more tasks (at block 740) might comprise autonomously controlling, with the computing system, at least one of the vehicle brake system, a vehicle gear system, the vehicle ETC system, the vehicle steering system, or the vehicle turn signal system to maintain at least a predetermined safe distance between the vehicle and any adjacent vehicles (i.e., vehicles in front, behind, or to either side of the vehicle) based at least in part on data from each of at least one of the vehicle camera-based collision avoidance system, the vehicle radar-based proximity detection system, the vehicle lidar-based proximity detection system, the vehicle sonar-based proximity detection system, or the transceiver device in communication with the corresponding transceiver device in each of the one or more nearby vehicles (block 755), and autonomously controlling, with the computing system, at least one of the vehicle heads-up display system, the vehicle digital instrument gauge cluster, the vehicle display device, or the vehicle speaker system to alert a driver of the vehicle in response to any necessary changes in operating the vehicle due to maintaining the at least the predetermined safe distance between the vehicle and any adjacent vehicles (block 760).

With reference to FIG. 7C, according to some embodiments, the identified one or more vehicular components might include, but are not limited to, at least one of a vehicle brake system, a vehicle gear system, a vehicle ETC system, a vehicle steering system, a vehicle turn signal system, a vehicle heads-up display system, a vehicle digital instrument gauge cluster, a vehicle display device, a vehicle speaker system, a vehicle hazard light system, or a vehicle self-diagnostics system, and/or the like. The one or more IoT-capable devices, in some instances, might include, without limitation, at least one of a vehicle camera-based collision avoidance system, a vehicle radar-based proximity detection system, a vehicle lidar-based proximity detection system, a vehicle sonar-based proximity detection system, or a transceiver device in communication with a corresponding transceiver device in each of one or more nearby vehicles, and/or the like. In some embodiments, autonomously controlling, with the computing system, each of the identified one or more vehicular components to perform one or more tasks (at block 740) might comprise autonomously controlling, with the computing system, at least one of the vehicle brake system, the vehicle gear system, the vehicle ETC system, the vehicle steering system, or the vehicle turn signal system to safely navigate the vehicle to a safe road-side location while avoiding collisions with other vehicles and any obstacles, based at least in part on data from the vehicle self-diagnostics system and data from each of at least one of the vehicle camera-based collision avoidance system, the vehicle radar-based proximity detection system, the vehicle lidar-based proximity detection system, the vehicle sonar-based proximity detection system, or the transceiver device in communication with the corresponding transceiver device in each of the one or more nearby vehicles (block 765).

In some cases, autonomously controlling, with the computing system, each of the identified one or more vehicular components to perform one or more tasks (at block 740) might further comprise autonomously controlling, with the computing system, at least one of vehicle hazard light system or the transceiver device in communication with the corresponding transceiver device in each of the one or more nearby vehicles to alert other drivers and other vehicles of problems with operation of the vehicle (block 770), and autonomously controlling, with the computing system, at least one of the vehicle heads-up display system, the vehicle digital instrument gauge cluster, the vehicle display device, or the vehicle speaker system to alert a driver of the vehicle of the problems with the operation of the vehicle and status related to safely navigating the vehicle to a safe road-side location while avoiding collisions with other vehicles and any obstacles (block 775).

In some instances, the identified one or more vehicular components might further comprise a vehicle communications system, and autonomously controlling, with the computing system, each of the identified one or more vehicular components to perform one or more tasks (at block 740) might further comprise autonomously controlling, with the computing system, the vehicle communications system to send at least one of a message to one of a towing company or a roadside assistance service to send a tow truck, a message to a vehicle servicing company regarding the problems with the operation of the vehicle and regarding the vehicle being en route, a message to emergency responders regarding the problems with the operation of the vehicle and location of the vehicle, or a message to one or more of friends or family members of occupants of the vehicle regarding the problems with the operation of the vehicle, the location of the vehicle, and status of the occupants of the vehicle (block 780).

In the embodiment of FIG. 7D, the identified one or more vehicular components might include, but are not limited to, at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, or a vehicle speaker system, and/or the like. In some cases, the one or more IoT-capable devices might include, without limitation, at least one of a transceiver device in communication with a corresponding transceiver device in each of one or more nearby vehicles, a transceiver in communication with one or more roadway IoT-capable devices, or the one or more roadway IoT-capable devices, the one or more roadway IoT-capable devices comprising IoT-capable devices embedded in one or more of at least one roadway structure, at least one street lamp, at least one sidewalk structure, or at least one apparatus each mounted to one or more of the at least one roadway structure, the at least one street lamp, or the at least one sidewalk structure, and/or the like. According to some embodiments, autonomously controlling, with the computing system, each of the identified one or more vehicular components to perform one or more tasks (at block 740) might comprise autonomously controlling, with the computing system, at least one of the vehicle brake system, the vehicle gear system, the vehicle electronic throttle control system, the vehicle steering system, or the vehicle turn signal system to perform one of driving within a lane, changing lanes, entering a freeway, exiting a freeway, moving to a shoulder of a road, slowing the vehicle, accelerating the vehicle, or stopping the vehicle, each based on data from at least one of the transceiver in communication with the corresponding transceiver device in each of one or more nearby vehicles, the transceiver in communication with the one or more roadway IoT-capable devices, or the one or more roadway IoT-capable devices (block 785).

In some embodiments, autonomously controlling, with the computing system, each of the identified one or more vehicular components to perform one or more tasks (at block 740) might further comprise autonomously controlling, with the computing system, at least one of the vehicle heads-up display system, the vehicle digital instrument gauge cluster, the vehicle display device, or the vehicle speaker system to alert a driver of the vehicle in response to any necessary changes in operating the vehicle due to performing the one of driving within a lane, changing lanes, entering a freeway, exiting a freeway, moving to a shoulder of a road, slowing the vehicle, accelerating the vehicle, or stopping the vehicle (block 790).

Various other embodiments for implementing smart vehicle functionalities may be provided consistent with the invention as described above.

Smart Roadway Functionality

FIGS. 8 and 9 are schematic diagrams illustrating systems 800 and 900 for implementing IoT-based smart roadway functionality, in accordance with various embodiments.

With reference to FIG. 8, system 800 might comprise a city block 805. Although a city block 805 is shown if FIG. 8, other geographical man-made constructs might similarly apply, such constructs including, but not limited to suburban sub-divisions, town centers, down town districts, up-town districts, towns, villages, neighborhoods, and/or the like (collectively referred to herein as "city block" for simplicity of illustration). In some embodiments, a city block 805 might include, without limitation, one or more buildings or premises 810 (which might correspond to customer premises 200 of FIG. 2, which as described above, might comprise a home, building, business premises, commercial office, school, industrial building, etc.), one or more roadways 815 (which might include, without limitation, at least one of a local road, a main road, a highway, an airport apron, an airport ramp, an airport runway, a canal, a lock, or a waterway, and/or the like), one or more lane markers 820, one or more pathways 825, one or more traffic control signal devices 830, one or more roadway street lights 835, one or more sidewalk or pedestrian street lights 840, one or more roadway-embedded battery charging nodes or strips 845, one or more roadway-embedded power generation nodes 850, one or more roadway-embedded sensors 855, one or more pathway-embedded sensors 860, one or more vehicles 865 (which might correspond to vehicle 500 of FIG. 5, which as described above, might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like), and/or the like.

According to some embodiments, the one or more lane markers 820 might comprise one or more dynamic lane change markers as described in detail below. In some cases, the one or more roadway-embedded battery charging nodes or strips 845 and the one or more roadway-embedded power generation nodes 850 might respectively charge batteries in electric vehicles as the vehicles are travelling on the roadway 825 over the battery charging nodes (or while parked) and generate electrical power from solar energy, heat or friction energy from solar radiation or vehicle travel, and/or pressure transduction from vehicle passage, as described in detail below. The one or more roadway and/or pathway sensors 855 and 860, respectively, might each include, but are not limited to, at least one of one or more temperature sensors, one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, or one or more particulate sensors, one or more impact sensors, one or more stress sensors, one or more location sensors, and/or the like.

In some embodiments, a computing system might interact in a machine-to-machine manner with each of at least one of one or more IoT-capable devices (e.g., the one or more lane markers 820, the one or more traffic control signal devices 830, the one or more roadway street lights 835, the one or more sidewalk or pedestrian street lights 840, the one or more roadway-embedded battery charging nodes or strips 845, the one or more roadway-embedded power generation nodes 850, the one or more vehicles 865) and/or IoT-capable sensors (the one or more roadway-embedded sensors 855, one or more pathway-embedded sensors 860, or other sensors (e.g., those that might be embodied within one or more of these devices or systems or embodied in stand-alone housings)). These and other IoT-capable devices and systems are described in greater detail with respect to FIG. 9. FIGS. 10A-10E below describe several non-limiting embodiments of interactions amongst the computing systems, the IoT-capable devices, and the IoT-capable sensors, and/or the like for implementing IoT-based smart vehicle functionality. In some cases, the system as described herein may be used in adjunct integral areas, including, but not limited to Interstate rest stops and the myriad of functions at rest stops (e.g., janitorial functions, map functions, vending functions, communications functions, charging functions, etc.). Other areas in which the system could be applied might include, without limitation, a weigh station, a cattle guard, a state/national park entrance, a toll booth, median services (such as gas stations, restaurants, etc), although these may be more prevalent on private toll ways or the like.

In FIG. 9, system 900 might comprise one or more computing systems 905, one or more IoT-capable sensors 910, and one or more IoT-capable devices or devices 915, each of which might communicate with one or both of the other two via machine-to-machine communications (not unlike the machine-to-machine communications as described above with respect to FIG. 1).

The computing system 905 might include, without limitation, at least one of a vehicle node 905a (or a single processor or a plurality of processors disposed therein, whereas, such processor or processors may be physical or virtual in nature), a management node 905*b* that is located either in, on, or along the roadway or at a central location, or other computing systems 905*c*, which might include, but are not limited to, an IoT management node (that is either located within the vehicle, located at a customer premises associated with an owner of the vehicle, located at a business premises associated with a company that owns or operates the vehicle, or located at a service provider facility associated with a service provider that provides services to the owner of the vehicle), one or more roadway-embedded IoT management nodes, one or more municipal, state, federal, or private entity IoT management nodes, a computing system disposed at a vehicle traffic control center, a server computer that is remote from the vehicle, a cloud computing system, a distributed computing system that integrates computing resources from two or more IoT-capable devices, or a combination of two or more of these computing systems, and/or the like.

According to some embodiments, the IoT-capable sensors 910 might include, without limitation, one or more temperature sensors 910*a* (e.g., heat sensors, infrared sensors, thermometers, etc.), one or more light sensors 910*b* (e.g., ambient light sensors, luminosity sensors, illuminance sensors, solar light sensors, etc.), one or more humidity sensors 910*c*, one or more motion sensors 910*d*, one or more structural integrity sensors 910*e*, one or more pressure sensors 910*f*, one or more air quality sensors 910*g*, one or more other sensors 910*h*, and/or the like. In some cases, the one or more other sensors 910*h* might include, but are not limited to, one or more communications signal detectors, one or more seismic sensors, one or more weather station sensors, one or more moisture sensors, one or more wind sensors, or one or more particulate sensors, one or more impact sensors, one or more stress sensors, one or more location sensors, and/or the like. In some instances, the one or more IoT-capable sensors 910 might further comprise IoT-capable sensors (which are described in detail above with respect to FIG. 6, for example) in each of one or more vehicles travelling on the roadway. In some cases, the one or more structural integrity sensors 910*e* might include, without limitation, at least one of two or more global positioning system sensors or two or more relative position sensors, where the sensor data from these sensors 910*e* might comprise data indicating a change in position of one structural integrity sensor relative to another structural integrity sensor beyond a predetermined threshold amount, thereby indicating that there might be damage to the roadway.

In some embodiments, the IoT-capable devices 915 might include one or more IoT-capable sensors 910 and/or might further include, without limitation, one or more power generation nodes 915*a*, one or more battery charging nodes 915*b*, one or more communications systems 915*c*, one or more traffic control signal devices 915*d*, one or more street lamps 915*e*, one or more dynamic lane change markers 915*f*, one or more vehicular components in each of one or more vehicles travelling on the roadway (including, but not limited to, a vehicle computer 915*g*, a vehicle engine 915*h*, an electronic throttle control ("ETC") system 915*i*, a vehicle brake system 915*j*, a vehicle steering system 915*k*, a vehicle light system 915*l*, a vehicle (analog or digital) instrument gauge cluster 915*m*, a navigation system 915*n*, a vehicle (self-) diagnostic system 915*o*, a vehicle-based transceiver or communications system 915*p*, and/or the like), a vehicle gear system 915*q*, and/or other IoT-capable devices 915*r*. In some cases, the other IoT-capable devices 915*r* might include, without limitation, one or more air purifiers, one or more air filters, or one or more electrostatic particulate collecting tools, a fire suppression system, one or more lights (e.g., LEDs, indicator lights, warning lights, etc.), a wireless access point ("WAP"), and/or the like.

In some embodiments, one or more of the IoT-capable sensors 910 and/or one or more of the IoT-capable devices 915 might be roadway-embedded sensors or devices, a top surface of each of which being one of substantially level with a top surface of the roadway or below the top surface of the roadway. Such roadway-embedded sensors or devices might have a housing that is made of a material that can durably and resiliently protect contents thereof while being disposed or buried in the roadway surface (i.e., disposed or buried under the roadway surface or flush mounted to a wall attached to a canal or waterway lock, or the like), and especially against damage caused by shifting ground conditions (such as by shifting roadway, tremors, etc.) and against damage caused by traffic loads (i.e., weight of vehicles travelling on the roadways; impact traffic debris from accidents or items falling off vehicles; etc.) or natural loads (i.e., weight of snow, ice, water, etc.; impact from hail, falling trees, etc.), and/or the like.

According to some embodiments, the IoT-capable sensors 910 might further include one or more snow accumulation sensors that detect the amount of snow or ice that has accumulated on the roadway. In some cases, heat pads might be distributed under various surfaces of the roadway that, in response to the detection of snow on the roadway from the one or more snow accumulation sensors, might turn on to melt the accumulated snow from the roadway. In other cases, the communications systems 915*c*, in conjunction with the snow accumulation sensors and location sensors, might send messages to snow removal companies and/or crews in such companies to indicate the amount, type, and location of the accumulated snow for removal.

The one or more computing systems 905, the IoT-capable sensors 910, and the IoT-capable devices/devices 915 are otherwise similar, if not identical, to the one or more computing systems 105, the IoT-capable sensors 115, and the IoT-capable devices 110 or devices 120, respectively, as described above with respect to FIG. 1.

Figure 10A:
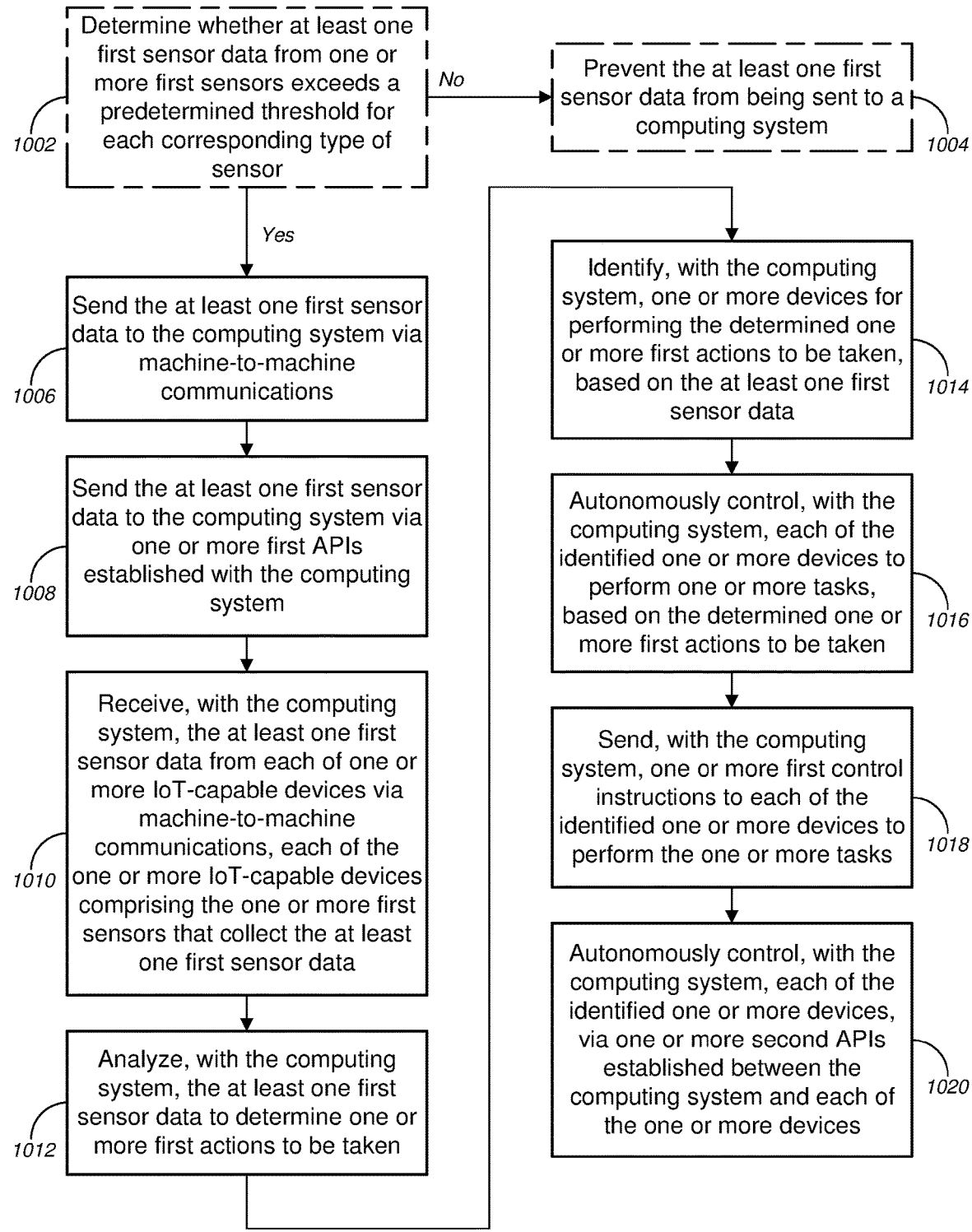
FIGS. 10A-10E are flow diagrams illustrating a method for implementing IoT-based smart roadway functionality, in accordance with various embodiments.

FIGS. 10A-10E (collectively, "FIG. 10") are flow diagrams illustrating a method 1000 for implementing IoT-based smart roadway functionality, in accordance with various embodiments. FIG. 10A depicts the method 1000 for implementing IoT-based smart roadway functionality, while FIGS. 10B-10E depict various different embodiments for autonomously controlling each of the identified one or more vehicular components to perform the one or more tasks in the method 1000 of FIG. 10A. Herein, the roadway might include, without limitation, at least one of a local road, a main road, a highway, an airport apron, an airport ramp, an airport runway, a canal, a lock, or a waterway, and/or the like.

While the techniques and procedures are depicted and/or described in a certain order for purposes of illustration, it should be appreciated that certain procedures may be reordered and/or omitted within the scope of various embodiments. Moreover, while the method 1000 illustrated by FIG. 10 can be implemented by or with (and, in some cases, are described below with respect to) the systems 100, 800, and 900 of FIGS. 1, 8, and 9 respectively (or components thereof), such methods may also be implemented using any suitable hardware (or software) implementation. Similarly, while each of the systems 100, 800, and 900 of FIGS. 1, 8, and 9, respectively (or components thereof), can operate according to the method 1000 illustrated by FIG. 10 (e.g., by executing instructions embodied on a computer readable medium), the systems 100, 800, and 900 of FIGS. 1, 8, and 9 can each also operate according to other modes of operation and/or perform other suitable procedures.

With reference to FIG. 10A, method 1000, at optional block 1002, might comprise determining whether at least one first sensor data from one or more first sensors exceeds a predetermined threshold for each corresponding type of sensor. In response to a determination that the at least one first sensor data from the one or more first sensors does not exceed the predetermined threshold for at least one corresponding type of sensor, the at least one first sensor data is prevented from being sent to a computing system (optional block 1004). On the other hand, in response to a determination that the at least one first sensor data from the one or more first sensors does exceed the predetermined threshold for each corresponding type of sensor, the at least one first sensor data is sent to the computing system via machine-to-machine communications (block 1006). In some embodiments, sending the at least one first sensor data to the computing system via machine-to-machine communications comprises sending the at least one first sensor data to the computing system via machine-to-machine communications, via one or more first application programming interfaces ("APIs") established with the computing system (block 1008).

At block 1010, method 1000 might comprise receiving, with the computing system, the at least one first sensor data from each of one or more Internet of Things ("IoT")-capable devices via machine-to-machine communications, each of the one or more IoT-capable devices comprising the one or more first sensors that collect the at least one first sensor data. Method 1000, at block 1012, might comprise analyzing, with the computing system, the at least one first sensor data to determine one or more first actions to be taken. Method 1000 might further comprise, at block 1014, identifying, with the computing system, one or more devices for performing the determined one or more first actions to be taken, based on the at least one first sensor data from each of the one or more IoT-capable devices. At block 1016, method 1000 might comprise autonomously controlling, with the computing system, each of the identified one or more devices to perform one or more tasks, based on the determined one or more first actions to be taken.

According to some embodiments, autonomously controlling, with the computing system, each of the identified one or more devices to perform one or more tasks might comprise sending, with the computing system, one or more first control instructions to each of the identified one or more devices to perform the one or more tasks, based on the determined one or more first actions to be taken (block 1018). Additionally or alternatively, autonomously controlling, with the computing system, each of the identified one or more devices to perform one or more tasks might comprise autonomously controlling, with the computing system, each of the identified one or more devices, via one or more second APIs established between the computing system and each of the one or more devices (block 1020).

Figure 10B:
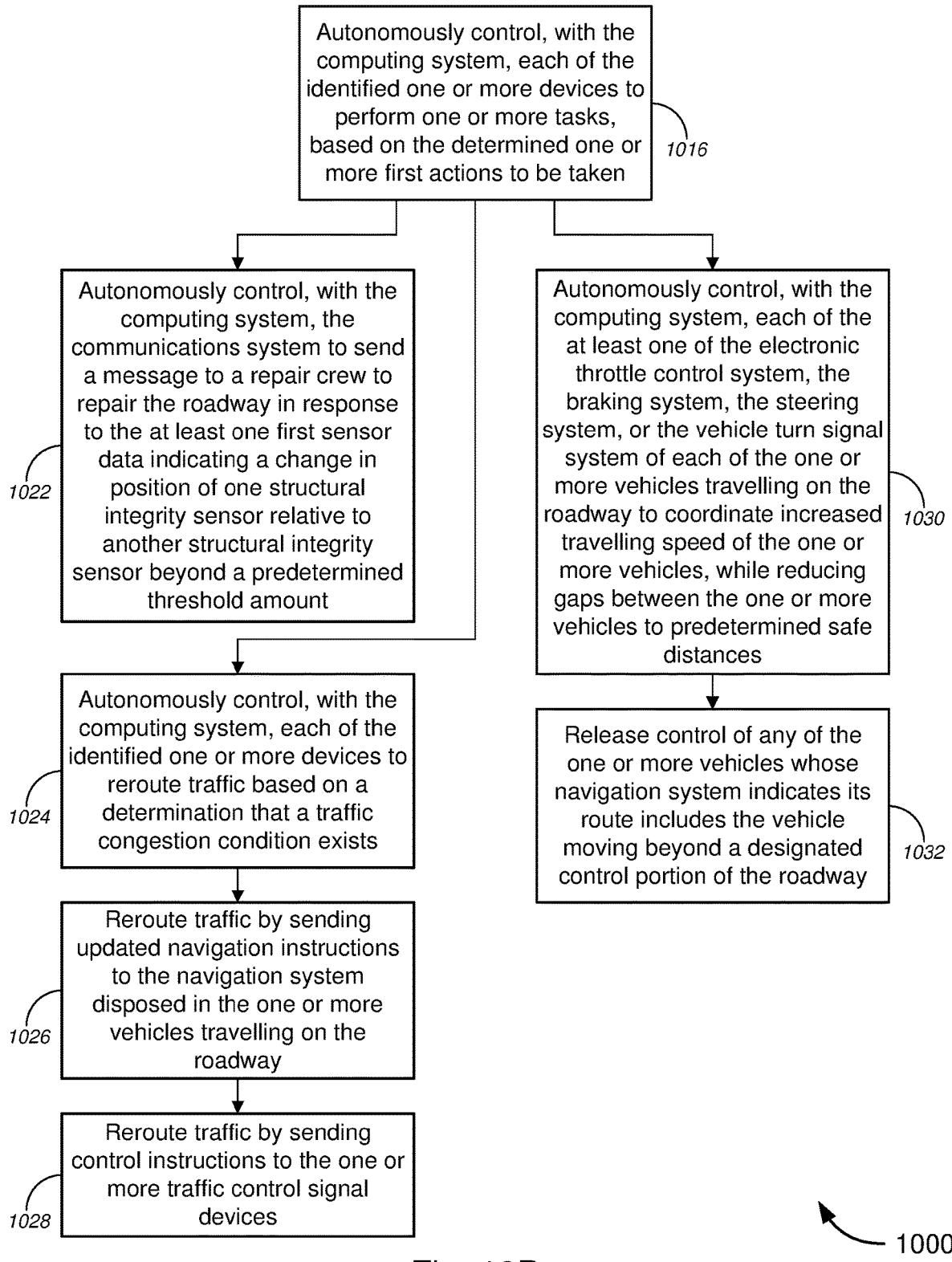

Turning to FIG. 10B, according to some embodiments, the one or more first IoT-capable devices, which are embedded in the roadway structure of the roadway, each comprises one of one or more communications signal detectors, one or more wireless access points, one or more pressure sensors, one or more temperature sensors, one or more motion sensors, one or more structural integrity sensors, one or more solar light sensors, one or more seismic sensors, one or more weather station sensors, one or more air quality sensors, one or more moisture sensors, one or more wind sensors, or one or more particulate sensors, and/or the like, a top surface of each first IoT-capable device being one of substantially level with a top surface of the roadway or below the top surface of the roadway. In some cases, the one or more structural integrity sensors might include, but are not limited to, at least one of two or more global positioning system sensors or two or more relative position sensors, and/or the like, and the at least one first sensor data might include, without limitation, data indicating a change in position of one structural integrity sensor relative to another structural integrity sensor beyond a predetermined threshold amount, and the like. The identified one or more devices comprise a communications system, and autonomously controlling, with the computing system, each of the identified one or more devices to perform one or more tasks (at block 1016) might comprise autonomously controlling, with the computing system, each of the identified one or more devices to perform one or more tasks comprises autonomously controlling, with the computing system, the communications system to send a message to a repair crew to repair the roadway in response to the at least one first sensor data indicating a change in position of one structural integrity sensor relative to another structural integrity sensor beyond a predetermined threshold amount (block 1022).

According to some embodiments, the computing system might include, but is not limited to, at least one of a roadway-embedded IoT management node, a plurality of roadway-embedded IoT management nodes, a municipal, state, federal, or private entity IoT management node, a plurality of municipal, state, federal, or private entity IoT management nodes, a computing system disposed at a vehicle traffic control center, a cloud computing system, or a distributed computing system that integrates computing resources from plurality of IoT-capable devices, and/or the like. In some cases, the plurality of IoT-capable devices might further include one or more second IoT-capable devices that are each disposed in one of a street lamp, a traffic control signal device, or an above-ground structure (i.e., a telecommunications cabinet or pedestal, etc.), and/or the like. In some instances, the one or more second IoT-capable devices might each include, but is not limited to, one of one or more communications signal detectors, one or more wireless access points, one or more temperature sensors, one or more solar light sensors, one or more weather station sensors, one or more air quality sensors, one or more humidity sensors, one or more moisture sensors, one or more wind sensors, or one or more particulate sensors, and/or the like.

In some embodiments, the one or more first IoT-capable devices might include, but are not limited to, at least one of one or more pressure sensors, one or more temperature sensors, or one or more motion sensors, and/or the like. Autonomously controlling, with the computing system, each of the identified one or more devices to perform one or more tasks (at block 1016) might comprise autonomously controlling, with the computing system, each of the identified one or more devices to halt or reroute traffic based on a determination that a traffic congestion condition exists (block 1024). In some cases, the identified one or more devices might include, without limitation, at least one of a navigation system disposed in one or more vehicles travelling on the roadway or one or more traffic control signal devices, and autonomously controlling, with the computing system, each of the identified one or more devices to halt or reroute traffic based on a determination that a traffic congestion condition exists might comprise autonomously controlling, with the computing system, each of the identified one or more devices to halt or reroute traffic based on a determination that a traffic congestion condition exists, by performing at least one of sending updated navigation instructions to the navigation system disposed in the one or more vehicles travelling on the roadway (block 1026) or sending control instructions to the one or more traffic control signal devices (block 1028), and/or the like.

In some cases, the one or more first IoT-capable devices might include, without limitation, at least one of one or more pressure sensors, one or more temperature sensors, or one or more motion sensors, and/or the like. The plurality of IoT-capable devices might further include one or more second IoT-capable devices including, but not limited to, at least one of a speedometer sensor, a vehicle navigation system, an electronic throttle control system, a braking system, a gear system, a steering system, or a vehicle turn signal system of each of one or more vehicles travelling on the roadway. According to some embodiments, the identified one or more devices might include, without limitation, at least one of the electronic throttle control system, the braking system, the vehicle gear system, the steering system, or the vehicle turn signal system, and/or the like, of each of the one or more vehicles travelling on the roadway. In some embodiments, autonomously controlling, with the computing system, each of the identified one or more devices to perform one or more tasks (at block 1016) might comprise autonomously controlling, with the computing system, each of the at least one of the electronic throttle control system, the braking system, the vehicle gear system, the steering system, or the vehicle turn signal system of each of the one or more vehicles travelling on the roadway to coordinate changes in travelling speed of the one or more vehicles (in some cases, to coordinate increasing the speed of the one or more vehicles to increase flow of traffic), while reducing or optimizing gaps between the one or more vehicles to predetermined safe distances (block 1030). In some cases, autonomously controlling, with the computing system, each of the identified one or more devices to perform one or more tasks (at block 1016) might further comprise releasing control of any of the one or more vehicles whose navigation system indicates its route includes the vehicle moving beyond a designated control portion of the roadway (i.e., the vehicle's route includes the vehicle exiting the roadway to another roadway, to a parking structure/lot, to an off-road path, etc.; alternatively, the vehicle's route includes the vehicle moving past a control portion of the roadway (e.g., if only a one or two mile stretch (or other predetermined length) of road is intended to be a part of the control portion of the roadway, when the vehicle reaches the end of such a stretch of road, the system might release control of the vehicle; and/or the like)) (block 1032).

Figure 10C:
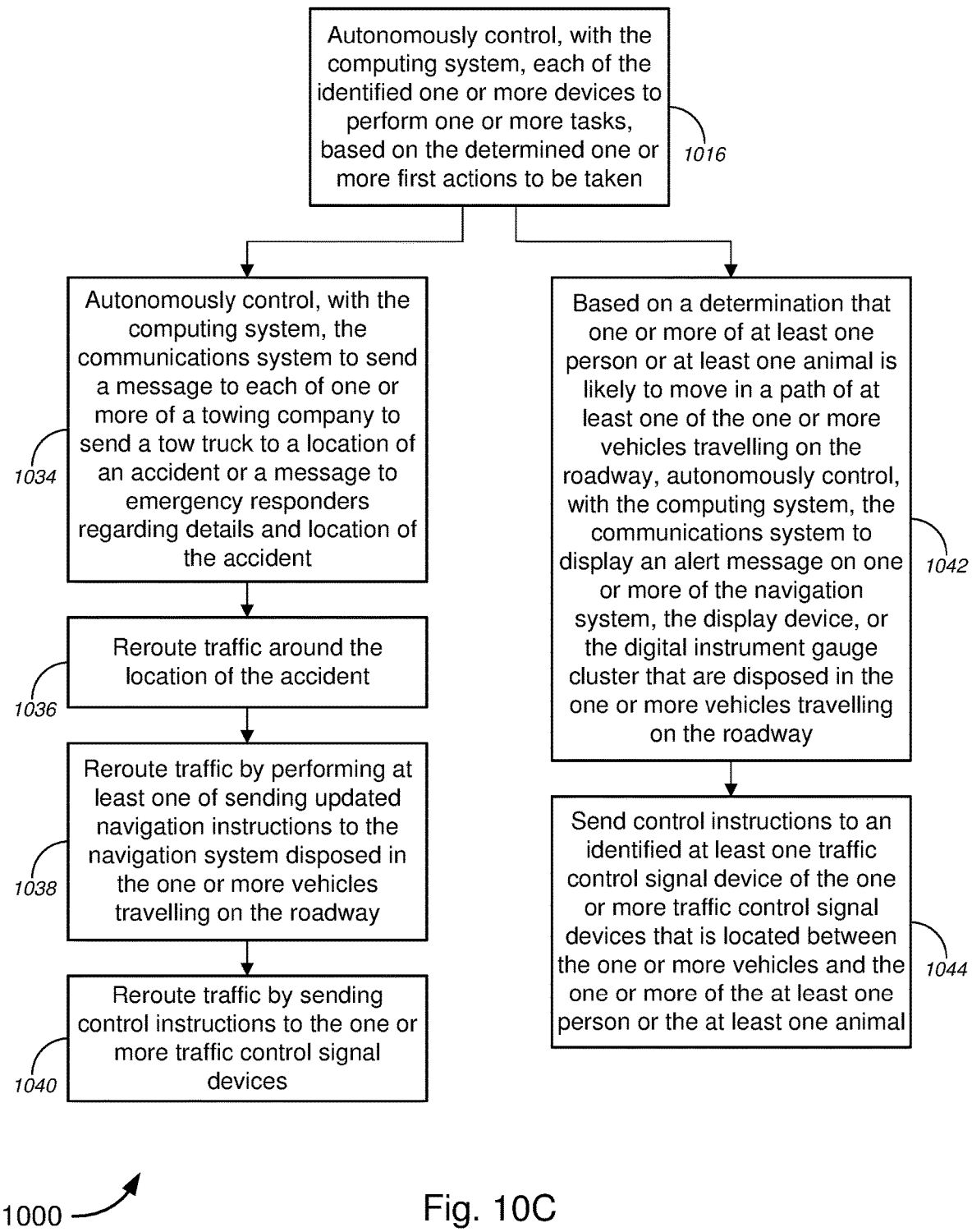

With reference to FIG. 10C, in some instances, the one or more first IoT-capable devices might include, but are not limited to, at least one of one or more pressure sensors, one or more temperature sensors, one or more motion sensors, one or more location sensors, one or more impact sensors, or one or more stress sensors, and/or the like, and the identified one or more devices might include, without limitation, a communications system. In some embodiments, autonomously controlling, with the computing system, each of the identified one or more devices to perform one or more tasks (at block 1016) might comprise autonomously controlling, with the computing system, the communications system to send a message to each of one or more of a towing company to send a tow truck to a location of an accident or a message to emergency responders regarding details and location of the accident (block 1034). In some instances, the computing system might autonomously control the communications system to further send a message to an insurance company or to one or more other persons identified by the vehicle operator. In some cases, the identified one or more devices might further comprise at least one of a navigation system disposed in one or more vehicles travelling on the roadway or one or more traffic control signal devices, and/or the like, and autonomously controlling, with the computing system, each of the identified one or more devices (at block 1016) might further comprise autonomously controlling, with the computing system, each of the identified one or more devices to halt or reroute traffic around the location of the accident (block 1036), by performing at least one of sending updated navigation instructions to the navigation system disposed in the one or more vehicles travelling on the roadway (block 1038) and/or sending control instructions to the one or more traffic control signal devices (block 1040), and/or the like.

According to some embodiments, the one or more first IoT-capable devices might include, but are not limited to, at least one of one or more pressure sensors, one or more temperature sensors, one or more motion sensors, or one or more location sensors, and/or the like, and the identified one or more devices might include, without limitation, at least one of a navigation system disposed in one or more vehicles travelling on the roadway, a display device disposed in the one or more vehicles travelling on the roadway, a digital instrument gauge cluster disposed in the one or more vehicles travelling on the roadway, one or more traffic control signal devices, or a communications system, and/or the like. In some instances, autonomously controlling, with the computing system, each of the identified one or more devices to perform one or more tasks (at block 1016) might comprise, based on a determination that one or more of at least one person or at least one animal is likely to move in a path of at least one of the one or more vehicles travelling on the roadway, autonomously controlling, with the computing system, the communications system to perform at least one of displaying an alert message on one or more of the navigation system, the display device, or the digital instrument gauge cluster that are disposed in the one or more vehicles travelling on the roadway (block 1042) and/or sending control instructions to an identified at least one traffic control signal device of the one or more traffic control signal devices that is located between the one or more vehicles and the one or more of the at least one person or the at least one animal (block 1044). According to some embodiments, the system might autonomously control dynamic lane change markers to change the number of lanes and/or shift the lanes to divert around the predicted position of the one or more of the at least one person or the at least one animal relative to real-time continuous updates of the estimated position and speed of the one or more vehicles and relative to the calculated vector paths of the at least one person, the at least one animal, and the one or more vehicles. For any dynamic lane changes, the system might communicate to the drivers of the affected vehicles, by sending warnings, alerts, notifications, updated navigation data, and/or the like regarding the changed lane markers.

Figure 10D:
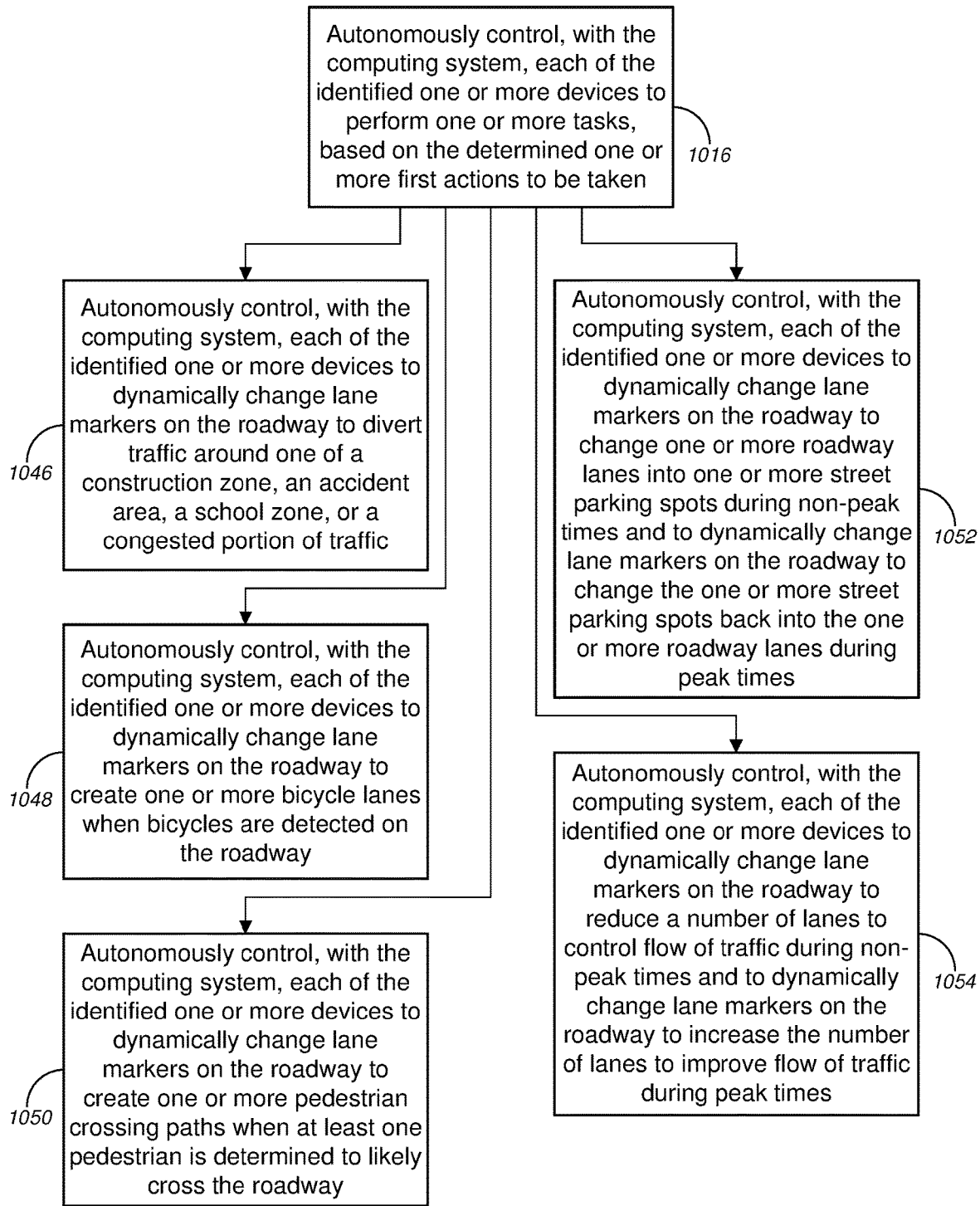

Turning to FIG. 10D, in some embodiments, autonomously controlling, with the computing system, each of the identified one or more devices to perform one or more tasks (at block 1016) might comprise autonomously controlling, with the computing system, each of the identified one or more devices to dynamically change lane markers on the roadway to divert traffic around one of a construction zone, an accident area, a school zone, or a congested portion of traffic (block 1046). According to some embodiments, the dynamic lane markers might include, without limitation, at least one of one or more high-impact light emitting diodes ("LEDs"), one or more high-impacted display devices, one or more high-impact color-change devices, one or more high impact holographic projectors, one or more surface markers made at least in part of shape-change material, and/or the like, that are distributed throughout at least portions of the roadway. These dynamic lane markers can, in response to control commands from the computing system, immediately turn on/off (in the case of the light-based devices), change colors from/to road color to/from lane marker color (in the case of the light-based devices and the color-change devices), change projection of the lane markers (in in the case of the holographic-based devices), or shift or change shape of surface shapes on the top surface of the roadway that provide haptic feedback to the vehicles through the tires (in the case of the shape-change-based devices), and/or the like.

Further regarding the shape-change-based devices, such devices might fill pre-disposed grooves in the roadway (not unlike such grooves that conventionally indicate that the vehicle has crossed into the shoulder of the road, except that the grooves, rather than being a few inches wide, might extend across the entire width of the roadway into the shoulders on both sides); the shape-change materials might fill the middle portions of each long groove so as to form a relatively smooth surface along the width of the lanes of the roadway, and retracting these shape-change materials within the grooves at points along the width of the roadway between the two shoulders might result in the vehicles travelling over the grooves feeling the vibrations of the exposed groove portions to indicate that the "shoulders" have changed position or relative widths within particular stretches of roadway. In some cases, these grooves might extend beyond the conventional shoulder positions, so that filling portions of the groove between the initial shoulder and the extended portions might extend a lane into the previous shoulder of the roadway. In a similar manner, shape-change material might be used on non-grooved portions (or might further change shape from within one or more grooves) to form bumps extending vertically upward from the road surface so as to indicate (via vibrations through vehicle tires) that the vehicle is changing lanes, and such "bumps" may be "moved" by changing the shape of the shape-change materials along the width of the roadway to change the positions, directions, and widths of lanes of the roadway, in a similar manner as the changing of the shoulder positions of the roadway.

Autonomously controlling, with the computing system, each of the identified one or more devices to perform one or more tasks (at block 1016), in some cases, might comprise autonomously controlling, with the computing system, each of the identified one or more devices to dynamically change lane markers on the roadway to create one or more bicycle lanes when bicycles are detected on the roadway (block 1048). This may be accomplished in a similar manner as the dynamic lane change techniques described above.

In some instances, autonomously controlling, with the computing system, each of the identified one or more devices to perform one or more tasks (at block 1016) might comprise autonomously controlling, with the computing system, each of the identified one or more devices to dynamically change lane markers on the roadway to create one or more pedestrian crossing paths when at least one pedestrian is determined to likely cross the roadway (block 1050). This may be accomplished in a similar manner as the dynamic lane change techniques described above.

According to some embodiments, autonomously controlling, with the computing system, each of the identified one or more devices to perform one or more tasks (at block 1016) might comprise autonomously controlling, with the computing system, each of the identified one or more devices to dynamically change lane markers on the roadway to change one or more roadway lanes into one or more street parking spots during non-peak times, and autonomously controlling, with the computing system, each of the identified one or more devices to dynamically change lane markers on the roadway to change the one or more street parking spots back into the one or more roadway lanes during peak times (block 1052). This may be accomplished in a similar manner as the dynamic lane change techniques described above.

Autonomously controlling, with the computing system, each of the identified one or more devices to perform one or more tasks (at block 1016), in some embodiments, might comprise autonomously controlling, with the computing system, each of the identified one or more devices to dynamically change lane markers on the roadway to reduce a number of lanes to control flow of traffic (i.e., to prevent speeding) during non-peak times, and autonomously controlling, with the computing system, each of the identified one or more devices to dynamically change lane markers on the roadway to increase the number of lanes to improve or increase flow of traffic during peak times (block 1054). This may be accomplished in a similar manner as the dynamic lane change techniques described above.

Figure 10E:
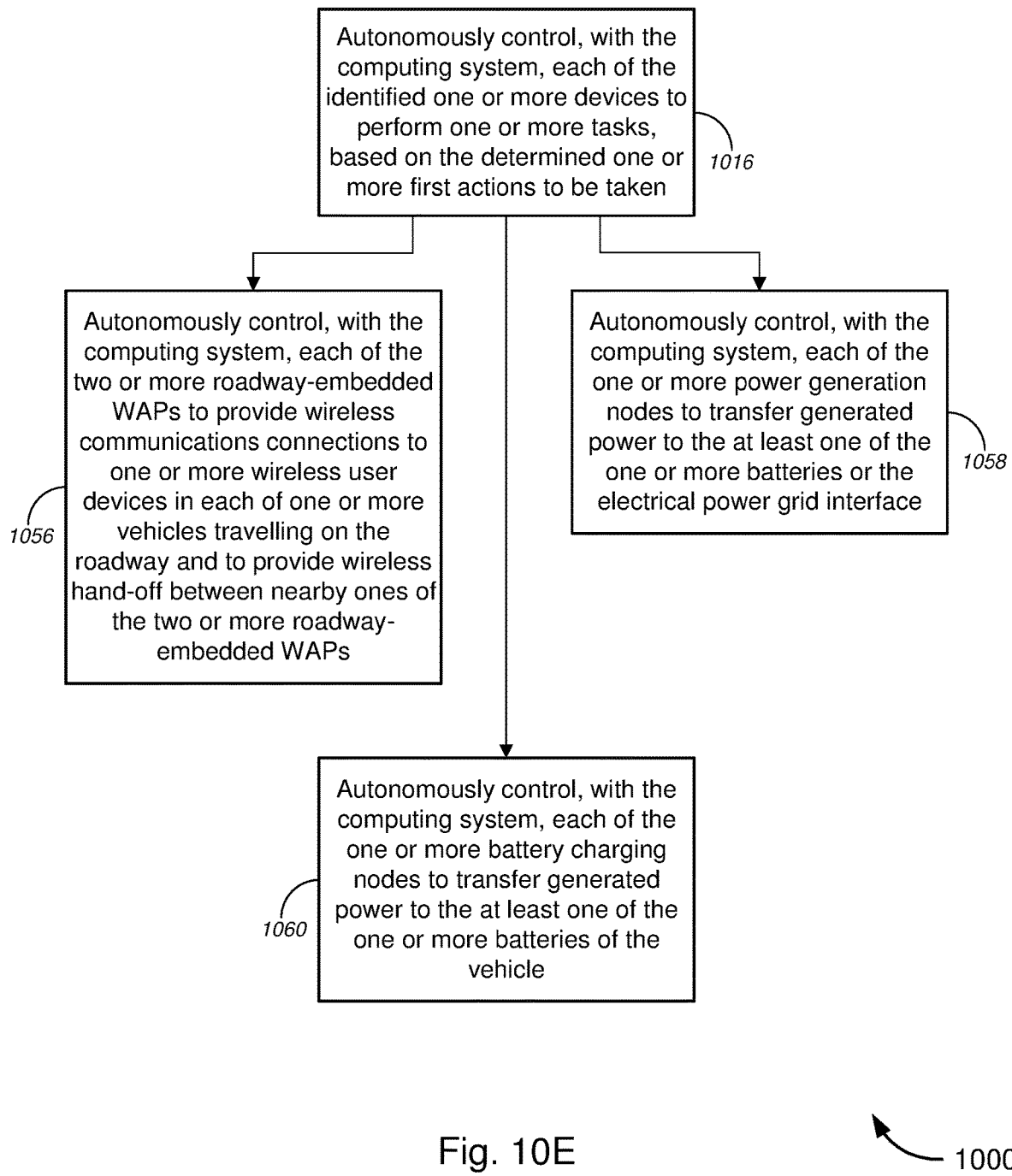

With reference to FIG. 10E, in some cases, the identified one or more devices might include, without limitation, two or more roadway-embedded wireless access points ("WAPs"), and autonomously controlling, with the computing system, each of the identified one or more devices to perform one or more tasks (at block 1016) might comprise autonomously controlling, with the computing system, each of the two or more roadway-embedded WAPs to provide wireless communications connections to one or more wireless user devices in each of one or more vehicles travelling on the roadway and to provide wireless hand-off between nearby ones of the two or more roadway-embedded WAPs (block 1056). Such wireless connectivity, hand-off, and ubiquity allow for improved wireless intercommunications with the mobile wireless user devices within the travelling vehicles. In some cases, nearby wireless user devices carried by pedestrians or used in or around nearby buildings and parking areas and such might also benefit from the roadway-embedded WAPs.

In some instances, the identified one or more devices might include, but are not limited to, one or more power generation nodes embedded in the roadway. The one or more power generation nodes might generate and provide power to at least one of one or more batteries or an electrical power grid interface. In some embodiments, the one or more power generation nodes might include, without limitation, at least one of one or more piezoelectric transducers that generate power when vehicles are travelling on the roadway, one or more heat transducers that generate power when solar energy heats up the roadway or when friction is generated by vehicles travelling on the roadway, or one or more high-impact solar arrays that generate power from solar energy, and/or the like. According to some embodiments, autonomously controlling, with the computing system, each of the identified one or more devices to perform one or more tasks (at block 1016) might comprise autonomously controlling, with the computing system, each of the one or more power generation nodes to transfer generated power to the at least one of the one or more batteries or the electrical power grid interface (block 1058).

According to some embodiments, the identified one or more devices might include, but are not limited to, one or more battery charging nodes embedded in the roadway or parking spots, the one or more battery charging nodes generating and providing power to at least one of one or more batteries of a vehicle. In some embodiments, the battery charging nodes might comprise inductive charging devices and/or the like. In some instances, autonomously controlling, with the computing system, each of the identified one or more devices to perform one or more tasks (at block 1016) might comprise autonomously controlling, with the computing system, each of the one or more battery charging nodes to transfer generated power to the at least one of the one or more batteries of the vehicle (block 1060). In conjunction with the power nodes, vehicles (particularly electric vehicles) might be powered by piezo-electric, heat-transducer-based, and/or solar-power-based power nodes that directly charge or indirectly charge (via batteries that are under the roadway, embedded in the roadway, and/or disposed along sides of the roadway) such vehicles as they are travelling on the roadway, in an environmentally-conscious and sustainable manner. Excess power may be fed into the electric grid of the population area (e.g., village, town, city, suburb, etc.). According to some embodiments, the smart roadway system described herein could support new types of toll models, including, but not limited to, implementing pay models for higher speeds, implementing different rates for travel during different times of the day, implementing advertising-based toll models (which, for example, might be based upon non-stop drive time behind the wheel (e.g., with ads for motels or hotels, coffee shops, etc. along the route, etc.) or quantity of fuel left in the fuel tank (e.g., with ads for gas stations, car electric charging stations, etc.), and/or the like.

Various other embodiments for implementing smart roadway functionalities may be provided consistent with the invention as described above.

Smart City Functionality

FIGS. 11 and 12 are schematic diagrams illustrating population area 1100 and system 1200 for implementing IoT-based smart city functionality, in accordance with various embodiments.

With reference to FIG. 11, population area 1100—which might comprise a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, or the like (collectively referred to herein as "a population area," "a smart city," or the like)—might comprise a city block 1105. A city block 1105 (as described above with respect to FIG. 8) might comprise a city block or other geographical man-made constructs including, but not limited to suburban sub-divisions, town centers, down town districts, up-town districts, towns, villages, neighborhoods, and/or the like (collectively referred to herein as "city block" for simplicity of illustration).

According to some embodiments, the population area or smart city 1100 might further include, without limitation, one or more bodies of water 1110*a* (e.g., oceans, lakes, bays, lagoons, ponds, etc.), one or more waterways 1110*b* (e.g., rivers, streams, estuaries, and/or the like), an airport 1115 (which might include, but is not limited to, one or more airport terminals, hangars, control towers, or service buildings 1115*a*, one or more terminal gates and ramps 1115*b*, one or more airport aprons, one or more runways 1115*d*, one or more greenways or plant life 1115*e*, one or more parking structures 1115*f*, and/or the like), one or more airplanes or other aviation vehicles 1120, one or more public transit systems 1125 (which might include, but are not limited to, one or more transit terminals or stations 1125*a*, one or more transits tracks or routes 1125*b*, one or more transit vehicles 1130 (which might include, without limitation, one or more light-rail trains, one or more commuter trains, one or more regional trains, one or more magnetic levitation ("maglev") trains, one or more pneumatic-tube-based vehicles, one or more high-speed trains, one or more buses, one or more trams, one or more street cars, etc.)), one or more roadways 1135 (which might include, without limitation, one or more highways or freeways 1135*a*, one or more main roads or local roads 1135*b*, one or more residential roads (not shown), one or more rural roads (not shown), one or more intersections 1135*c*, one or more bridges 1135*d*, etc.; and which might correspond to roadway 815 in FIG. 8), one or more vehicles 1140 (which might correspond to the land-based vehicles of vehicles 500 of FIG. 5 or 800 of FIG. 8, which as described above, and might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, and/or the like), one or more marine ports or marinas 1145, one or more sea-faring vehicles 1150 (including, but not limited to, boats, ships, submersibles, amphibious vehicles, personal watercrafts (e.g., kayaks, canoes, rafts, surfboards, paddle boards, jetskis, speedboats, etc.), etc.), one or more buildings 1155 (which might correspond to buildings or premises 200 of FIG. 2 or 810 of FIG. 8, which as described above, might comprise homes, buildings, business premises, commercial offices, schools, industrial buildings, etc.), one or more greenways or parks 1160 (e.g., public parks, arboreta, gardens, nature preserves, forests, rainforests, orchards, farms, etc.), one or more trees or plants 1160*a* (e.g., lawns, trees, bushes, shrubs, flowers, plants, and/or the like), one or more pathways 1165 (including, one or more walkways or bicycle paths 1165*a*, one or more pedestrian bridges 1165*b*, etc.), one or more beaches 1170, one or more solar arrays 1175, and/or one or more natural or manmade disasters 1180 (which might include, without limitation, tornados (as shown in FIG. 11), flooding, lightning storms, hurricanes, blizzards, fires, smog, meteor impact, airplane crash, automobile accident, construction accident, train accident, building collapse, dam breach, or terrorist attack, and/or the like) and the path or affected areas of the disasters 1180*a* (as depicted in FIG. 11 as an arrow).

In some embodiments, a city block 1105 might include, without limitation, one or more buildings or premises 1110 (which might correspond to customer premises 200 of FIG. 2, which as described above, might comprise a home, building, business premises, commercial office, school, industrial building, etc.), one or more roadways 1115, one or more lane markers 1120, one or more pathways 1125, one or more traffic control signal devices 1130, one or more roadway street lights 1135, one or more sidewalk or pedestrian street lights 1140, one or more roadway-embedded battery charging nodes or strips 1145, one or more roadway-embedded power generation nodes 1150, one or more roadway-embedded sensors 1155, one or more pathway-embedded sensors 1160, one or more vehicles 1165 (which might correspond to vehicle 500 of FIG. 5, which as described above, might comprise a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like), and/or the like.

According to some embodiments, the one or more lane markers 1120 might comprise one or more dynamic lane change markers as described in detail below. In some cases, the one or more roadway-embedded battery charging nodes or strips 1145 and the one or more roadway-embedded power generation nodes 1150 might respectively charge batteries in electric vehicles as the vehicles are travelling on the roadway 1125 over the battery charging nodes and generate electrical power from solar energy, heat or friction energy from solar radiation or vehicle travel, and/or pressure transduction from vehicle passage, as described in detail below. The one or more roadway and/or pathway sensors 1155 and 1160, respectively, might each include, but are not limited to, at least one of one or more temperature sensors, one or more light sensors (e.g., ambient light sensors, luminosity sensors, illuminance sensors, solar light sensors, etc.), one or more humidity sensors, one or more motion sensors, one or more structural integrity sensors, one or more pressure sensors, one or more air quality sensors, one or more communications signal detectors, one or more seismic sensors, one or more weather station sensors, one or more moisture sensors, one or more wind sensors, or one or more particulate sensors, one or more impact sensors, one or more location sensors, and/or the like.

In some embodiments, a computing system might interact in a machine-to-machine manner with each of at least one of one or more IoT-capable devices (e.g., the one or more lane markers 1120, the one or more traffic control signal devices 1130, the one or more roadway street lights 1135, the one or more sidewalk or pedestrian street lights 1140, the one or more roadway-embedded battery charging nodes or strips 1145, the one or more roadway-embedded power generation nodes 1150, the one or more vehicles 1165) and/or IoT-capable sensors (the one or more roadway-embedded sensors 1155, one or more pathway-embedded sensors 1160, or other sensors (e.g., those that might be embodied within one or more of these devices or systems or embodied in stand-alone housings)). These and other IoT-capable devices and systems are described in greater detail with respect to FIG. 12. FIGS. 13A-13G below describe several non-limiting embodiments of interactions amongst the computing systems, the IoT-capable devices, and the IoT-capable sensors, and/or the like for implementing IoT-based smart vehicle functionality.

In FIG. 12, system 1200 might comprise one or more computing systems 1205, one or more IoT-capable sensors 1210, and one or more IoT-capable devices or devices 1215, each of which might communicate with one or both of the other two via machine-to-machine communications (not unlike the machine-to-machine communications as described above with respect to FIG. 1).

The computing system 1205 might include, without limitation, at least one of a central node 1205a (or a single processor or a plurality of processors disposed therein, whereas, such processor or processors may be physical or virtual in nature), a management node 1205b that is located within at least a portion of the population area, or other computing systems 1205c, which might include, but are not limited to, an IoT management node (that is located at a service provider facility associated with a service provider that provides services to at least portions of the population area), one or more roadway-embedded IoT management nodes, one or more municipal, state, federal, or private entity IoT management nodes, a computing system disposed at a vehicle traffic control center, a server computer that serves the population area, a server computer that is remote from the population area, a cloud computing system, a distributed computing system that integrates computing resources from two or more IoT-capable devices, or a combination of two or more of these computing systems, and/or the like.

According to some embodiments, the IoT-capable sensors 1210 might include, without limitation, one or more temperature sensors 1210a (e.g., heat sensors, infrared sensors, thermometers, etc.), one or more light sensors 1210b (e.g., ambient light sensors, luminosity sensors, illuminance sensors, solar light sensors, etc.), one or more weather sensors 1210c, one or more motion sensors 1210d, one or more structural integrity sensors 1210e, one or more pressure sensors 1210f, one or more air quality sensors 1210g, one or more other sensors 1210h, and/or the like. In some cases, the one or more other sensors 1210h might include, but are not limited to, one or more communications signal detectors, one or more seismic sensors, one or more weather station sensors, one or more moisture sensors, one or more humidity sensors, one or more wind sensors, or one or more particulate sensors, one or more impact sensors, one or more location sensors, and/or the like. In some instances, the one or more IoT-capable sensors 1210 might further comprise IoT-capable sensors (which are described in detail above with respect to FIG. 6, for example) in each of one or more vehicles travelling on the roadway. In some cases, the one or more structural integrity sensors 1210e might include, without limitation, at least one of two or more global positioning system sensors or two or more relative position sensors that are embedded in or disposed on one or more exterior surfaces of at least one of portions of one or more roadways (including, but not limited to, at least one of a local road, a main road, a highway, an airport apron, an airport ramp, an airport runway, a canal, a lock, or a waterway, and/or the like), portions of one or more public pathways (e.g., sidewalks, trails, public moving pathways, public escalators, public elevators, etc.), portions of one or more buildings (e.g., government buildings, other public buildings, etc.), portions of one or more public centers, portions of one or more airport terminal buildings, portions of one or more airport hangars and service buildings, portions of one or more railway facilities, portions of one or more railway tracks, portions of one or more marine ports, portions of one or more public transit structures, portions of one or more utility structures, portions of one or more public monuments or public art pieces, bridges, tunnels, and/or the like, where the sensor data from these sensors 1210e might comprise data indicating a change in position of one structural integrity sensor relative to another structural integrity sensor beyond a predetermined threshold amount, thereby indicating that there might be damage to corresponding at least one of one or more roadways, one or more public pathways, one or more buildings, one or more public centers, one or more airport terminal buildings, one or more airport hangars and service buildings, one or more railway facilities, one or more railway tracks, one or more marine ports, one or more public transit structures, one or more utility structures, one or more public monuments or public art pieces, bridges, tunnels, and/or the like.

In some embodiments, the IoT-capable devices 1215 might include one or more IoT-capable sensors 1210 and/or might further include, without limitation, one or more power generation nodes 1215a, one or more battery charging nodes 1215b, one or more communications systems 1215c, one or more traffic control signal devices 1215d, one or more street lamps 1215e, one or more dynamic lane change markers 1215f, one or more vehicle systems or vehicular components 1215g in each of one or more vehicles travelling on the roadway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public transit vehicle systems 1215h in each of one or more public transit vehicles travelling on the roadway, waterway, and/or railway (including, but not limited to, a vehicle computer, a vehicle engine, an electronic throttle control ("ETC") system, a vehicle brake system, a vehicle gear system, a vehicle steering system, a vehicle light system, a vehicle (analog or digital) instrument gauge cluster, a navigation system, a vehicle (self-) diagnostic system, a vehicle-based transceiver or communications system, and/or the like), one or more public display devices 1215i (e.g., electronic billboards, digital public signs, public televisions, public monitors, public touchscreen interface displays, public directories, and/or the like), one or more power distribution systems 1215j, one or more railway systems 1215k (including, without limitation, train control systems, railway switch controls, railway crossing controls, rail track power systems, rail track maintenance systems such as rail lubrication systems and switch heaters, track diagnostic systems, railway signal diagnostic systems, and/or the like), one or more user devices 1215l associated with users who are currently located in the population area, one or more cleaning systems 1215m, one or more grounds-keeping systems 1215n, one or more emergency (response) systems 1215o, one or more transceivers 1215p, a wireless access point ("WAP") 1215q, and/or other IoT-capable devices 1215r. In some cases, the other IoT-capable devices 1215r might include, without limitation, a door unlocking/locking system installed in one or more public buildings or facilities, an automated door opening/closing system installed in one or more public buildings or facilities, an automated window opening or closing system installed in one or more public buildings or facilities, an automated window covering control system installed in one or more public buildings or facilities, a data port, one or more building climate control systems, one or more public transport climate control systems, one or more air purifiers, one or more air filters, or one or more electrostatic particulate collecting tools, a fire suppression system, one or more lights (e.g., reading lights, LEDs, indicator lights, warning lights, etc.), and/or the like.

In some embodiments, one or more of the IoT-capable sensors 1210 and/or one or more of the IoT-capable devices 1215 might be roadway-embedded sensors or devices, a top surface of each of which being one of substantially level with a top surface of the roadway or below the top surface of the roadway. Such roadway-embedded sensors or devices might have a housing that is made of a material that can durably and resiliently protect contents thereof while being disposed or buried in the roadway surface (i.e., disposed or buried under the roadway surface), and especially against damage caused by shifting ground conditions (such as by shifting roadway, tremors, etc.) and against damage caused by traffic loads (i.e., weight of vehicles travelling on the roadways; impact traffic debris from accidents or items falling off vehicles; etc.) or natural loads (i.e., weight of snow, ice, water, etc.; impact from hail, falling trees, etc.), and/or the like. In a similar manner, one or more IoT-capable sensors might be embedded within or disposed on a surface of one or more public pathways, one or more buildings, one or more public centers, one or more airport terminal buildings, one or more airport hangars and service buildings, one or more railway facilities, one or more railway tracks, one or more marine ports, one or more public transit structures, one or more utility structures, one or more public monuments or public art pieces, and/or the like, thereby providing data from sensors and the like from various different points in the population area.

According to some embodiments, the IoT-capable sensors 1210 might further include one or more snow accumulation sensors that detect the amount of snow that has accumulated on the vehicle. In some cases, heat pads might be distributed under various surfaces of the vehicle that, in response to the detection of snow on the vehicle from the one or more snow accumulation sensors, might turn on to melt the accumulated snow from the vehicle. In other cases, the communications systems 1215c, in conjunction with the snow accumulation sensors and location sensors, might send messages to snow removal companies and/or crews in such companies to indicate the amount, type, and location of the accumulated snow for removal. According to some embodiments, the IoT-capable sensors 1210 might further include at least one of one or more sound amplitude sensors, one or more sound propagation detectors, one or more frequency sensors, and/or the like on the exterior and/or on the interior of one or more public buildings. One or more white noise generators might utilize the data from the at least one of the one or more sound amplitude sensors, the one or more sound propagation detectors, the one or more frequency sensors, and/or the like to dampen or eliminate noise external to the public buildings for the occupants of the buildings, while dampening or eliminating noise or conversations in the public buildings to protect the privacy of the occupants of the public buildings from people outside of the public buildings (and perhaps to protect people outside the public buildings from loud music playing in the public buildings (e.g., concert venues, event venues, sports arenas, political conventions, etc.)), and/or the like. Similar functionalities might apply to private buildings, but control of such private buildings would fall under the control of the owners of the private buildings and/or service providers that service such buildings, and the functionalities of the embodiments of FIGS. 2-4 would apply.

The one or more computing systems 1205, the IoT-capable sensors 1210, and the IoT-capable devices/devices 1215 are otherwise similar, if not identical, to the one or more computing systems 105, the IoT-capable sensors 115, and the IoT-capable devices 110 or devices 120, respectively, as described above with respect to FIG. 1.

Figure 13A:
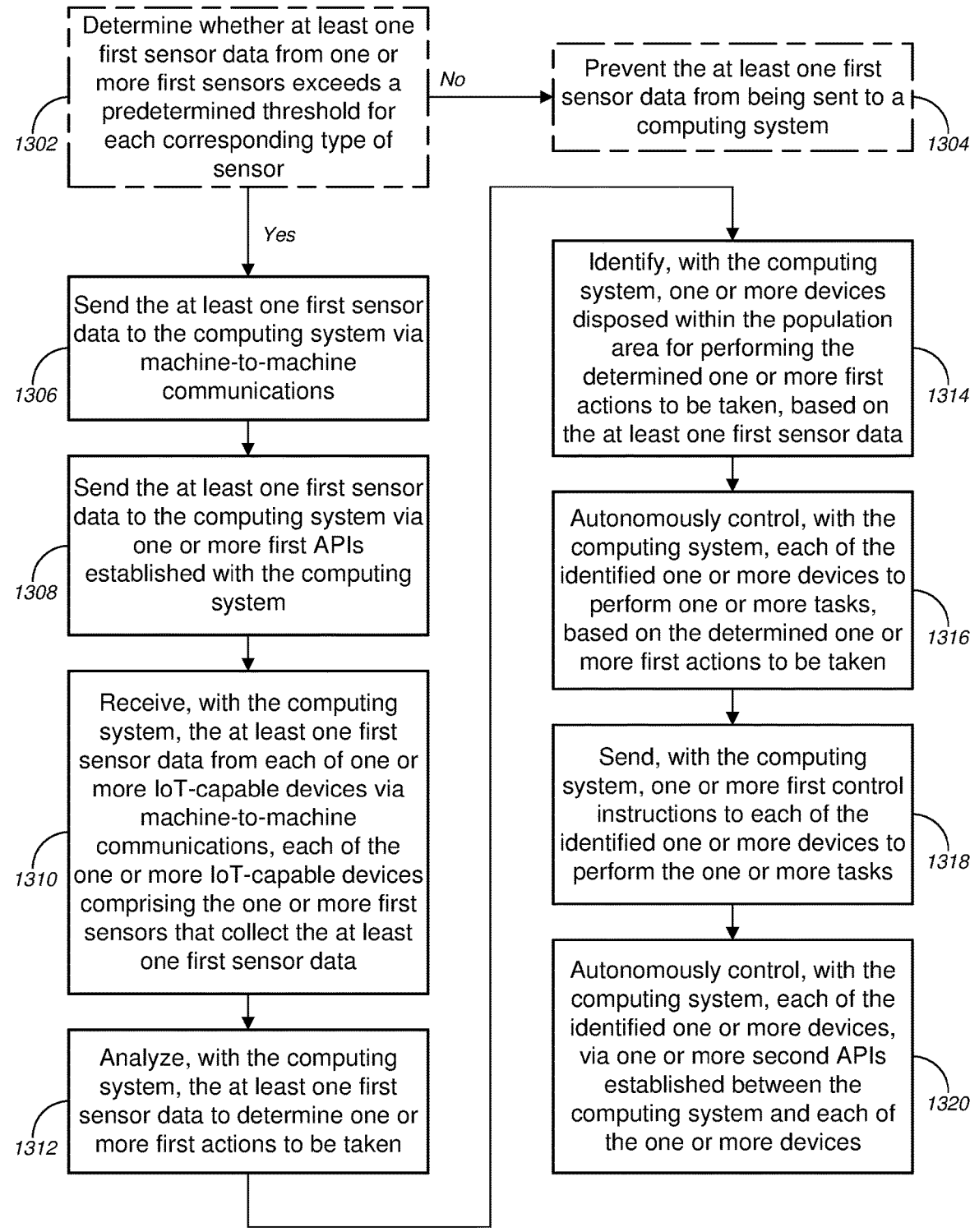

FIGS. 13A-13G (collectively, "FIG. 13") are flow diagrams illustrating a method 1300 for implementing IoT-based smart city functionality, in accordance with various embodiments. FIG. 13A depicts the method 1300 for implementing IoT-based smart city functionality, while FIGS. 13B-13G depict various different embodiments for autonomously controlling each of the identified one or more vehicular components to perform the one or more tasks in the method 1300 of FIG. 13A. Herein, the population area is one of a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, and the like.

While the techniques and procedures are depicted and/or described in a certain order for purposes of illustration, it should be appreciated that certain procedures may be reordered and/or omitted within the scope of various embodiments. Moreover, while the method 1300 illustrated by FIG. 13 can be implemented by or with (and, in some cases, are described below with respect to) the systems 130, 1100, and 1200 of FIGS. 1, 11, and 12 respectively (or components thereof), such methods may also be implemented using any suitable hardware (or software) implementation. Similarly, while each of the systems 130, 1100, and 1200 of FIGS. 1, 11, and 12, respectively (or components thereof), can operate according to the method 1300 illustrated by FIG. 13 (e.g., by executing instructions embodied on a computer readable medium), the systems 130, 1100, and 1200 of FIGS. 1, 11, and 12 can each also operate according to other modes of operation and/or perform other suitable procedures.

Turning to FIG. 13A, method 1300, at optional block 1302, might comprise determining whether at least one first sensor data from one or more first sensors exceeds a predetermined threshold for each corresponding type of sensor. In response to a determination that the at least one first sensor data from the one or more first sensors does not exceed the predetermined threshold for at least one corresponding type of sensor, the at least one first sensor data is prevented from being sent to a computing system (optional block 1304). On the other hand, in response to a determination that the at least one first sensor data from the one or more first sensors does exceed the predetermined threshold for each corresponding type of sensor, the at least one first sensor data is sent to the computing system via machine-to-machine communications (block 1306). In some embodiments, sending the at least one first sensor data to the computing system via machine-to-machine communications comprises sending the at least one first sensor data to the computing system via machine-to-machine communications, via one or more first application programming interfaces ("APIs") established with the computing system (block 1308).

At block 1310, method 1300 might comprise receiving, with the computing system, the at least one first sensor data from each of one or more Internet of Things ("IoT")-capable devices via machine-to-machine communications, each of the one or more IoT-capable devices comprising the one or more first sensors that collect the at least one first sensor data. Method 1300, at block 1312, might comprise analyzing, with the computing system, the at least one first sensor data to determine one or more first actions to be taken. Method 1300 might further comprise, at block 1314, identifying, with the computing system, one or more devices disposed within a population area (e.g., a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, or the like) for performing the determined one or more first actions to be taken, based on the at least one first sensor data from each of the one or more IoT-capable devices. At block 1316, method 1300 might comprise autonomously controlling, with the computing system, each of the identified one or more devices to perform one or more tasks, based on the determined one or more first actions to be taken.

According to some embodiments, autonomously controlling, with the computing system, each of the identified one or more devices to perform one or more tasks might comprise sending, with the computing system, one or more first control instructions to each of the identified one or more devices to perform the one or more tasks, based on the determined one or more first actions to be taken (block 1318). Additionally or alternatively, autonomously controlling, with the computing system, each of the identified one or more devices to perform one or more tasks might comprise autonomously controlling, with the computing system, each of the identified one or more devices, via one or more second APIs established between the computing system and each of the one or more devices (block 1320).

Figure 13B:
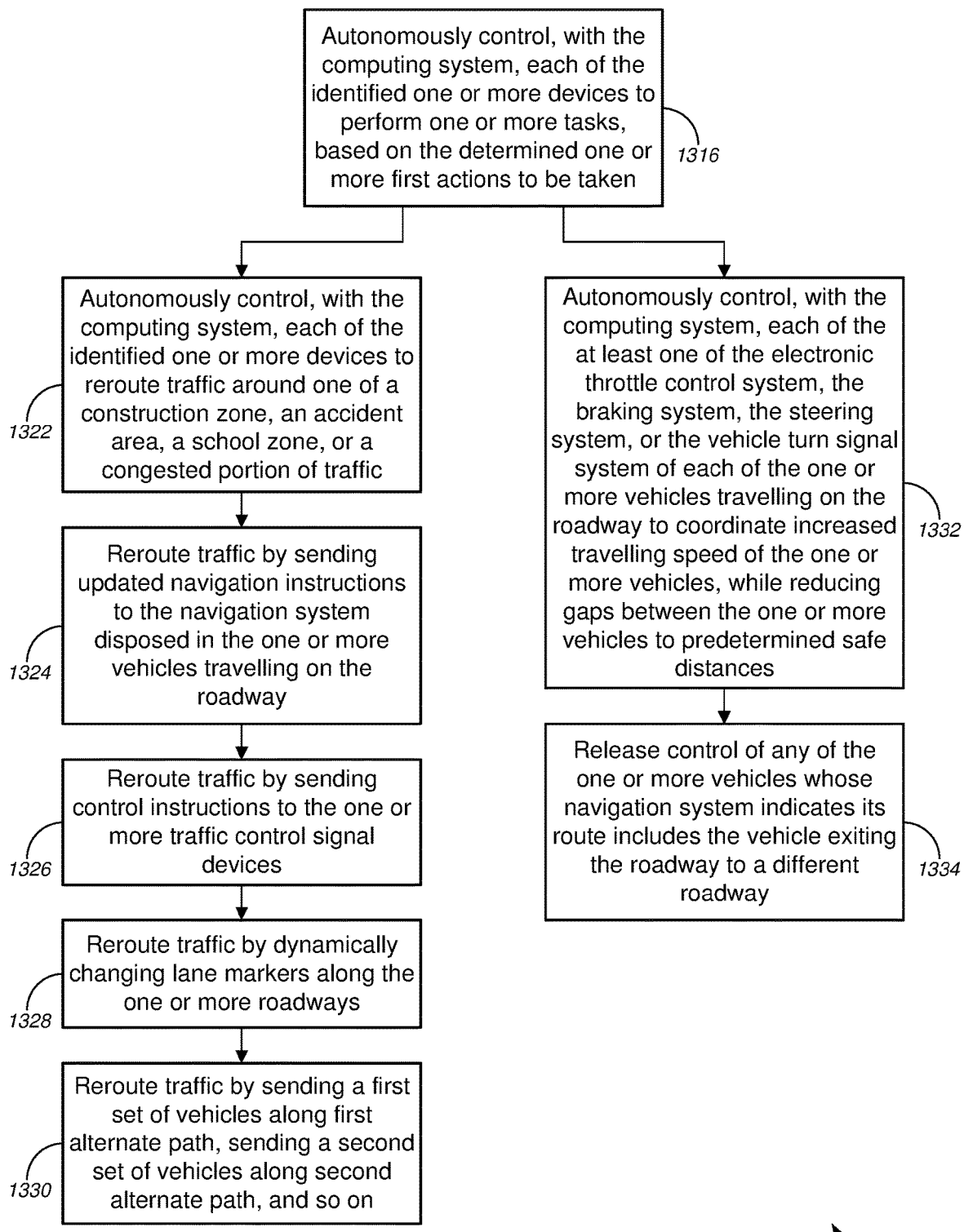

With reference to FIG. 13B, autonomously controlling, with the computing system, each of the identified one or more devices to perform one or more tasks (at block 1316) might comprise autonomously controlling, with the computing system, each of the identified one or more devices to halt or reroute traffic around one of a construction zone, an accident area, a school zone, or a congested portion of traffic (block 1322). In some embodiments, the identified one or more devices might include, but are not limited to, at least one of a navigation system disposed in each of one or more vehicles travelling on the roadway or one or more traffic control signal devices, and/or the like. In some cases, autonomously controlling, with the computing system, each of the identified one or more devices to halt or reroute traffic might comprise rerouting traffic, by one or more of sending updated navigation instructions to the navigation system disposed in each of the one or more vehicles travelling on one or more roadways (block 1324), sending control instructions to the one or more traffic control signal devices along the one or more roadways to change the traffic control signals along particular directions at particular intersections (block 1326), dynamically changing lane markers along the one or more roadways (block 1328; as described in detail above with respect to FIGS. 8-10), or rerouting a first set of vehicles along a first alternate or alternative path while rerouting a second set of vehicles along a second alternate or alternative path and so on (block 1330).

According to some embodiments, the one or more first IoT-capable devices might include, without limitation, at least one of one or more pressure sensors, one or more temperature sensors, or one or more motion sensors, and/or the like. The plurality of IoT-capable devices might further include one or more second IoT-capable devices including, but not limited to, at least one of a speedometer sensor, a vehicle navigation system, an electronic throttle control system, a braking system, a vehicle gear system, a steering system, or a vehicle turn signal system of each of one or more vehicles travelling on the roadway. According to some embodiments, the identified one or more devices might include, without limitation, at least one of the electronic throttle control system, the braking system, the vehicle gear system, the steering system, or the vehicle turn signal system, and/or the like, of each of the one or more vehicles travelling on the roadway. In some embodiments, autonomously controlling, with the computing system, each of the identified one or more devices to perform one or more tasks (at block 1316) might comprise autonomously controlling, with the computing system, each of the at least one of the electronic throttle control system, the braking system, the vehicle gear system, the steering system, or the vehicle turn signal system of each of the one or more vehicles travelling on the roadway to coordinate changes in travelling speed of the one or more vehicles (in some cases, to coordinate increasing the speed of the one or more vehicles to increase flow of traffic), while reducing or optimizing gaps between the one or more vehicles to predetermined safe distances (block 1332). In some cases, autonomously controlling, with the computing system, each of the identified one or more devices to perform one or more tasks (at block 1316) might further comprise releasing control of any of the one or more vehicles whose navigation system indicates its route includes the vehicle moving beyond a designated control portion of the roadway (i.e., the vehicle's route includes the vehicle exiting the roadway to another roadway, to a parking structure/lot, to an off-road path, etc.; alternatively, the vehicle's route includes the vehicle moving past a control portion of the roadway (e.g., if only a one or two mile stretch (or other predetermined length) of road is intended to be a part of the control portion of the roadway, when the vehicle reaches the end of such a stretch of road, the system might release control of the vehicle; and/or the like)) (block 1334).

Turning to FIG. 13C, in some cases, the identified one or more devices might include, but are not limited to, at least one of a navigation system disposed in each of one or more vehicles travelling on the roadway, a navigation system disposed in each of one or more emergency response vehicles, one or more traffic control signal devices, one or more news media access devices, one or more user devices associated with each of one or more residents of the population area, one or more electronic billboards, one or more digital street signs, or one or more display devices disposed through the population area, and/or the like. In some instances, the one or more IoT-capable devices might each include, without limitation, one of one or more pressure sensors, one or more temperature sensors, one or more motion sensors, one or more structural integrity sensors, one or more solar light sensors, one or more seismic sensors, one or more weather station sensors, one or more air quality sensors, one or more moisture sensors, one or more wind sensors, or one or more particulate sensors, and/or the like. In some embodiments, based on detection of signs of disaster including, but not limited to at least one of a tornado, flooding, lightning storms, hurricanes, blizzards, fires, smog, meteor impact, airplane crash, automobile accident, construction accident, train accident, building collapse, dam breach, or terrorist attack, and/or the like, autonomously controlling, with the computing system, each of the identified one or more devices to perform the one or more tasks (at block 1316) might comprise autonomously controlling, with the computing system, each of the at least one of the navigation system disposed in each of the one or more vehicles travelling on the roadway, the navigation system disposed in each of the one or more emergency response vehicles, the one or more traffic control signal devices, the one or more news media access devices, the one or more user devices associated with each of the one or more residents of the population area, the one or more electronic billboards, the one or more digital street signs, or the one or more display devices disposed through the population area to direct emergency response teams to locations of the disaster while directing residents and other people away from the disaster (block 1336).

According to some embodiments, the identified one or more devices might further comprise one or more dynamic lane change markers on one or more roadways, and autonomously controlling, with the computing system, each of the identified one or more devices to perform the one or more tasks (at block 1316) might further comprise autonomously controlling, with the computing system, the one or more dynamic lane change markers to perform at least one of creating one or more emergency lanes for the emergency response teams to travel along (block 1338) and/or changing existing lanes to direct traffic to travel on lanes other than the lanes along which the emergency response teams are determined to be likely to travel (block 1340), and the like.

Figure 13D:
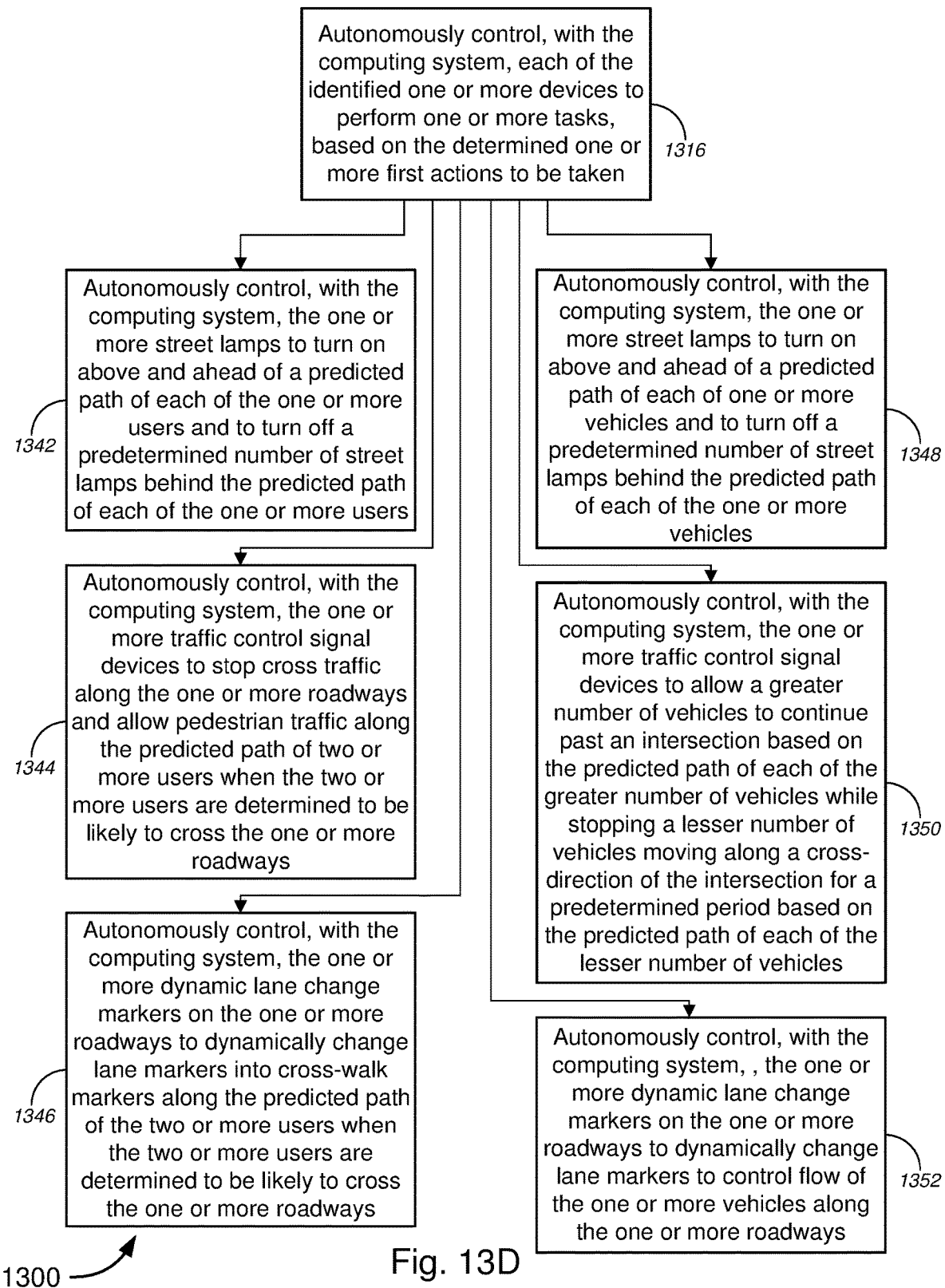

With reference to FIG. 13D, in some embodiments, the one or more IoT-capable devices might include, but are not limited to, at least one of one or more pressure sensors, one or more temperature sensors, one or more motion sensors, one or more communications signal detectors, one or more user devices associated with one or more users, or one or more location sensors disposed in the one or more user devices, and/or the like. In some instances, the identified one or more devices might include, without limitation, at least one of one or more street lamps, one or more traffic control signal devices, or one or more dynamic lane change markers on one or more roadways, and/or the like. Autonomously controlling, with the computing system, each of the identified one or more devices to perform one or more tasks (at block 1316), in some cases, might comprise performing corresponding at least one of autonomously controlling, with the computing system, the one or more street lamps to turn on above and ahead of a predicted path of each of the one or more users and to turn off a predetermined number of street lamps behind the predicted path of each of the one or more users (block 1342), autonomously controlling, with the computing system, the one or more traffic control signal devices to stop cross traffic along the one or more roadways and allow pedestrian traffic along the predicted path of two or more users when the two or more users are determined to be likely to cross the one or more roadways (block 1344), or autonomously controlling, with the computing system, the one or more dynamic lane change markers on the one or more roadways to dynamically change lane markers into cross-walk markers along the predicted path of the two or more users when the two or more users are determined to be likely to cross the one or more roadways (block 1346), and/or the like. In these cases, each of the one or more users or each of the two or more users might be one of a pedestrian, a cyclist, a rider of other motor-less devices, or a rider of a low-power motored device, and/or the like.

According to some embodiments, the one or more IoT-capable devices might include, but are not limited to, at least one of one or more pressure sensors, one or more temperature sensors, or one or more motion sensors, and/or the like. In some cases, the identified one or more devices might include, without limitation, at least one of one or more street lamps, one or more traffic control signal devices, or one or more dynamic lane change markers on one or more roadways, and/or the like. In some embodiments, autonomously controlling, with the computing system, each of the identified one or more devices to perform one or more tasks (at block 1316) might comprise performing corresponding at least one of autonomously controlling, with the computing system, the one or more street lamps to turn on above and ahead of a predicted path of each of one or more vehicles and to turn off a predetermined number of street lamps behind the predicted path of each of the one or more vehicles (block 1348), autonomously controlling, with the computing system, the one or more traffic control signal devices to allow a greater number of vehicles to continue past an intersection based on the predicted path of each of the greater number of vehicles while stopping a lesser number of vehicles moving along a cross-direction of the intersection for a predetermined period based on the predicted path of each of the lesser number of vehicles (block 1350), or autonomously controlling, with the computing system, the one or more dynamic lane change markers on the one or more roadways to dynamically change lane markers to control flow of the one or more vehicles along the one or more roadways (block 1352; as described in detail above with respect to FIGS. 8-10), and/or the like.

Figure 13E:
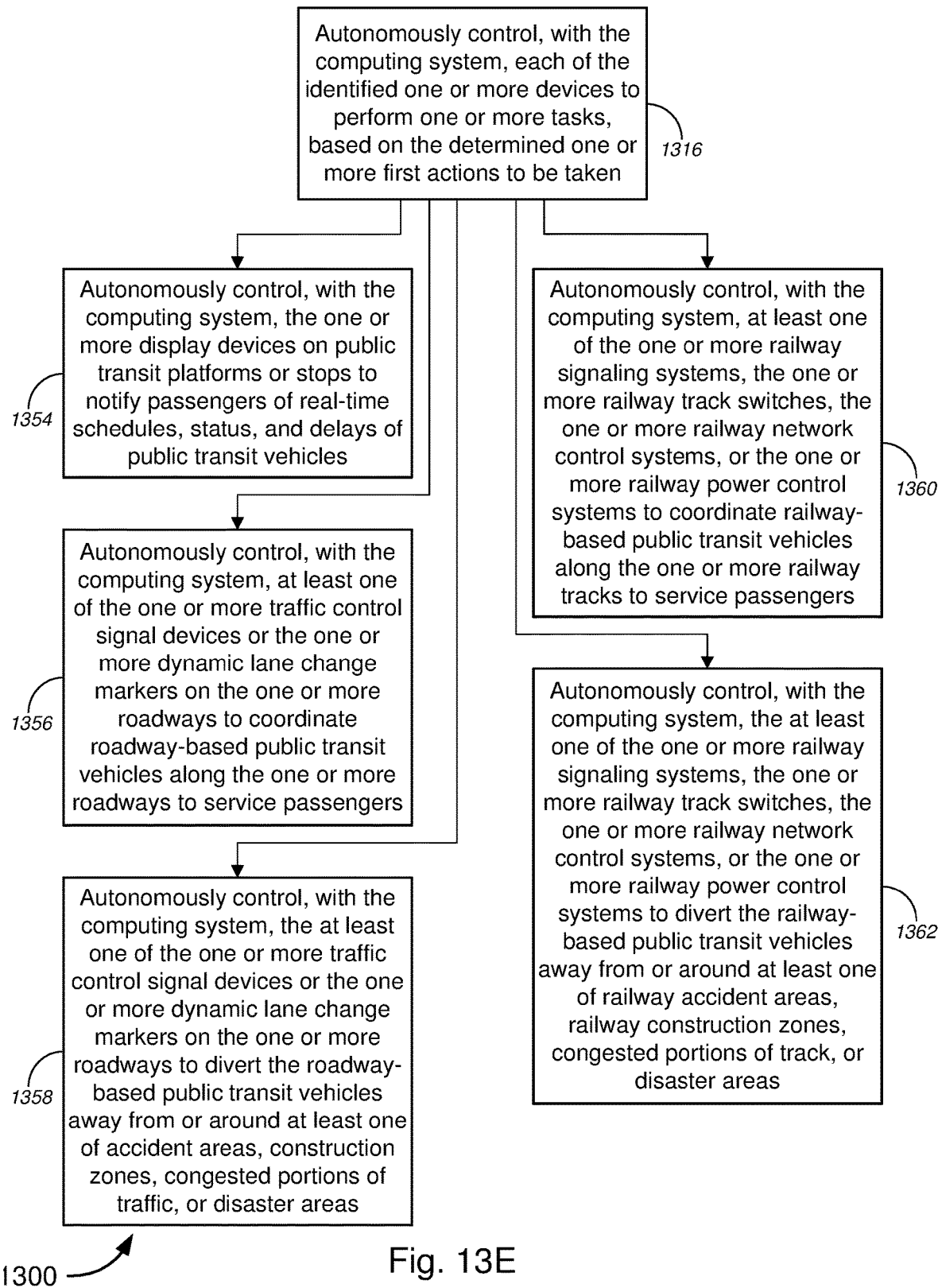

Turning to FIG. 13E, in some cases, the one or more IoT-capable devices might include, but are not limited to, at least one of one or more pressure sensors, one or more temperature sensors, one or more motion sensors, or one or more location sensors disposed on one or more public transit vehicles, and/or the like. In some instances, the identified one or more devices might include, without limitation, at least one of one or more display devices on public transit platforms or stops, one or more traffic control signal devices, one or more dynamic lane change markers on one or more roadways, one or more railway signaling systems, one or more railway track switches, one or more railway network control systems, or one or more railway power control systems, and/or the like. In some embodiments, autonomously controlling, with the computing system, each of the identified one or more devices to perform one or more tasks (at block 1316) might comprise performing corresponding at least one of autonomously controlling, with the computing system, the one or more display devices on public transit platforms or stops to notify passengers of real-time schedules, status, and delays of public transit vehicles (block 1354), autonomously controlling, with the computing system, at least one of the one or more traffic control signal devices or the one or more dynamic lane change markers on the one or more roadways to coordinate roadway-based public transit vehicles along the one or more roadways to service passengers (block 1356) while diverting the roadway-based public transit vehicles away from or around at least one of accident areas, construction zones, congested portions of traffic, or disaster areas (block 1358), or autonomously controlling, with the computing system, at least one of the one or more railway signaling systems, the one or more railway track switches, the one or more railway network control systems, or the one or more railway power control systems to coordinate railway-based public transit vehicles along the one or more railway tracks to service passengers (block 1360) while diverting the railway-based public transit vehicles away from or around at least one of railway accident areas, railway construction zones, congested portions of track, or disaster areas (block 1362). Herein, the railway-based public transit vehicles might refer to at least one of light rail commuter trains, regional commuter trains, trams, street cars, high speed trains, magnetic levitation trains, or subway trains, and/or the like.

Figure 13F:
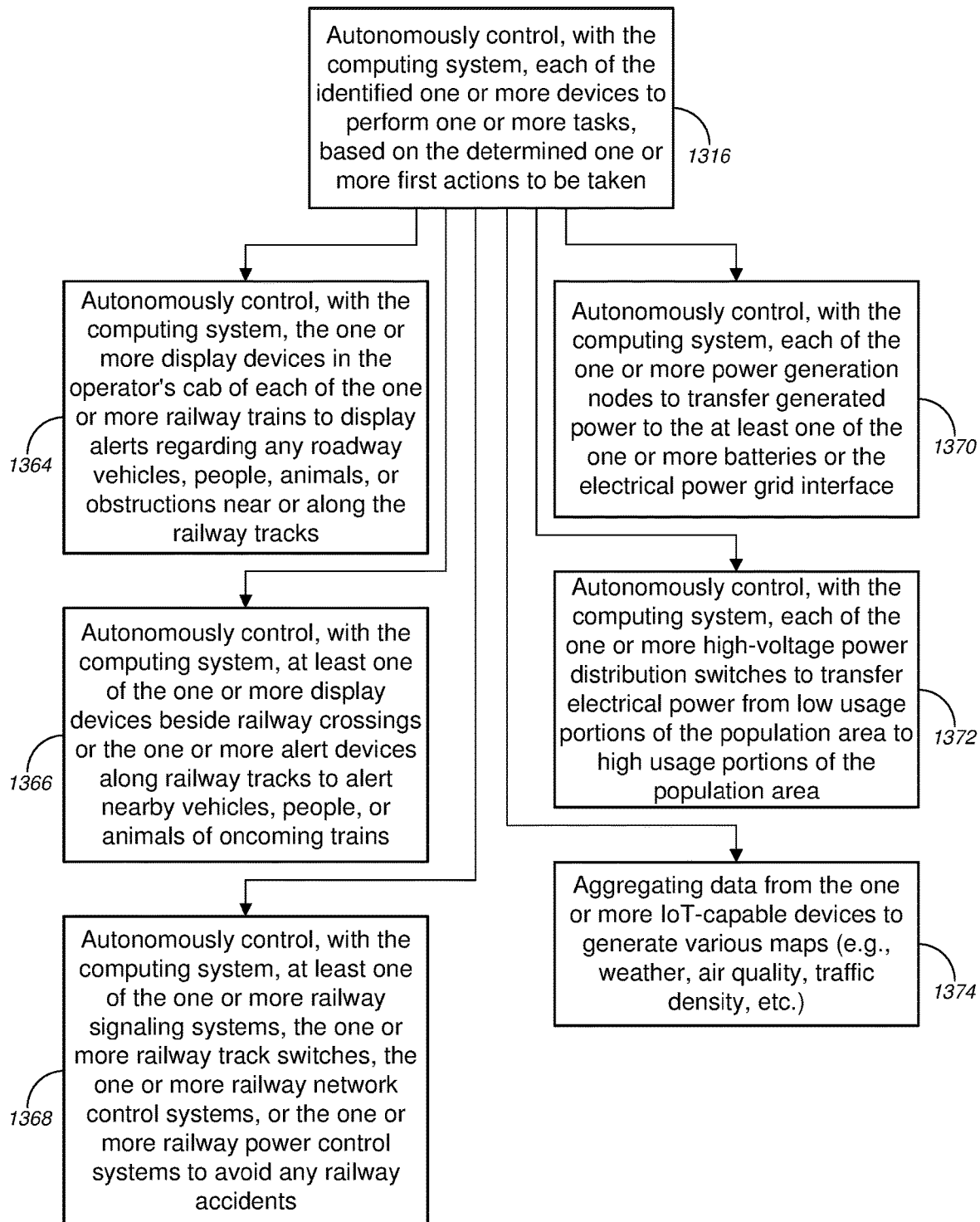

With reference to FIG. 13F, in some instances, the one or more IoT-capable devices might include, but are not limited to, at least one of one or more pressure sensors, one or more temperature sensors, one or more motion sensors, or one or more location sensors disposed on one or more railway trains, and/or the like. In some cases, the identified one or more devices might include, without limitation, at least one of one or more display devices in an operator's cab of each of one or more railway trains, one or more display devices beside railway crossings, one or more alert devices along railway tracks, one or more railway signaling systems, one or more railway track switches, one or more railway network control systems, or one or more railway power control systems, and/or the like. According to some embodiments, autonomously controlling, with the computing system, each of the identified one or more devices to perform one or more tasks (at block 1316) might comprise performing at least one of autonomously controlling, with the computing system, the one or more display devices in the operator's cab of each of the one or more railway trains to display alerts regarding any roadway vehicles, people, animals, or obstructions near or along the railway tracks (block 1364), autonomously controlling, with the computing system, at least one of the one or more display devices beside railway crossings or the one or more alert devices along railway tracks to alert nearby vehicles, people, or animals of oncoming trains (block 1366), or autonomously controlling, with the computing system, at least one of the one or more railway signaling systems, the one or more railway track switches, the one or more railway network control systems, or the one or more railway power control systems to avoid any railway accidents (block 1368), and/or the like.

According to some embodiments, the identified one or more devices might include, but are not limited to, one or more power generation nodes, the one or more power generation nodes generating and providing power to at least one of one or more batteries or an electrical power grid interface. In some embodiments, autonomously controlling, with the computing system, each of the identified one or more devices to perform one or more tasks (at block 1316) might comprise autonomously controlling, with the computing system, each of the one or more power generation nodes to transfer generated power to the at least one of the one or more batteries or the electrical power grid interface (block 1370). In some instances, the one or more power generation nodes might include, but are not limited to, at least one of one or more piezoelectric transducers embedded in a roadway that generate power when vehicles are travelling on the roadway, one or more heat transducers embedded in the roadway that generate power when solar energy heats up the roadway or when friction is generated by vehicles travelling on the roadway, one or more high-impact solar arrays embedded in the roadway that generate power from solar energy, one or more piezoelectric transducers embedded in tracks of a railway that generate power when trains are travelling on the tracks, one or more heat transducers embedded in the tracks of the railway that generate power when solar energy heats up the tracks or when friction is generated by trains travelling on the tracks, one or more high-impact solar arrays embedded in between the tracks of the railway that generate power from solar energy, one or more solar arrays embedded in windows of one or more buildings in the population area that generate power from solar energy, or one or more solar arrays embedded on rooftops of one or more buildings in the population area that generate power from solar energy, and/or the like. The roadway, herein (as above), might refer to at least one of a local road, a main road, a highway, an airport apron, an airport ramp, an airport runway, a canal, a lock, or a waterway, and/or the like.

In some cases, the identified one or more devices might include, but are not limited to, one or more high-voltage power distribution switches, and/or the like. According to some embodiments, autonomously controlling, with the computing system, each of the identified one or more devices to perform one or more tasks (at block 1316) might comprise autonomously controlling, with the computing system, each of the one or more high-voltage power distribution switches to transfer electrical power from low usage portions of the population area to high usage portions of the population area (block 1372). In this manner, the computing system can determine which parts of the population area are high demand areas for electricity and which are low demand areas for electricity, and can dynamically reconfigure the electrical grid using the high-voltage power distribution switches to redistribute the power load across particular circuits, or perhaps create more circuits in high demand areas and reduce the number of circuits in low demand areas so that the power carried by each circuit does not exceed established safety limits. This dynamic power redistribution can be performed in real-time based on real-time power demands, and/or may be performed in response to previous or predicted trends, and/or the like.

In some embodiments, the one or more IoT-capable devices might include, but are not limited to, one or more pressure sensors, one or more temperature sensors, one or more solar light sensors, one or more seismic sensors, one or more weather station sensors, one or more air quality sensors, one or more moisture sensors, one or more wind sensors, or one or more particulate sensors that are at least one of embedded within one or more roadways, embedded within one or more walkways, disposed within exterior walls of one or more buildings, disposed on exterior windows of one or more buildings, disposed within rooftops of one or more buildings, disposed on one or more traffic control signal devices, disposed on one or more street lamps, disposed on one or more communications towers, disposed on one or more utility posts, disposed on one or more high voltage towers, or disposed in one or more vehicles, and/or the like. According to some embodiments, autonomously controlling, with the computing system, each of the identified one or more devices to perform one or more tasks (at block 1316) might comprise aggregating data from the one or more IoT-capable devices to generate various maps (block 1374). For example, the generated maps might include, without limitation, at least one of one or more local weather maps, one or more regional weather maps, one or more national weather maps, one or more local pollution maps, one or more regional pollution maps, one or more national pollution maps, one or more local air quality maps, one or more regional air quality maps, one or more national air quality maps, one or more local traffic density maps, one or more regional traffic density maps, one or more national traffic density maps, one or more local pedestrian density maps, one or more regional pedestrian density maps, one or more national pedestrian density maps, one or more local construction area maps, one or more regional construction area maps, one or more national construction area maps, one or more local accident area maps, one or more regional accident area maps, or one or more national accident area maps, and/or the like.

Figure 13G:
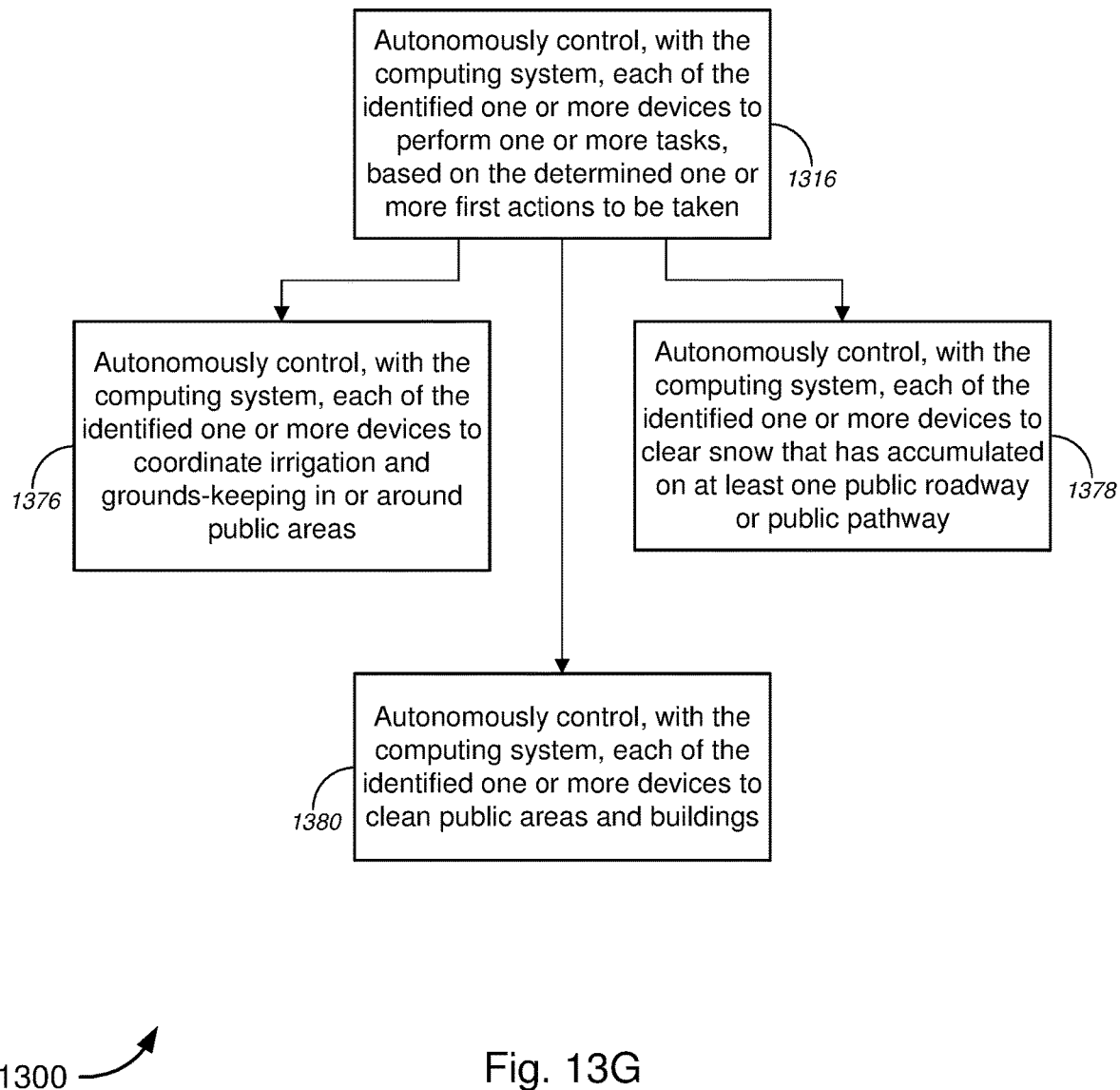

Turning to FIG. 13G, the irrigation and grounds-keeping, the snow clearing/shoveling, and the cleaning of the premises as described above with respect to the smart home, building, or customer premises functionalities of FIGS. 2-4 may be expanded on a much larger scale to apply to the corresponding irrigation and grounds-keeping, the snow clearing/shoveling, and the cleaning of public areas in population areas, including, but not limited to, a sub-division, a collection of sub-divisions, a village, a town, a city, a municipal region, a state, a province, a collection of states, a collection of provinces, an island, a collection of islands, a country, a collection of countries, a continent, a collection of continents, a space station, a space vehicle, an orbital habitat, or a habitat disposed on a different planetary body, and the like.

In some embodiments, the one or more first sensors of the one or more IoT-capable devices might comprise sensors monitoring at least one of one or more portions of public lawn areas, one or more public area indoor plants, one or more public area outdoor plants, one or more public area shrubs, one or more public area bushes, or one or more public area trees, and the one or more first sensors of the one or more IoT-capable devices might include, but are not limited to, at least one of one or more moisture sensors, one or more lawn height detectors, one or more nitrogen level sensors, one or more phosphate level sensors, one or more potassium level sensors, one or more leaf color detectors, one or more wind sensors, one or more indoor solar light sensors, one or more outdoor solar light sensors, one or more outdoor wind sensors, one or more local weather station sensors, one or more regional weather station sensors, one or more motion detectors detecting proximity of people or animals, or one or more humidity sensors, and/or the like. In some cases, the identified one or more devices might include, without limitation, at least one of one or more user devices associated with grounds-keeping crew members, one or more automated lawn mowers, one or more automated trimmers, one or more sprinkler systems, one or more fertilizer dispensers, or one or more animal deterrent systems, and/or the like. According to some embodiments, autonomously controlling, with the computing system, each of the identified one or more devices to perform one or more tasks (at block 1316) might comprise autonomously controlling each of the identified one or more devices to coordinate irrigation and grounds-keeping in or around public areas throughout at least portions of the population area (block 1376), e.g., by autonomously controlling, with the computing system, the at least one of the one or more user devices associated with grounds-keeping crew members, the one or more automated lawn mowers, the one or more automated trimmers, the one or more sprinkler systems, the one or more fertilizer dispensers, or the one or more animal deterrent systems to coordinate irrigation and greens-keeping for the at least one of the one or more portions of public lawn areas, the one or more public area indoor plants, the one or more public area outdoor plants, the one or more public area shrubs, the one or more public area bushes, or the one or more public area trees, and/or the like.

In some embodiments, the one or more first sensors of the one or more IoT-capable devices might comprise sensors monitoring snow accumulation on the at least one public pathway, which might include, but are not limited to, at least one of one or more public outdoor walkways, one or more public outdoor stairways, one or more public driveways, or one or more public roadways, and/or the like. According to some embodiments, the one or more first sensors of the one or more IoT-capable devices might comprise sensors monitoring snow accumulation on the at least one public pathway, and the one or more first sensors of the one or more IoT-capable devices might each include, without limitation, one or more moisture sensors, one or more snow accumulation sensors, one or more cameras, one or more temperature sensors, one or more wind sensors, one or more outdoor solar light sensors, one or more neighborhood weather station sensors, one or more regional weather station sensors, one or more motion detectors detecting proximity of people or animals, or one or more humidity sensors, and/or the like. In some cases, the one or more devices might include, but are not limited to, one or more of one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one public pathway, or one or more drones with mounted heat lamps, navigation systems of one or more snow plows, industrial snow scrappers, and/or graders, vehicle control systems (e.g., ETC, gear, steering, braking, etc.) of one or more plows, industrial snow scrappers, and/or graders, and/or the like. In some cases, autonomously controlling, with the computing system, each of the identified one or more devices to perform one or more tasks (at block 1316) might comprise sending or autonomously controlling one or more of one or more automated snow shovels, one or more automated snow blowers, one or more de-icing machines, one or more heating mats, one or more built-in radiant heat systems under the at least one pathway, or one or more drones with mounted heat lamps, the one or more snow plows, industrial snow scrappers, and/or graders and/or the like to clear or melt the accumulated snow.

In some embodiments, prior to sending or autonomously controlling the one or more devices, the system might receive and analyze sensor data to determine whether there is any snow accumulation (as well as how much snow accumulation and perhaps also the moisture content in the snow (e.g., whether heavy wet snow, light powdery dry snow, or something in between, etc.) on at least one of one or more public outdoor walkways, public one or more outdoor stairways, public one or more driveways, or public one or more roadways, and/or the like. Wind and weather sensors might inform the system as to when is appropriate to send or autonomously control these machines (e.g., if it is too windy, the wind might blow back any snow that is cleared or moved, although melted snow might not be affected; if it is going to drop in temperature further below freezing, de-icing versus blowing might be needed, while melting might require analysis of whether the melted stream would flow to some place that will not result in frozen and clogged up gutters or the like beyond the reach of the heat systems due to the temperature drop; etc.). In some cases, while sending or autonomously controlling the snow blower, de-icing machines, the industrial snow-clearing machines, and/or any drones, the system might receive and analyze sensor data (e.g., motion detectors, proximity detectors, etc.) to determine whether any people and/or animals might cross paths with these machines; if so, the system might divert to the machines, might send messages or alerts to operators of the human-operable machines, might stop the machines temporarily, and/or might use light, messages, and/or sounds to warn the people and/or animals, and/or the like.

In some instances, the one or more first sensors of the one or more IoT-capable devices might comprise sensors monitoring cleanliness of at least one of one or more portions of public parks, one or more public areas, one or more roadways, one or more walkways, one or more public buildings, one or more transportation terminals, one or more transportation platforms, or one or more transportation stops, and/or the like. In some cases, the one or more first sensors of the one or more IoT-capable devices might include, but are not limited to, at least one of one or more moisture sensors, one or more cameras, one or more motion detectors detecting proximity of people or animals, one or more humidity sensors, one or more air quality sensors, one or more particulate sensors, one or more optical particulate sensors, or one or more electrostatic particulate sensors, and/or the like. The identified one or more devices, according to some embodiments, might include, without limitation, at least one of one or more user devices associated with cleaning crew members, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, or one or more electrostatic particulate collecting tools, and/or the like. In some embodiments, autonomously controlling, with the computing system, each of the identified one or more devices to perform one or more tasks (at block 1316) might comprise autonomously controlling, with the computing system the at least one of the one or more user devices associated with cleaning crew members, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more street cleaners, one or more sidewalk cleaners, or one or more electrostatic particulate collecting tools to coordinate cleaning and maintenance for the at least one of the public parks, the one or more public areas, the one or more roadways, the one or more walkways, the one or more public buildings, the one or more transportation terminals, the one or more transportation platforms, or the one or more transportation stops, and/or the like (block 1380).

Various other embodiments for implementing smart city functionalities may be provided consistent with the invention as described above.

Exemplary System and Hardware Implementation

FIG. 14 is a block diagram illustrating an exemplary computer or system hardware architecture, in accordance with various embodiments. FIG. 14 provides a schematic illustration of one embodiment of a computer system 1400 of the service provider system hardware that can perform the methods provided by various other embodiments, as described herein, and/or can perform the functions of computer or hardware system (i.e., computing systems 105a, 105b, 255, 305, 305a-305c, 605, 605a-605c, 905, 905a-905c, 1205, and 1205a-1205c, Internet of Things ("IoT")-capable devices 110a-110n, 215, 220, 225, 240, 245, 315, 315a-315y, 505, 515, 550, 555, 615, 615a-615r, 820, 830, 835, 840, 845, 850, 865, 915, 915a-915r, 1115, 1120, 1125, 1130, 1135, 1140, 1145, 1150, 1155, 1165, 1175, 1215, and 1215a-1215r, IoT-capable sensors 115a-115n, 310, and 310a-310h, 520, 525, 530, 535, 540, 545, 610, 610a-610h, 855, 860, 910, 910a-910h, 1210, and 1210a-1210h, analytics engine 140, etc.) or other devices (e.g., devices 500, 510, 815, 825, etc.), as described above. It should be noted that FIG. 14 is meant only to provide a generalized illustration of various components, of which one or more (or none) of each may be utilized as appropriate. FIG. 14, therefore, broadly illustrates how individual system elements may be implemented in a relatively separated or relatively more integrated manner.

The computer or hardware system 1400—which might represent an embodiment of the computer or hardware system (i.e., computing systems 105a, 105b, 255, 305, 305a-305c, 605, 605a-605c, 905, 905a-905c, 1205, and 1205a-1205c, IoT-capable devices 110a-110n, 215, 220, 225, 240, 245, 315, 315a-315y, 505, 515, 550, 555, 615, 615a-615r, 820, 830, 835, 840, 845, 850, 865, 915, 915a-915r, 1115, 1120, 1125, 1130, 1135, 1140, 1145, 1150, 1155, 1165, 1175, 1215, and 1215a-1215r, IoT-capable sensors 115a-115n, 310, and 310a-310h, 520, 525, 530, 535, 540, 545, 610, 610a-610h, 855, 860, 910, 910a-910h, 1210, and 1210a-1210h, analytics engine 140, etc.) or other devices (e.g., devices 500, 510, 815, 825, etc.), described above with respect to FIGS. 1-13—is shown comprising hardware elements that can be electrically coupled via a bus 1405 (or may otherwise be in communication, as appropriate). The hardware elements may include one or more processors 1410, including, without limitation, one or more general-purpose processors and/or one or more special-purpose processors (such as microprocessors, digital signal processing chips, graphics acceleration processors, and/or the like); one or more input devices 1415, which can include, without limitation, a mouse, a keyboard, and/or the like; and one or more output devices 1420, which can include, without limitation, a display device, a printer, and/or the like.

The computer or hardware system 1400 may further include (and/or be in communication with) one or more storage devices 1425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 1400 might also include a communications subsystem 1430, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1430 may permit data to be exchanged with a network (such as the network described below, to name one example), with other computer or hardware systems, and/or with any other devices described herein. In many embodiments, the computer or hardware system 1400 will further comprise a working memory 1435, which can include a RAM or ROM device, as described above.

The computer or hardware system 1400 also may comprise software elements, shown as being currently located within the working memory 1435, including an operating system 1440, device drivers, executable libraries, and/or other code, such as one or more application programs 1445, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1425 described above. In some cases, the storage medium might be incorporated within a computer system, such as the system 1400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 1400 and/or might take the form of source and/or installable code, which, upon compilation and/or installation on the computer or hardware system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1400) to perform methods in accordance with various embodiments of the invention. According to a set of embodiments, some or all of the procedures of such methods are performed by the computer or hardware system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer readable medium, such as one or more of the storage device(s) 1425. Merely by way of example, execution of the sequences of instructions contained in the working memory 1435 might cause the processor(s) 1410 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1400, various computer readable media might be involved in providing instructions/code to processor(s) 1410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 1425. Volatile media includes, without limitation, dynamic memory, such as the working memory 1435. In some alternative embodiments, a computer readable medium may take the form of transmission media, which includes, without limitation, coaxial cables, copper wire and fiber optics, including the wires that comprise the bus 1405, as well as the various components of the communication subsystem 1430 (and/or the media by which the communications subsystem 1430 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1400. These signals, which might be in the form of electromagnetic signals, acoustic signals, optical signals, and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a storage device 1425 either before or after execution by the processor(s) 1410.

As noted above, a set of embodiments comprises methods and systems for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, and/or the like. FIG. 15 illustrates a schematic diagram of a system 1500 that can be used in accordance with various embodiments. The system 1500 can each include one or more user computers, user devices, or customer devices 1505. A user computer, user device, or customer device 1505 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1505 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1505 can be any other electronic device, such as a thin-client computer, Internet-enabled mobile telephone, and/or personal digital assistant, capable of communicating via a network (e.g., the network(s) 1510 described below) and/or of displaying and navigating web pages or other types of electronic documents. Although the exemplary system 1500 is shown with two user computers, user devices, or customer devices 1505, any number of user computers, user devices, or customer devices can be supported.

Certain embodiments operate in a networked environment, which can include a network(s) 1510. The network(s) 1510 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1510 (similar to network 125 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1515. Each of the server computers 1515 may be configured with an operating system, including, without limitation, any of those discussed above, as well as any commercially (or freely) available server operating systems. Each of the servers 1515 may also be running one or more applications, which can be configured to provide services to one or more clients 1505 and/or other servers 1515.

Merely by way of example, one of the servers 1515 might be a data server, a web server, a cloud computing device(s), or the like, as described above. The data server might include (or be in communication with) a web server, which can be used, merely by way of example, to process requests for web pages or other electronic documents from user computers 1505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1505 to perform methods of the invention.

The server computers 1515, in some embodiments, might include one or more application servers, which can be configured with one or more applications accessible by a client running on one or more of the client computers 1505 and/or other servers 1515. Merely by way of example, the server(s) 1515 can be one or more general purpose computers capable of executing programs or scripts in response to the user computers 1505 and/or other servers 1515, including, without limitation, web applications (which might, in some cases, be configured to perform methods provided by various embodiments). Merely by way of example, a web application can be implemented as one or more scripts or programs written in any suitable programming language, such as Java™, C, C#∩ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1505 and/or another server 1515. In some embodiments, an application server can perform one or more of the processes for implementing Internet of Things functionality, and, in particular embodiments, to methods, systems, apparatus, and computer software for implementing smart environment functionality, which includes, without limitation, smart home, building, or customer premises functionality, smart vehicle functionality, smart roadway functionality, smart city functionality, or the like, as described in detail above. Data provided by an application server may be formatted as one or more web pages (comprising HTML, JavaScript, etc., for example) and/or may be forwarded to a user computer 1505 via a web server (as described above, for example). Similarly, a web server might receive web page requests and/or input data from a user computer 1505 and/or forward the web page requests and/or input data to an application server. In some cases, a web server may be integrated with an application server.

In accordance with further embodiments, one or more servers 1515 can function as a file server and/or can include one or more of the files (e.g., application code, data files, etc.) necessary to implement various disclosed methods, incorporated by an application running on a user computer 1505 and/or another server 1515. Alternatively, as those skilled in the art will appreciate, a file server can include all necessary files, allowing such an application to be invoked remotely by a user computer, user device, or customer device 1505 and/or server 1515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1520a through 1520n (collectively, "databases 1520"). The location of each of the databases 1520 is discretionary: merely by way of example, a database 1520a might reside on a storage medium local to (and/or resident in) a server 1515a (and/or a user computer, user device, or customer device 1505). Alternatively, a database 1520n can be remote from any or all of the computers 1505, 1515, so long as it can be in communication (e.g., via the network 1510) with one or more of these. In a particular set of embodiments, a database 1520 can reside in a storage-area network ("SAN") familiar to those skilled in the art. (Likewise, any necessary files for performing the functions attributed to the computers 1505, 1515 can be stored locally on the respective computer and/or remotely, as appropriate.) In one set of embodiments, the database 1520 can be a relational database, such as an Oracle database, that is adapted to store, update, and retrieve data in response to SQL-formatted commands. The database might be controlled and/or maintained by a database server, as described above, for example.

With reference to FIG. 15, according to some embodiments, system 1500 might further comprise a computing system 1525 (similar to computing system 105a, 105b, 255, 305, 305a-305c, 605, 605a-605c, 905, 905a-905c, 1205, and 1205a-1205c of FIGS. 1-3, 6, 9, and 12, or the like), one or more IoT-capable devices 1530a-1530n (similar to IoT-capable devices 110a-110n, 215, 220, 225, 240, 245, 315, 315a-315y, 505, 515, 550, 555, 615, 615a-615r, 820, 830, 835, 840, 845, 850, 865, 915, 915a-915r, 1115, 1120, 1125, 1130, 1135, 1140, 1145, 1150, 1155, 1165, 1175, 1215, and 1215a-1215r of FIGS. 1-3, 5, 6, 8, 9, 11, and 12, or the like), one or more IoT-capable sensors 1535a-1535n (similar to IoT-capable sensors 115a-115n, 310, and 310a-310h, 520, 525, 530, 535, 540, 545, 610, 610a-610h, 855, 860, 910, 910a-910h, 1210, and 1210a-1210h of FIGS. 1-3, 5, 6, 8, 9, and 12, or the like), and one or more devices 1540a-1540n (similar to devices 500, 510, 815, and 825 of FIGS. 5 and 8, or the like). The functions of the system 1500 (and its components) are described in greater detail above with respect to FIGS. 1-13.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, at least one first sensor data from each of one or more Internet of Things ("IoT")-capable devices via machine-to-machine communications, each of the one or more IoT-capable devices comprising one or more first sensors that collect the at least one first sensor data;
   analyzing, with the computing system, the at least one first sensor data to determine one or more first actions to be taken;
   identifying, with the computing system, one or more vehicular components associated with a vehicle for performing the determined one or more first actions to be taken, based on the at least one first sensor data from each of the one or more IoT-capable devices; and
   autonomously controlling, with the computing system, each of the identified one or more vehicular components to perform one or more tasks, based on the determined one or more first actions to be taken.

2. The method of claim 1, wherein autonomously controlling, with the computing system, each of the identified one or more vehicular components to perform the one or more tasks comprises sending, with the computing system, one or more first control instructions to each of the identified one or more vehicular components to perform the one or more tasks, based on the determined one or more first actions to be taken.

3. The method of claim 1, wherein the computing system comprises one of a single processor disposed within the vehicle, a plurality of processors disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a server computer remote from the vehicle, a cloud computing system, a distributed computing system that integrates computing resources from one or more IoT-capable devices, or a combination of two or more of these computing systems.

4. The method of claim 1, wherein receiving the at least one first sensor data from each of the one or more IoT-capable devices via machine-to-machine communications comprises receiving, with the computing system, at least one first sensor data from each of the one or more IoT-capable devices via machine-to-machine communications, via one or more first application programming interfaces ("APIs") established between the computing system and each of the one or more IoT-capable devices.

5. The method of claim 1, wherein autonomously controlling, with the computing system, each of the identified one or more vehicular components to perform the one or more tasks comprises autonomously controlling, with the computing system, each of the identified one or more vehicular components, via one or more second APIs established between the computing system and each of the one or more vehicular components.

6. The method of claim 1, wherein the at least one first sensor data that are received from each of the one or more IoT-capable devices each comprises sensor data that exceeds a predetermined threshold for each corresponding type of sensor, wherein sensor data that do not exceed the predetermined threshold for each corresponding type of sensor are prevented from being sent to the computing system.

7. The method of claim 1, wherein the identified one or more vehicular components comprise at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, or a vehicle speaker system, wherein the one or more IoT-capable devices comprise at least one of a vehicle camera-based collision avoidance system, a vehicle radar-based proximity detection system, a vehicle lidar-based proximity detection system, a vehicle sonar-based proximity detection system, a location sensor, or a transceiver device in communication with a corresponding transceiver device in each of one or more nearby vehicles, wherein autonomously controlling, with the computing system, each of the identified one or more vehicular components to perform the one or more tasks comprises autonomously controlling, with the computing system, at least one of the vehicle brake system, the vehicle gear system, the vehicle electronic throttle control system, the vehicle steering system, or the vehicle turn signal system to maintain at least a predetermined safe distance between the vehicle and any adjacent vehicles based at least in part on data from each of at least one of the vehicle camera-based collision avoidance system, the vehicle radar-based proximity detection system, the vehicle lidar-based proximity detection system, the vehicle sonar-based proximity detection system, or the transceiver device in communication with the corresponding transceiver device in each of the one or more nearby vehicles, and autonomously controlling, with the computing system, at least one of the vehicle heads-up display system, the vehicle digital instrument gauge cluster, the vehicle display device, or the vehicle speaker system to alert a driver of the vehicle in response to any necessary changes in operating the vehicle due to maintaining the at least the predetermined safe distance between the vehicle and any adjacent vehicles.

8. The method of claim 1, wherein the identified one or more vehicular components comprise at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, a vehicle speaker system, a vehicle hazard light system, or a vehicle self-diagnostics system, wherein the one or more IoT-capable devices comprise at least one of a vehicle camera-based collision avoidance system, a vehicle radar-based proximity detection system, a vehicle lidar-based proximity detection system, a vehicle sonar-based proximity detection system, or a transceiver device in communication with a corresponding transceiver device in each of one or more nearby vehicles, wherein autonomously controlling, with the computing system, each of the identified one or more vehicular components to perform one or more tasks comprises autonomously controlling, with the computing system, at least one of the vehicle brake system, the vehicle gear system, the vehicle electronic throttle control system, the vehicle steering system, or the vehicle turn signal system to safely navigate the vehicle to a safe road-side location while avoiding collisions with other vehicles and any obstacles, based at least in part on data from the vehicle self-diagnostics system and data from each of at least one of the vehicle camera-based collision avoidance system, the vehicle radar-based proximity detection system, the vehicle lidar-based proximity detection system, the vehicle sonar-based proximity detection system, or the transceiver device in communication with the corresponding transceiver device in each of the one or more nearby vehicles, autonomously controlling, with the computing system, at least one of vehicle hazard light system or the transceiver device in communication with the corresponding transceiver device in each of the one or more nearby vehicles to alert other drivers and other vehicles of problems with operation of the vehicle, and autonomously controlling, with the computing system, at least one of the vehicle heads-up display system, the vehicle digital instrument gauge cluster, the vehicle display device, or the vehicle speaker system to alert a driver of the vehicle of the problems with the operation of the vehicle and status related to safely navigating the vehicle to a safe road-side location while avoiding collisions with other vehicles and any obstacles.

9. The method of claim 8, wherein the identified one or more vehicular components further comprise a vehicle communications system, wherein autonomously controlling, with the computing system, each of the identified one or more vehicular components to perform one or more tasks further comprises autonomously controlling, with the computing system, the vehicle communications system to send at least one of a message to one of a towing company or a roadside assistance service to send a tow truck, a message to a vehicle servicing company regarding the problems with the operation of the vehicle and regarding the vehicle being en route, a message to emergency responders regarding the problems with the operation of the vehicle and location of the vehicle, or a message to one or more of friends or family members of occupants of the vehicle regarding the problems with the operation of the vehicle, the location of the vehicle, and status of the occupants of the vehicle.

10. The method of claim 1, wherein the identified one or more vehicular components comprise at least one of a vehicle brake system, a vehicle gear system, a vehicle electronic throttle control system, a vehicle steering system, a vehicle turn signal system, a vehicle heads-up display system, a vehicle digital instrument gauge cluster, a vehicle display device, or a vehicle speaker system, wherein the one or more IoT-capable devices comprise at least one of a transceiver device in communication with a corresponding transceiver device in each of one or more nearby vehicles, a transceiver in communication with one or more roadway IoT-capable devices, or the one or more roadway IoT-capable devices, the one or more roadway IoT-capable devices comprising IoT-capable devices embedded in one or more of at least one roadway structure, at least one street lamp, at least one sidewalk structure, or at least one apparatus each mounted to one or more of the at least one roadway structure, the at least one street lamp, or the at least one sidewalk structure, wherein autonomously controlling, with the computing system, each of the identified one or more vehicular components to perform one or more tasks comprises autonomously controlling, with the computing system, at least one of the vehicle brake system, the vehicle gear system, the vehicle electronic throttle control system, the vehicle steering system, or the vehicle turn signal system to perform one of driving within a lane, changing lanes, entering a freeway, exiting a freeway, moving to a shoulder of a road, slowing the vehicle, accelerating the vehicle, or stopping the vehicle, each based on data from at least one of the transceiver in communication with the corresponding transceiver device in each of one or more nearby vehicles, the transceiver in communication with the one or more roadway IoT-capable devices, or the one or more roadway IoT-capable devices, and autonomously controlling with the computing system, at least one of the vehicle heads-up display system, the vehicle digital instrument gauge cluster, the vehicle display device, or the vehicle speaker system to alert a driver of the vehicle in response to any necessary changes in operating the vehicle due to performing the one of driving within a lane, changing lanes, entering a freeway, exiting a freeway, moving to a shoulder of a road, slowing the vehicle, accelerating the vehicle, or stopping the vehicle.

11. The method of claim 1, wherein the identified one or more vehicular components comprise at least one of a vehicle communications system or a transceiver in communication with an external IoT-capable device that is external to the vehicle, wherein the one or more IoT-capable devices comprise at least one of a speed sensor, one or more brake sensors, a location sensor, an air quality sensor, one or more cameras, one or more smoke detectors, one or more tire pressure sensors, an engine temperature sensor, a fuel level sensor, one or more fluid leak detectors, one or more proximity sensors, one or more occupant sensors, one or more impact sensors, one or more stress sensors, or one or more suspension system diagnostic sensors.

12. An apparatus, comprising:
one or more first processors; and
a non-transitory computer readable medium communicatively coupled with the one or more first processors, the non-transitory computer readable medium having stored thereon computer software comprising a set of instructions that, when executed by the one or more first processors, causes the apparatus to:
receive at least one first sensor data from each of one or more Internet of Things ("IoT")-capable devices via machine-to-machine communications, each of the one or more IoT-capable devices comprising one or more first sensors that collect the at least one first sensor data;
analyze the at least one first sensor data to determine one or more first actions to be taken;
identify one or more vehicular components associated with a vehicle for performing the determined one or more first actions to be taken, based on the at least one first sensor data from each of the one or more IoT-capable devices; and
autonomously control each of the identified one or more vehicular components to perform one or more tasks, based on the determined one or more first actions to be taken.

13. The apparatus of claim 12, wherein the apparatus is one of a processing device disposed within the vehicle, an IoT management node disposed within the vehicle, an IoT management node disposed at a customer premises associated with an owner of the vehicle, an IoT management node disposed at a business premises associated with a company that owns or operates the vehicle, an IoT management node disposed at a service provider facility associated with providing services to the owner of the vehicle, a server computer remote from the vehicle, or a distributed computing system that integrates computing resources from one or more IoT-capable devices.

14. The apparatus of claim 12, wherein autonomously controlling each of the identified one or more vehicular components to perform the one or more tasks comprises sending one or more first control instructions to each of the identified one or more vehicular components to perform the one or more tasks, based on the determined one or more first actions to be taken.

* * * * *